United States Patent
Li et al.

(10) Patent No.: US 7,629,416 B2
(45) Date of Patent: *Dec. 8, 2009

(54) PLASTICIZED POLYOLEFIN COMPOSITIONS

(75) Inventors: Wen Li, Houston, TX (US); Mun Fu Tse, Seabrook, TX (US); Srivatsan Srinivas Iyer, Pearland, TX (US); Bryan Robert Chapman, Annandale, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 348 days.

This patent is subject to a terminal disclaimer.

(21) Appl. No.: 11/119,072

(22) Filed: Apr. 29, 2005

(65) Prior Publication Data

US 2006/0135699 A1    Jun. 22, 2006
US 2008/0227919 A9    Sep. 18, 2008

Related U.S. Application Data

(63) Continuation-in-part of application No. 10/640,435, filed on Aug. 12, 2003.

(60) Provisional application No. 60/637,429, filed on Dec. 17, 2004, provisional application No. 60/655,612, filed on Feb. 22, 2005, provisional application No. 60/655,310, filed on Feb. 22, 2005, provisional application No. 60/402,665, filed on Aug. 12, 2002.

(51) Int. Cl.
C08L 23/00    (2006.01)
C08L 23/04    (2006.01)
C08K 5/00    (2006.01)

(52) U.S. Cl. .................. 525/191; 525/240; 524/515

(58) Field of Classification Search ................ 525/199, 525/240, 191
See application file for complete search history.

(56) References Cited

U.S. PATENT DOCUMENTS

| | | | |
|---|---|---|---|
| 3,201,364 A | 8/1965 | Salyer | 260/33.6 |
| 3,415,925 A | 12/1968 | Marans | 264/331 |
| 4,073,782 A | 2/1978 | Kishi et al. | 260/23 H |
| 4,110,185 A | 8/1978 | Williams et al. | 204/159.2 |
| 4,132,698 A | 1/1979 | Gessler et al. | 260/33.6 AQ |
| 4,170,586 A | 10/1979 | Clampitt et al. | |
| 4,210,570 A | 7/1980 | Trotter et al. | 260/33.6 AQ |
| 4,325,850 A | 4/1982 | Mueller | |
| 4,536,537 A | 8/1985 | Klingensmith et al. | 524/481 |
| 4,604,322 A | 8/1986 | Reid | 428/332 |
| 4,645,791 A | 2/1987 | Theodore et al. | |
| 4,774,277 A | 9/1988 | Janac et al. | 524/474 |
| 4,960,820 A | 10/1990 | Hwo | 524/528 |
| 5,482,780 A | 1/1996 | Wilkie et al. | 428/515 |
| 5,869,555 A | 2/1999 | Simmons et al. | 524/229 |
| 6,465,109 B2 | 10/2002 | Ohtsuka | |
| 6,515,231 B1 | 2/2003 | Strobech et al. | |
| 6,632,385 B2 | 10/2003 | Kauschke et al. | 264/103 |
| 6,803,103 B2 | 10/2004 | Kauschke et al. | 428/400 |
| 7,271,209 B2 * | 9/2007 | Li et al. | 524/284 |
| 2002/0050124 A1 | 5/2002 | Jaeger | 53/441 |
| 2003/0036592 A1 | 2/2003 | Longmoore et al. | 524/229 |
| 2004/0030287 A1 | 2/2004 | Matthijs et al. | 604/110 |
| 2004/0054040 A1 | 3/2004 | Lin et al. | |
| 2004/0091631 A1 | 5/2004 | Belli et al. | |
| 2004/0106723 A1 | 6/2004 | Yang et al. | 524/570 |
| 2004/0186214 A1 | 9/2004 | Li et al. | 524/474 |
| 2004/0260001 A1 | 12/2004 | Lin et al. | 524/474 |
| 2005/0106978 A1 * | 5/2005 | Cheng et al. | 442/327 |
| 2005/0130544 A1 * | 6/2005 | Cheng et al. | 442/415 |
| 2006/0100379 A1 * | 5/2006 | Ouhadi | 525/240 |
| 2006/0189744 A1 * | 8/2006 | Tse et al. | 524/447 |

FOREIGN PATENT DOCUMENTS

| | | |
|---|---|---|
| EP | 0 168 923 | 1/1986 |
| EP | 0 240 563 | 10/1987 |
| EP | 0 300 689 | 1/1989 |
| EP | 0 315 363 | 5/1989 |
| EP | 0 448 259 | 9/1991 |
| EP | 0 565 073 | 10/1993 |
| EP | 0 774 347 | 5/1997 |
| EP | 1 028 145 | 8/2000 |
| EP | 1 201 406 | 5/2002 |
| EP | 1 505 181 | 2/2005 |
| EP | 1 342 249 | 1/2009 |
| FR | 2 094 870 | 3/1972 |

(Continued)

OTHER PUBLICATIONS

Maltby et al., entitled "Slip Additives for Film Extrusion", *Journal of Plastic Film & Sheeting*, vol. 14, pp. 111-120, Boston, MA, Apr. 1998.

(Continued)

*Primary Examiner*—Nathan M Nutter

(57) ABSTRACT

The present invention relates to a composition comprising 1) from 1 to 98 weight % of a first propylene polymer having a melting point of 100° C. or more, 2) from 5 to 98 weight % of a second propylene polymer having a heat of fusion of 70 J/g or less and a tacticity index of 75% or more, 3) from 0.5 to 75 weight % of a non-functionalized plasticizer ("NFP") having a viscosity index of 120 or more, based upon the weight of the first polymer, second polymer, and the NFP, and articles therefrom.

30 Claims, No Drawings

FOREIGN PATENT DOCUMENTS

| | | |
|---|---|---|
| GB | 977 113 | 12/1964 |
| GB | 1 108 298 | 4/1968 |
| GB | 1 329 915 | 9/1973 |
| GB | 1 352 311 | 5/1974 |
| JP | 56-095938 | 8/1981 |
| JP | 07-292167 | 11/1995 |
| JP | 7-292167 | 11/1995 |
| WO | WO 98/44041 | 10/1998 |
| WO | WO 01/18109 | 3/2001 |
| WO | WO 02/18487 | 3/2002 |
| WO | WO 02/31044 | 4/2002 |
| WO | WO 03/48252 | 6/2003 |
| WO | WO 2004/014998 | 2/2004 |
| WO | WO 2007/048422 | 5/2007 |

OTHER PUBLICATIONS

Chemical Additives for Plastics Industry, entitled "Plasticizers", pp. 107-116, Radian Corp., Noyes Data Corporation, New Jersey, 1987.
Rudnick et al., Synthetic Lubricants and High-Performance Functional Fluids, Second Edition, Marcel Dekker, Inc., New York, 1999.
Rubber Technology Handbook, Werner Hoffman, Hanser Publishers, New York, 1989, p. 294-305.
Additives for Plastics, J. Stepek, H. Daoust, Springer Verlag, New York, 1983, p. 6-69.
Abstract for JP 08067782, published Mar. 12, 1996 (see line BI).
Abstract for JP 11012402, published Jan. 19, 1999 (see line BJ).
Abstract for JP 01282280, published Nov. 14, 1989 (see line BK).
Abstract for JP 69029554, published Dec. 1, 1969 (see line BL).
Abstract for JP 09208761, published Aug. 12, 1997.
Jens Stehr, Investigation of the Effects of Poly($\alpha$-olefin) Plasticizers on the Properties of Elastomers, KGK, Jan./Feb. 2007, pp. 14-19 (translated from German by McElroy Translation Company.

* cited by examiner

PLASTICIZED POLYOLEFIN COMPOSITIONS

PRIORITY CLAIM

This application claims the benefit of 60/637,429, filed Dec. 17, 2004; 60/655,612, filed Feb. 22, 2005 and 60/655,310, filed Feb. 22, 2005. This application is also a continuation in part of U.S. Ser. No. 10/640,435, filed Aug. 12, 2003 which claims the benefit of U.S. Ser. No. 60/402,665, filed Aug. 12, 2002.

FIELD OF THE INVENTION

The present invention relates to soft polyolefin compositions exhibiting a good balance of mechanical, optical and elastic properties. More particularly, the present invention relates to semicrystalline polypropylene compositions comprising a high-melting propylene homopolymer or copolymer, a low-crystallinity propylene homopolymer or copolymer, and a non-functionalized plasticizer; and articles made from such compositions.

BACKGROUND OF THE INVENTION

Polyolefins are useful in any number of everyday articles. For many of these applications, including films and fibers, flexibility and softness combined with retention of properties at high end-use temperatures ("thermal resistance") are desirable attributes. Semicrystalline polyolefins are used in such applications because they are thermoplastic, meaning the crystalline nature (not cross-linking) allows them to form useful articles; such materials can be formed into pellets for ease of handling and are processed using standard plastic-industry equipment such as extruders. This is in contrast to polyolefin thermoset materials, such as ethylene-propylene-diene (EPDM) elastomer (also called EPDM rubber), which have very little to no crystallinity and very high molecular weights, and must be highly cross-linked to form useful articles; such materials can not be pelletized and are processed using standard rubber-industry equipment such as roll mills.

Often, propylene-based semicrystalline polyolefins are chosen for their relatively high melting temperature. However, one drawback to such polyolefins, especially propylene-rich ones, is their high hardness and stiffness which makes then unsuitable for applications requiring a soft touch. Another drawback to propylene-rich polyolefins is their relatively high glass transition temperature, which is detrimental to toughness, particularly low temperature toughness and impact resistance, that is often critical to applications that involve structural parts fabricated by molding or extrusion techniques.

One way of making semicrystalline polypropylene softer and tougher has been to blend in softer polymers such as elastomers and plastomers. This, however, leads to hazy optical properties. In addition, these compositions, while exhibiting soft touch, do not exhibit any elastic properties such as good compression set and elastic recovery after high strains. This characteristic makes these polyolefins incapable of use in a wide variety of applications where softness and elasticity are required along with good thermal resistance. Another common approach to improving flexibility, softness, toughness and/or elasticity of semicrystalline polypropylene is to lower the polymer crystallinity by addition of comonomer. However, this results in reduced melting points, and therefore lower thermal resistance and possibly poor pellet quality. It is often desirable for a polyolefin to exhibit good pellet-forming and pellet-stability characteristics to ease use of the polyolefin in processing operations.

Many applications of semicrystalline polyolefins benefit from having useful properties over a broad range of temperatures; consequently, there is a need to provide polyolefins that can maintain desirable characteristics such as high Vicat softening temperature, while maintaining or improving upon the softness and elasticity. In particular, it would be advantageous to provide a propylene-based polymer composition possessing improved softness, toughness, elasticity and clarity, without sacrificing its other desirable properties. Specifically, what is needed is a composition that exhibits excellent softness, toughness and/or elasticity, without sacrificing thermal resistance, clarity and/or pellet quality. A modified semicrystalline polyolefin according to this invention fulfills these needs.

A low melt viscosity (high melt flow rate) is advantageous for almost all polyolefin fabrication processes, because this reduces cycle time or allows for lower temperature and/or energy requirements. Traditional approaches to achieve low melt viscosity are lowering the molecular weight and broadening the molecular weight distribution of the resin. However, both approaches can have detrimental effects on the final physical properties of the polyolefin article due to the presence of low molecular weight polymer. Therefore, what is further needed is a method to improve physical properties, as described above, while simultaneously lowering melt viscosity. Moreover, it would also be advantageous in a fabrication environment be able to continuously vary these parameters to match changing needs, instead of choosing between discrete grades of polyolefin(s) and/or blending different polyolefins which requires great expertise and care to properly control the morphology and final properties of the blend. A modified semicrystalline polyolefin composition according to this invention fulfills these needs.

Addition of a low molecular weight, amorphous substance to a semicrystalline polyolefin is one way to attempt to address the above needs. Some patent disclosures directed to such an end are U.S. Pat. Nos. 3,201,364, 3,415,925, 4,073,782, 4,110,185, 4,132,698, 4,210,570, 4,325,850, 4,960,820, 4,774,277, 5,869,555, 6,465,109, EP 0448259, FR 2094870, and JP 09208761. These disclosures are directed to semicrystalline polyolefins blended with materials such as mineral oils which often contain substantial concentrations of unsaturation, aromatic groups, naphthenic groups, and/or other functional groups. Addition of mineral oils in polyolefin elastomers, which have little to no crystallinity and very high molecular weights, is also well known; see e.g., RUBBER TECHNOLOGY HANDBOOK, Werner Hoffman (Hanser, N.Y., 1989), p. 294-305.

Addition of mineral oils tend to improve the flexibility of a semicrystalline polyolefin, which identifies such compounds as "plasticizers" under the commonly accepted definition; that is, a substance that improves the flexibility, workability, or distensibility of a plastic or elastomer. Mineral oils are also added to polyolefins as extender oils or processing oils, as well as for other purposes. However, use of these additive compounds typically does not preserve the optical properties (e.g., color and/or transparency) or low odor of the polyolefin, among other things. The melting point of the polyolefin is also typically not preserved, which reduces the softening point and upper use temperature of the composition. In addition, such additive compounds often have high pour points (greater than −20° C., or even greater than −10° C.), which results in little or no improvement in low temperature properties or impact toughness of the polyolefin, especially when the glass transition temperature is not lowered.

The addition of mineral oils often translates into a lower melt viscosity and improved processibility of the polyolefin composition. Unfortunately, this often leads to other problems. For example, all or some of the additive can migrate to a surface and evaporate at an unacceptably high rate, which results in deterioration of properties over time. If the flash point is sufficiently low (e.g., less than 200° C.), the compound can cause smoking and be lost to the atmosphere during melt processing. It can also leach out of the polyolefin and impair food, clothing, and other articles that are in contact with the final article made from the polyolefin composition. It can also cause problems with tackiness or other surface properties of the final article. What is needed is a compound which imparts superior low temperature properties while also exhibiting low bloom, migration, leaching, and/or evaporation behaviors.

Another shortcoming of typical additive compounds is that they often contain a high (greater than 5 wt %) degree of functionality due to carbon unsaturation and/or heteroatoms, which tends to make them reactive, thermally unstable, and/or incompatible with polyolefins, among other things. Mineral oils, in particular, consist of thousands of different compounds, many of which are undesirable for use in polyolefins due to molecular weight or chemical composition. Under moderate to high temperatures these compounds can volatilize and oxidize, even with the addition of oxidation inhibitors. They can also lead to problems during melt processing and fabrication steps, including degradation of molecular weight, cross-linking, or discoloration. They may also impart an undesirable odor.

These attributes of common additive compounds like mineral oils limit the performance of the final polyolefin composition, and therefore its usefulness in many applications. As a result, they are not highly desirable for use as modifiers for semicrystalline polyolefins. What is needed is a modifier that does not suffer from these deficiencies. Specifically, what is needed is a modifier that allows the formulation of semicrystalline polyolefin compositions with improved softness, flexibility (lower flexure modulus), and impact toughness especially at low temperatures (below 0° C.), while not materially degrading thermal resistance and with minimal migration of low molecular weight substances to the surface of fabricated articles. Ideally, the modifier has a low pour point, while still of sufficient molecular weight to avoid unacceptable exudation and extraction. It should also not contribute to deterioration of optical properties, color, smell, thermal stability, oxidative stability, and the like. Preferably, the glass transition temperature of the modified polyolefin composition is lower than that of the unmodified polyolefin. Modifiers and modified semicrystalline polyolefin compositions according to this invention fulfill these needs.

It would be particularly desirable to modify semicrystalline propylene-rich polyolefins by addition of a simple, non-reactive compound such as a paraffin liquid. However, it has been taught that addition of aliphatic or paraffinic compounds impairs the properties of polyolefins, and is thus not recommended; see, e.g., CHEMICAL ADDITIVES FOR PLASTICS INDUSTRY (1987, Radian Corp., Noyes Data Corporation, NJ), p. 107-116. Other background references of interest include U.S. Pat. No. 6,639,020 and ADDITIVES FOR PLASTICS, J. Stepek, H. Daoust (Springer Verlag, New York, 1983), p. 6-69.

Examples of semicrystalline propylene-based polyolefins combined with paraffinic liquid plasticizers for non-adhesive applications include the following. However, none of these disclosed compositions speak to a balance of good thermal resistance, softness, toughness and/or elasticity; more specifically, none speak to elasticity as measured by compression or tension set.

U.S. Pat. No. 4,536,537 discloses polypropylene compositions that comprise LLDPE having a density of 0.912 to 0.935 g/cm$^3$ or polybutene and poly-α-olefin liquid having a kinematic viscosity of about 2 cSt to about 6 cSt at 100° F./38° C.; those with viscosity greater than about 2 cSt are reported to "not work" (col 3, ln 12).

WO 98/44041 discloses blend compositions that comprise a chlorine-free polyolefin and poly-α-olefin oligomers having a kinematic viscosity at 100° C. of about 4 cSt to about 8 cSt for a sheet-like structure, especially a floor covering.

WO 2002/18487 and WO 2003/48252 disclose polypropylene compositions that comprise 10 to 30 wt % of vulcanized or unvulcanized polyolefin elastomers, especially EPDM or styrene-ethylene-butene-styrene (SEBS) block-copolymers, and poly-α-olefin oligomers having a kinematic viscosity at 100° C. of about 4 cSt to about 8 cSt.

U.S. Pat. No. 4,645,791, JP 07292167, EP 0315363, and WO 2002/31044 all disclose poly-α-olefin type materials in EPDM compositions.

JP 56095938 discloses polypropylene compositions that comprise olefin oligomer plasticizers mixed with polyolefin granules.

WO 2004/14998 discloses propylene-based polymer compositions that comprise various non-functionalized plasticizers.

Other references of interest include: GB 1329915, JP 01282280, JP 69029554, WO 2001/18109, EP 0300689, EP 1028145.

Certain mineral oils have been classified as Hydrocarbon Basestock Group I, II, or III by the American Petroleum Institute (API) according to the amount of saturates and sulfur they contain and their viscosity indices. Group I basestocks are solvent-refined mineral oils that contain the highest levels of unsaturates and sulfur, and low viscosity indices; they tend to define the bottom tier of lubricant performance. They are the least expensive to produce and currently account for the bulk of the "conventional" basestocks. Groups II and III basestocks are more highly refined (e.g., by hydroprocessing) than Group I basestocks, and often perform better in lubricant applications. Group II and III basestocks contain less unsaturates and sulfur than the Group I basestocks, while Group III basestocks have higher viscosity indices than the Group II basestocks do. Additional API basestock classifications, namely Groups IV and V, are also used in the basestock industry. Rudnick and Shubkin in SYNTHETIC LUBRICANTS AND HIGH-PERFORMANCE FUNCTIONAL FLUIDS, 2nd Ed. (Marcel Dekker, New York, 1999) describe the five basestock Groups as typically being:

Group I—mineral oils refined using solvent extraction of aromatics, solvent dewaxing, hydrofining to reduce sulfur content to produce mineral oils with sulfur levels greater than 0.03 weight %, saturates levels of 60 to 80 weight % and a Viscosity Index (VI) of about 90;

Group II—mildly hydrocracked mineral oils with conventional solvent extraction of aromatics, solvent dewaxing, and more severe hydrofining to reduce sulfur levels to less than or equal to 0.03 weight % as well as removing double bonds from some of the olefinic and aromatic compounds, saturate levels are greater than 95-98 weight % and VI is about 80-120;

Group III—severely hydrotreated mineral oils with saturates levels of some oils virtually 100%, sulfur contents are less than or equal to 0.03 weight % (preferably between 0.001 and 0.01 weight %) and VI is in excess of 120;

Group IV—"polyalphaolefins," which are hydrocarbon liquids manufactured by the catalytic oligomerization of linear alpha-olefins having 6 or more carbon atoms; in practice, however, this Group is generally thought of as synthetic basestock fluids produced by oligomerizing alpha-olefins have 4 or more carbons; and Group V—esters, polyethers, polyalkylene glycols, and includes all other basestocks not included in Groups I, II, III, and IV.

Prior attempts of adding mineral oils to polyolefins to modify properties involve for the most part addition of Group I and Group II mineral oils. Even in cases where the mineral oil is not identified by an API Group classification, such as the case for so-called "process oils," "technical white oils," "food grade oils," etc., such mineral oils are still readily categorized into two classes based on VI alone: those with VI less than 120 (similar to Group I and Group II mineral oils), and those with VI of 120 or greater. Certain aspects of the present invention ideally pertain to substances with a VI of 120 or greater, which excludes Group I and Group II mineral oils and any other mineral oils with VI<120.

SUMMARY OF THE INVENTION

This invention relates to compositions comprising one or more high-melting propylene polymers, one or more low-crystallinity propylene polymers, and one or more non-functionalized plasticizers (NFP). Specifically this invention relates to a composition comprising 1) from 1 to 98 weight % of a first propylene polymer having a melting point of 100° C. or more, 2) from 5 to 98 weight % of a second propylene polymer having a heat of fusion of 70 J/g or less and a tacticity index of 75% or more, and 3) from 0.5 to 75 weight % of a non-functionalized plasticizer ("NFP") having a viscosity index of 120 or more, based upon the weight of the first polymer, second polymer, and the NFP.

In particular, this invention relates to compositions comprising: 1) a first propylene polymer having a melting point of greater than 100° C. (as measured by the DSC method below); 2) a second propylene polymer having a heat of fusion of 70 J/g or less (as measured by the DSC method below) and a tacticity index of 75% or more (as measured by the method below); and 3) a non-functionalized plasticizer, preferably having a viscosity index (VI) of 120 or more (as measured by ASTM D 2270). Alternately the NFP has a specific gravity of 0.85 or less (as measured by ASTM D 4052 15.6/15.6° C.) and a pour point of −20° C. or less (as measured by ASTM D 97). Alternately the NFP has a flash point of 200° C. or more (as measured by ASTM D 92) and a pour point of −10° C. or less and a viscosity index of 120 or more. Alternately the NFP has a flash point of 200° C. or more and a pour point of −20° C. or less. Alternately the NFP has a flash point of 200° C. or more and a kinematic viscosity at 100° C. of 35 cSt or more (as measured by ASTM 445). This invention further relates to articles made from such compositions with improved balance of thermal resistance, softness, toughness and/or elasticity.

This invention further relates to the above compositions wherein the NFP comprises polyalphaolefin oligomers made from $C_5$ to $C_{20}$ olefins. It also relates to the above compositions wherein the NFP comprises $C_{20}$ to $C_{1500}$ linear and/or branched paraffins with little to no sulfur or unsaturation content. It also relates to the above compositions wherein the NFP comprises linear and/or branched paraffins produced by a Gas-to-Liquids process.

DEFINITIONS

For purposes of this invention and the claims thereto, when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers, where copolymers include any polymer having 2 or more chemically distinct monomers. The term copolymer also encompasses interpolymers and block copolymers of 2 or more chemically distinct monomer types.

For purposes of this invention and the claims thereto, the terms polypropylene, propylene polymer, and propylene-based polymer all refer to a polymer comprising at least 50 mol % (preferably at least 60 mol %, more preferably at least 70 mol %, more preferably at least 80 mol %, more preferably at least 90 mol %, even more preferably at least 95 mol % or 100 mol %) propylene units; and having less than 40 mol % ethylene units. Thus, a propylene polymer as it is defined here can not be an EP Rubber as defined below. Furthermore, a propylene-based plastomer is defined to be a propylene polymer with a Shore D hardness of less than 50 and a heat of fusion of less than 60 J/g. As used herein, the term polypropylene composition means a blend comprising at least one polypropylene component.

For purposes of this invention and the claims thereto, an EP Rubber is defined to be a copolymer of ethylene and propylene, and optionally diene monomer(s), where the ethylene content is from 35 to 80 weight %, the diene content is 0 to 15 weight %, and the balance is propylene; and where the copolymer has a Mooney viscosity, ML(1+4) @ 125° C. (measured according to ASTM D1646) of 15 to 100.

For purposes of this invention and the claims thereto, an oligomer is defined to have a number-average molecular weight ($M_n$) of 10,000 g/mol or less as measured using the method specified under Fluid Properties in the Test Methods section below.

For purposes of this invention and the claims thereto, Group I, II, and III basestocks are defined to be mineral oils having the following properties:

| | Saturates (wt %) | Sulfur (wt %) | Viscosity Index |
|---|---|---|---|
| Group I | <90 &/or | >0.03% & | ≧80 & <120 |
| Group II | ≧90 & | ≦0.03% & | ≧80 & <120 |
| Group III | ≧90 & | ≦0.03% & | ≧120 |

Saturates content, sulfur content, and Viscosity Index are measured following ASTM D2007, ASTM D2622, and ASTM D2270, respectively.

For purposes of this invention and the claims thereto, Group IV basestocks are defined to be polyalphaolefins, which are hydrocarbon liquids manufactured by the catalytic polymerization of linear alpha-olefins having 5 or more carbon atoms, preferably 6 or more carbon atoms, preferably 8 or more carbon atoms. The polyalphaolefins may be characterized by any degree of tacticity, including isotacticity or syndiotacticity, and/or may be atactic. In another embodiment the polyalphaolefin has more than 50% meso dyads as measured by $^{13}$C-NMR, preferably more than 60%. In another embodiment the polyalphaolefin has more than 50% racemic dyads as measured by $^{13}$C-NMR, preferably more than 60%.

For purposes of this invention and the claims thereto, the term paraffin includes all isomers such as normal paraffins (n-paraffins), branched paraffins, isoparaffins, cycloparaffins, and may include cyclic aliphatic species, and blends thereof, and may be derived synthetically by means known in the art, or from refined crude oil in such a way as to meet the requirements described for desirable modifiers described herein. The term isoparaffin means that the paraffin chains possess $C_1$ to $C_{18}$ (more commonly $C_1$ to $C_{10}$) alkyl branching along at least a portion of each paraffin chain, and may include cycloparaffins with branched side chains as a minor component. More particularly, isoparaffins are saturated aliphatic hydrocarbons whose molecules have at least one carbon atom bonded to at least three other carbon atoms or at least one side chain (i.e., a molecule having one or more tertiary or quaternary carbon atoms); various isomers of each carbon number (i.e., structural isomers) will typically be present. Isoparaffins may also include cycloparaffins with branched side chains, generally as a minor component of the isoparaffin. Isoparaffins with multiple alkyl branches may include any combination of regio and stereo placement of those branches.

For purposes of the present invention and the claims thereto, the term mineral oil includes any petroleum-based oil; derived from petroleum crude oil that has been subjected to refining steps (such as distillation, solvent processing, hydroprocessing, and/or dewaxing) to achieve the final oil. This also includes petroleum-based oils that are extensively purified and/or modified through severe processing treatments. It excludes synthetic oils, which have been manufactured by combining monomer units using catalysts and/or heat. In the polymer processing art, mineral oils are often called process oils. Characteristics of some commercially available mineral oils used as process oils in polymers are listed in the table below.

Commercial Examples of Mineral Oils

| Grade | KV @ 100° C., cSt | VI | Pour Point, ° C. | Specific gravity | Flash Point, ° C. | APHA Color |
|---|---|---|---|---|---|---|
| Drakeol 34[1] | 9 | 99 | −12 | 0.872 | 254 | 10 |
| Paralux 1001R[2] | 4 | 99 | −17 | 0.849 | 212 | 25 |
| Paralux 2401R[2] | 6 | 101 | −12 | 0.863 | 234 | 45 |
| Paralux 6001R[2] | 12 | 102 | −21 | 0.871 | 274 | 45 |
| Sunpar 120[3] | 6 | 106 | −15 | 0.872 | 228 | >200 |
| Sunpar 150[3] | 11 | 97 | −9 | 0.881 | 245 | >300 |
| Sunpar 2280[3] | 31 | 95 | −9 | 0.899 | 305 | >300 |
| Plastol 135[4] | 5 | 104 | −9 | 0.865 | 210 | 10 |
| Plastol 537[4] | 11 | 97 | −3 | 0.880 | 240 | 10 |
| Plastol 2105[4] | 30 | 110 | −15 | 0.885 | 270 | 10 |
| Flexon 843[4] | 5 | 91 | −12 | 0.869 | 218 | >250 |
| Flexon 865[4] | 11 | 93 | −3 | 0.879 | 252 | >250 |
| Flexon 815[4] | 32 | 101 | −9 | 0.895 | 310 | >300 |
| Shellflex 210[5] | 4 | 95 | −18 | 0.860 | 216 | >200 |
| Shellflex 330[5] | 9 | 95 | −10 | 0.875 | 256 | >250 |
| Shellflex 810[5] | 33 | 95 | −9 | 0.896 | 324 | >300 |

[1] Available commercially from Penreco.
[2] Available commercially from ChevronTexaco.
[3] Available commercially from Sunoco.
[4] Available commercially from ExxonMobil.
[5] Available commercially from Shell.

For purposes of this invention and the claims thereto, when melting or crystallization point is referred to and there is a range of melting or crystallization temperatures, the melting or crystallization point is defined to be the peak melting or crystallization temperature from a differential scanning calorimetry (DSC) trace as described below under Test Methods, and, unless noted otherwise, when there is more than one melting or crystallization peak, it refers to the peak melting or crystallization temperature for the largest peak among principal and secondary melting peaks, as opposed to the peak occurring at the highest temperature, thereby reflecting the largest contribution to the calorimetric response of the material.

DETAILED DESCRIPTION OF THE INVENTION

This invention relates to polypropylene compositions comprising one or more high-melting propylene polymer (HMPP), one or more low-crystallinity propylene polymer (propylene-based plastomer), and one or more non-functionalized plasticizer (NFP). It further relates to articles made from such compositions, including molded, cast, and extruded articles, as well as films and fibers, with improved balance of thermal resistance, softness, toughness and/or elasticity.

Composition

Propylene polymers (e.g. both the HMPP and the propylene based plastomer) are preferably present in the compositions of the present invention at from 40 wt % to 99.9 wt % in one embodiment, and from 50 wt % to 99 wt % in another embodiment, and from 60 wt % to 98 wt % in yet another embodiment, and from 70 wt % to 97 wt % in yet another embodiment, and from 80 wt % to 97 wt % in yet another embodiment, and from 90 wt % to 98 wt % in yet another embodiment, wherein a desirable range may be any combination of any upper wt % limit with any lower wt % limit described herein and the wt % is based on the weight of the NFP and total polymer content of the composition.

In another embodiment, one or more HMPP's may be present at up to 50 wt %, or at 1 to 40 wt % in another embodiment, or at 2 to 30 wt % in another embodiment, or at 3 to 20 wt % in another embodiment, or at 5 to 10 wt % in another embodiment, or at 25 wt % or less in another embodiment, or at 15 wt % or less in another embodiment, or at 5 wt % or less in another embodiment, wherein a desirable range may be any combination of any upper wt % limit with any lower wt % limit described herein and the wt % is based upon the weight of the NFP and total polymer content of the composition. In another embodiment, the blends of this invention comprise from 60 to 99 wt %, preferably from 60 to 90 wt %, preferably from 60 to 85 wt %, preferably from 60 to 75 wt % of one or more HMPP, based upon the weight of the NFP, HMPP and propylene based plastomer.

In another embodiment, one or more low-crystallinity propylene polymers (propylene-based plastomers) are present at 50 to 99.9 wt %, alternately 60 to 99 wt %, alternately 70 to 98 wt %, alternately 80 to 97 wt %, alternately 90 to 96 wt %, and the NFP and any other polymer are present at 50 to 0.1 wt %, alternately 40 to 1 wt %, alternately 30 to 2 wt %, alternately 20 to 3 wt %, alternately 10 to 4 wt %, wherein a desirable range may be any combination of any upper wt % limit with any lower wt % limit described herein and the wt % is based upon the weight of the NFP and total polymer content of the composition.

In another embodiment, the blend comprises: 1) a propylene-based plastomer comprising at least 60 wt % propylene and 2) at least one NFP present at 0.1 to 50 wt %, preferably 0.5 to 45 wt %, more preferably 1 to 40 wt %, more preferably 2 to 35 wt %, more preferably 3 to 30 wt %, more preferably 4 to 25 wt %, more preferably 5 to 20 wt %, more preferably less than 15 wt %, wherein a desirable range may be any combination of any upper wt % limit with any lower wt % limit described herein and the wt % is based upon the weight of the plastomer and the NFP.

In another embodiment, the composition comprises 1) from 1 to 98 weight % (preferably from 5 to 75 weight %) of a first propylene polymer having a melting point of 100° C. or more, 2) from 5 to 98 weight % (preferably from 5 to 75 weight %) of a second propylene polymer having a heat of fusion of 70 J/g or less and a tacticity index of 75% or more, 3) from 0.5 to 75 weight % (preferably from to 60 weight %) of a non-functionalized plasticizer ("NFP") having a viscosity index of 120 or more, based upon the weight of the first polymer, second polymer, and the NFP.

In another embodiment, the compositions of this invention comprise less than 50 wt % (preferably less than 40 wt %, preferably less than 30 wt %, preferably less than 20 wt %, preferably less than 10 wt %, more preferably less than 5 wt %, more preferably less than 1 wt %) of EP Rubber, based upon the total weight of the composition.

In another embodiment, the compositions of this invention comprise less than 10 wt % (preferably less than 5 wt %, preferably less than 3 wt %, preferably less than 2 wt %, preferably less than 1 wt %, more preferably less than 0.5 wt %, more preferably less than 0.1 wt %) of an elastomer, based upon the total weight of the composition.

In another embodiment, the propylene polymers in the present invention comprise 0% diene. In another embodiment the total diene content of all propylene polymers present in the composition is 0%. In another embodiment the propylene polymers comprise less than 30 wt % diene, preferably less than 20 wt %, preferably less than 10 wt %, preferably less than 5 wt % diene, preferably less than 2.5 wt %, preferably less than 1 wt %, based upon the weight of all the propylene polymers.

In another embodiment, the compositions of this invention may further comprise a copolymer or co-oligomer of ethylene and one or more alpha-olefin(s), such as those disclosed in U.S. Pat. No. 6,639,020.

In a another embodiment, the composition comprises less than 40 wt % (preferably less than 30 wt %, preferably less than 20 wt %, preferably less than 10 wt %, preferably less than 5 wt %, preferably less than 1 wt %, preferably 0%, based upon the weight of the composition) of ethylene/alpha-olefin copolymer(s) where the alpha-olefin(s) are chosen from propylene, 1-butene, 1-hexene, and/or 1-octene and the ethylene/alpha-olefin co-oligomer/copolymer is a liquid.

In another embodiment, the compositions of this invention comprise less than 20 wt %, preferably less than 10 wt %, preferably less than 1 wt %, of a liquid homopolymer or copolymer of isoprene and or butadiene having a kinematic viscosity at 40° C. of 10,000 cSt or less, based upon the weight of the composition. In another embodiment, the compositions of this invention comprise less than 20 wt %, preferably less than 10 wt %, preferably less than 1 wt %, of a liquid homopolymer or copolymer of isoprene and or butadiene having a kinematic viscosity at 40° C. between 2,000 cSt and 20 cSt.

In another embodiment, conventional plasticizers such as is commonly used for poly(vinyl chloride) are substantially absent. In particular, plasticizers such as phthalates, adipates, trimellitate esters, polyesters, and other functionalized plasticizers as disclosed in, for example, U.S. Pat. No. 3,318,835; U.S. Pat. No. 4,409,345; WO 02/31044 A1; and PLASTICS ADDITIVES 499-504 (Geoffrey Pritchard, ed., Chapman & Hall 1998) are substantially absent. By "substantially absent", it is meant that these compounds are not added deliberately to the compositions and if present at all, are present at less than 0.5 wt %.

In another embodiment, "naphthenic" mineral oils and "aromatic" mineral oils are substantially absent; i.e., present at less than 0.5 wt % of the inventive composition. In another embodiment, if such oils are present in the composition, the aggregate of such oils is at most 5 wt % of the total NFP in the composition.

Preferred compositions of the present invention can be characterized in that the weight of the modified composition decreases less than 3%, preferably less than 2%, preferably less than 1% when plasticizer permanence is determined by ASTM D1203 (0.25 mm thick sheet, 300 hours in dry 70° C. oven). Weight loss here refers to the reduction in weight in excess of that measured for the unmodified blend of propylene polymers under the same test conditions.

For purposes of this invention and the claims thereto, the amount of NFP in a given composition is determined by the NMR method described in the TEST METHODS section below.

Non-Functionalized Plasticizer

The compositions of the present invention include at least one non-functionalized plasticizer ("NFP"). The classes of materials described herein that are useful as non-functionalized plasticizers can be utilized alone or admixed with other NFP's described herein in order to obtain desired properties. Any NFP useful in the present invention may also be described by any number of, or any combination of, parameters described herein.

Preferably the NFP is a liquid with no distinct melting point above 0° C. and a kinematic viscosity at 25° C. of 30,000 cSt or less.

In one embodiment, the NFP of the present invention is a compound comprising carbon and hydrogen, and does not include to an appreciable extent, functional groups selected from hydroxide, aryls and substituted aryls, halogens, alkoxys, carboxylates, esters, carbon unsaturation, acrylates, oxygen, nitrogen, and carboxyl. In yet another embodiment, aromatic moieties (including any compound whose molecules have the ring structure characteristic of benzene, naphthalene, phenanthrene, anthracene, etc.) are substantially absent from the NFP. By "appreciable extent", it is meant that these groups and compounds comprising these groups are not deliberately added to the NFP, and if present at all, are present at less than 5 wt % by weight of the NFP in one embodiment, more preferably less than 4 weight %, more preferably less than 3 weight %, more preferably less than 2 weight %, more preferably less than 1 weight %, more preferably less than 0.7 weight %, more preferably less than 0.5 weight %, more preferably less than 0.3 weight %, more preferably less than 0.1 weight %, more preferably less than 0.05 weight %, more preferably less than 0.01 weight %, more preferably less than 0.001 weight %, based upon the weight of the NFP. By "substantially absent", it is meant that these compounds are not added deliberately to the compositions and if present at all, are present at less than 0.5 wt %.

In another embodiment, the NFP of the present invention is a hydrocarbon that does not contain olefinic unsaturation to an appreciable extent. By "appreciable extent of olefinic unsaturation" it is meant that the carbons involved in olefinic bonds account for less than 10%, preferably less than 9%, more preferably less than 8%, more preferably less than 7%, more preferably less than 6%, more preferably less than 5%, more preferably less than 4%, more preferably less than 3%, more preferably less than 2%, more preferably less than 1%, more preferably less than 0.7%, more preferably less than 0.5%, more preferably less than 0.3%, more preferably less than 0.1%, more preferably less than 0.05%, more preferably less than 0.01%, more preferably less than 0.001%, of the total number of carbons. In some embodiments, the percent of carbons of the NFP involved in olefinic bonds is between 0.001 and 10% of the total number of carbon atoms in the NFP, preferably between 0.01 and 7%, preferably between 0.1 and 5%, more preferably less than 1%.

In another embodiment, the NFP comprises $C_6$ to $C_{200}$ paraffins (preferably $C_8$ to $C_{100}$ paraffins), where the NFP has a) a specific gravity of 0.85 or less and b) a pour point of $-20°$ C. or less. In another embodiment, the NFP consists essentially of $C_6$ to $C_{200}$ paraffins (preferably the NFP consists essentially of $C_8$ to $C_{100}$ paraffins) where the NFP has a) a specific gravity of 0.85 or less and b) a pour point of $-20°$ C. or less.

In certain embodiments of the present invention, the NFP having a) a specific gravity of 0.85 or less and b) a pour point of $-20°$ C. or less has one or more of the following properties:

1. a distillation range as determined by ASTM D86 having a difference between the upper temperature and the lower temperature of 40° C. or less, preferably 30° C. or less, preferably 20° C. or less, preferably 10° C. or less, preferably between 6 and 40° C.; and/or
2. a final boiling point as determined by ASTM D 86 of from 115° C. to 500° C., preferably from 200° C. to 450° C., preferably from 250° C. to 400° C.; and/or
3. a number average molecular weight (Mn) between 2,000 and 100 g/mol, preferably between 1,500 and 150 g/mol, more preferably between 1,000 and 200 g/mol; and/or
4. a dielectric constant at 20° C. of less than 3.0, preferably less than 2.8, preferably less than 2.5, preferably less than 2.3, preferably less than 2.1; and/or
5. a viscosity (ASTM 445, 25° C.) of from 0.5 to 20 cSt at 25° C.; and/or
6. a glass transition temperature (Tg) determined by ASTM E1356 of less than 0° C., preferably less than $-10°$ C., more preferably less than $-20°$ C., more preferably less than $-30°$ C., more preferably less than $-50°$ C., or most preferably a Tg that can not be determined by ASTM E1356.

In other embodiments, the NFP having a) a specific gravity of 0.85 or less and b) a pour point of $-20°$ C. or less preferably comprises at least 50 wt %, preferably at least 60 wt %, preferably at least 70 wt %, preferably at least 80 wt %, preferably at least 90 wt %, preferably at least 95 wt %, preferably 100 wt % of $C_6$ to $C_{150}$ isoparaffins, preferably $C_6$ to $C_{100}$ isoparaffins, preferably $C_6$ to $C_{25}$ isoparaffins, more preferably $C_8$ to $C_{20}$ isoparaffins. Preferably the density (ASTM 4052, 15.6/15.6° C.) of these isoparaffins ranges from 0.70 to 0.83 g/cm$^3$; the pour point is $-40°$ C. or less, preferably $-50°$ C. or less, the viscosity (ASTM 445, 25° C.) is from 0.5 to 20 cSt at 25° C.; and the number average molecular weights in the range of 100 to 300 g/mol. Suitable isoparaffins are described in, for example, U.S. Pat. Nos. 6,197,285, 3,818,105 and 3,439,088, and are commercially available under the tradename ISOPAR™ (ExxonMobil Chemical), some of which are summarized in the Table below.

| ISOPAR Series Isoparaffins | | | | |
|---|---|---|---|---|
| Name | Distillation range (° C.) | pour point (° C.) | Specific Gravity | Kinematic Visc. @ 25° C. (cSt) | saturates & aromatics (wt %) |
| ISOPAR E | 117-136 | −63 | 0.72 | 0.85 | <0.01 |
| ISOPAR G | 161-176 | −57 | 0.75 | 1.46 | <0.01 |
| ISOPAR H | 178-188 | −63 | 0.76 | 1.80 | <0.01 |
| ISOPAR K | 179-196 | −60 | 0.76 | 1.85 | <0.01 |
| ISOPAR L | 188-207 | −57 | 0.77 | 1.99 | <0.01 |
| ISOPAR M | 223-254 | −57 | 0.79 | 3.80 | <0.01 |
| ISOPAR V | 272-311 | −63 | 0.82 | 14.8 | <0.01 |

Other suitable isoparaffins are also commercial available under the trade names SHELLSOL™ (Royal Dutch/Shell), SOLTROL™ (Chevron Phillips) and SASOL™ (Sasol Limited).

In another embodiment, the isoparaffins are a mixture of branched and normal paraffins having from 6 to 50 carbon atoms, and from 10 to 24 carbon atoms in another embodiment, in the molecule. The isoparaffin composition has a ratio of branch paraffin to n-paraffin ratio (branch paraffin:n-paraffin) ranging from 0.5:1 to 9:1 in one embodiment, and from 1:1 to 4:1 in another embodiment. The isoparaffins of the mixture in this embodiment contain greater than 50 wt % (by total weight of the isoparaffin composition) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like, based on the total weight of isoparaffins in the mixture. In one embodiment, the isoparaffins of the mixture contain greater than 70 wt % of the mono-methyl species, based on the total weight of the isoparaffins in the mixture. The isoparaffinic mixture boils within a range of from 100° C. to 350° C. in one embodiment, and within a range of from 110° C. to 320° C. in another embodiment. In preparing the different grades, the paraffinic mixture is generally fractionated into cuts having narrow boiling ranges, for example, 35° C. boiling ranges. These branch paraffin/n-paraffin blends are described in, for example, U.S. Pat. No. 5,906,727.

In another embodiment, the NFP of the present invention comprises $C_{25}$ to $C_{1500}$ paraffins, and $C_{30}$ to $C_{500}$ paraffins in another embodiment, and has a flash point of 200° C. or more and a pour point of $-10°$ C. or less and a viscosity index of 120 or more. Alternately the NFP comprises $C_{25}$ to $C_{1500}$ paraffins, preferably $C_{30}$ to $C_{500}$ paraffins, and has a flash point of 200° C. or more and a pour point of $-20°$ C. or less. Alternately the NFP comprises $C_{25}$ to $C_{1500}$ paraffins, preferably $C_{30}$ to $C_{500}$ paraffins, and has a flash point of 200° C. or more and a kinematic viscosity at 100° C. of 35 cSt or more. In another embodiment, the NFP consists essentially of $C_{35}$ to $C_{300}$ paraffins, preferably the NFP consists essentially of $C_{40}$ to $C_{250}$ paraffins, and has a flash point of 200° C. or more and a pour point of $-10°$ C. or less and a viscosity index of 120 or more. Alternately the NFP consists essentially of $C_{35}$ to $C_{300}$ paraffins, preferably $C_{40}$ to $C_{250}$ paraffins, and has a flash point of 200° C. or more and a pour point of $-20°$ C. or less. Alternately the NFP consists essentially of $C_{35}$ to $C_{300}$ paraffins, preferably $C_{40}$ to $C_{250}$ paraffins, and has a flash point of 200° C. or more and a kinematic viscosity at 100° C. of 35 cSt or more. Alternately the NFP has a flash point of 200° C. or more and a pour point of −20° C. or less. Alternately the NFP has a flash point of 200° C. or more and a kinematic viscosity at 100° C. of 35 cSt or more.

In another embodiment, the NFP comprises polyalphaolefin (PAO) oligomers of $C_5$ to $C_{20}$ olefins, and oligomers of $C_6$ to $C_{18}$ olefins in another embodiment, and oligomers of $C_6$ to $C_{14}$ olefins in yet another embodiment. In a preferred embodiment the NFP comprises oligomers of $C_8$ to $C_{12}$ 1-olefins. In a more preferred embodiment, the NFP comprises oligomers of linear $C_8$ to $C_{12}$ 1-olefins, and most preferred are oligomers of linear $C_{10}$ 1-olefins. In a preferred embodiment, the NFP comprises oligomers of C8 C10 and C12 1-olefins, preferably 1-octene, 1-decene and 1-dodecene.

In another embodiment the NFP comprises polyalphaolefins (PAO) oligomers of linear olefins having 5 to 18 carbon atoms, more preferably 6 to 12 carbon atoms, more preferably 10 carbon atoms, where an individual PAO or a combination of PAO's has a kinematic viscosity (KV) at 100° C. of 3 cSt or more, preferably 6 cSt or more, preferably 8 cSt or more, preferably 10 cSt or more (as measured by ASTM D445); and preferably having a viscosity index (VI) of 100 or more, preferably 110 or more, more preferably 120 or more, more preferably 130 or more, more preferably 140 or more, preferably 150 or more (as determined by ASTM D2270); and preferably having a pour point of −10° C. or less, more preferably −20° C. or less, more preferably −30° C. or less (as determined by ASTM D97).

In another embodiment, the NFP comprises $C_{20}$ to $C_{1500}$ (preferably $C_{35}$ to $C_{400}$, more preferably $C_{40}$ to $C_{250}$) polyalphaolefin oligomers. The PAO oligomers are preferably dimers, trimers, tetramers, pentamers, etc. of $C_5$ to $C_{14}$ α-olefins in one embodiment, and $C_6$ to $C_{14}$ α-olefins in another embodiment, and $C_8$ to $C_{12}$ α-olefins in another embodiment, and $C_{10}$ α-olefins in another embodiment. Suitable olefins include 1-pentene, 1-hexene, 1-heptene, 1-octene, 1-nonene, 1-decene, 1-undecene and 1-dodecene, and blends thereof. In one embodiment, the olefin is 1-decene, and the NFP is a mixture of dimers, trimers, tetramers and pentamers (and higher) of 1-decene. In another embodiment, the PAO is comprised of oligomers or polymers of 1-octene, 1-decene, and 1-dodecene. Preferred PAO's are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999). The PAO oligomers or polymers useful in the present invention may be characterized by any degree of tacticity, including isotacticity or syndiotacticity, and may be atactic. In another embodiment the polyalphaolefin has more than 50% meso dyads as measured by $^{13}$Carbon NMR, preferably more than 60%. In another embodiment the polyalphaolefin has more than 50% racemic dyads as measured by $^{13}$Carbon NMR, preferably more than 60%.

PAO's useful in the present invention typically possess a number average molecular weight of from 300 to 21,000 g/mol in one embodiment, from 400 to 20,000 g/mol in another embodiment, from 500 to 10,000 g/mol in another embodiment, from 500 to 5,000 g/mol in another embodiment, from 600 to 3,000 g/mol in another embodiment, and from 500 to 1,500 g/mol in yet another embodiment. Preferred PAO's have kinematic viscosities at 100° C. in the range of 3 to 3000 cSt in one embodiment, from 4 to 3000 cSt in another embodiment, from 6 to 300 cSt in another embodiment, and from 8 to 100 cSt in another embodiment, and 10 cSt or greater in another embodiment; and have pour points of less than −10° C. in one embodiment, and less than −20° C. in another embodiment, and less than −25° C. in another embodiment, and less than −30° C. in another embodiment, and less than −35° C. in another embodiment, and less than −40° C. in yet another embodiment. Desirable PAO's are commercially available as SpectraSyn™ and SpectraSyn Ultra™ (ExxonMobil Chemical, previously sold under the SHF and SuperSyn™ tradenames), some of which are summarized in the Table below.

| SpectraSyn ™ Series Polyalphaolefins | | | | | |
|---|---|---|---|---|---|
| PAO | KV @100° C., cSt | VI | Pour Point, ° C. | Specific gravity | Flash Point, ° C. | APHA Color |
| SpectraSyn 4 | 4 | 126 | −66 | 0.820 | 220 | 10 |
| SpectraSyn 6 | 6 | 138 | −57 | 0.827 | 246 | 10 |
| SpectraSyn 8 | 8 | 139 | −48 | 0.833 | 260 | 10 |
| SpectraSyn 10 | 10 | 137 | −48 | 0.835 | 266 | 10 |
| SpectraSyn 40 | 39 | 147 | −36 | 0.850 | 281 | 10 |
| SpectraSyn 100 | 100 | 170 | −30 | 0.853 | 283 | 60 |
| SpectraSyn Ultra 150 | 150 | 218 | −33 | 0.850 | >265 | 10 |
| SpectraSyn Ultra 300 | 300 | 241 | −27 | 0.852 | >265 | 20 |
| SpectraSyn Ultra 1000 | 1,000 | 307 | −18 | 0.855 | >265 | 30 |

Other useful PAO's include those sold under the tradenames Synfluid™ available from ChevronPhillips Chemical Company (Pasedena, Tex.), Durasyn™ available from BP Amoco Chemicals (London, England), Nexbase™ available from Fortum Corporation (Keilaniemi, Finland), and Synton™ available from Crompton Corporation (Middlebury, Conn.).

In other embodiments the PAO's have a kinematic viscosity at 100° C. of 3 cSt or more, preferably 6 cSt or more, preferably 8 cSt or more, preferably 10 cSt or more, preferably 20 cSt or more, preferably 300 cSt or less, preferably 100 cSt or less. In another embodiment the PAO's have a kinematic viscosity at 100° C. of between 3 and 1000 cSt, preferably between 6 and 300 cSt, preferably between 8 and 100 cSt, preferably between 8 and 40 cSt.

In other embodiments the PAO's have a Viscosity Index of 100 or more, preferably 110 or more, preferably 120 or more, preferably 130 or more, preferably 140 or more, preferably 150 or more, preferably 170 or more, preferably 200 or more, preferably 250 or more.

In other embodiments the PAO's have a pour point of −10° C. or less, preferably −20° C. or less, preferably −25° C. or less, preferably −30° C. or less, preferably −35° C. or less, preferably −40° C. or less, preferably −50° C. or less.

In other embodiments the PAO's have a flash point of 200° C. or more, preferably 210° C. or more, preferably 220° C. or more, preferably 230° C. or more, preferably between 240° C. and 290° C.

Particularly preferred PAO's for use herein are those having a) a flash point of 200° C. or more (preferably 210° C. or more, preferably 220° C. or more, preferably 230° C. or more); and b) a pour point less than −20° C. (preferably less than −25° C., preferably less than −30° C., preferably less than −35°, preferably less than −40° C.) or a kinematic viscosity at 100° C. of 35 cSt or more (preferably 40 cSt or more, preferably 50 cSt or more, preferably 60 cSt or more).

In another embodiment, the NFP is a high purity hydrocarbon fluid with a branched paraffin: normal paraffin ratio ranging from about 0.5:1 to 9:1, preferably from about 1:1 to 4:1. The branched paraffins of the mixture contain greater than 50 wt % (based on the total weight of the branched paraffins) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like; preferably, greater than 70 wt % of the branched paraffins are mono-methyl species. The paraffin mixture has a number-average molecular weight in the range of 280 to 7000 g/mol, preferably 420 to 5600 g/mol, preferably 560 to 2800 g/mol, preferably 350 to 2100 g/mol, preferably 420 to 1400 g/mol, more preferably 280 to 980 g/mol; has a kinematic viscosity at 100° C. ranging from 3 to 500 cSt, preferably 6 to 200 cSt, preferably 8 to 100 cSt, more preferably 6 to 25 cSt, more preferably 3 to 25 cSt, more preferably 3 to 15 cSt; and boils within a range of from 100 to 350° C., preferably within a range of from 110 to 320° C., preferably within a range of 150 to 300° C. In a preferred embodiment, the paraffinic mixture is derived from a Fischer-Tropsch process. These branch paraffin/n-paraffin blends are described in, for example, U.S. Pat. No. 5,906,727.

In another embodiment, the NFP comprises paraffinic hydrocarbons having:
1. a number average molecular weight of 300 to 10,000 g/mol, preferably 400 to 5,000 g/mol, preferably 500 to 2,500 g/mol, preferably 300 to 1,200 g/mol;
2. less than 10% of sidechains with 4 or more carbons, preferably less than 8%, preferably less than 5%, preferably less than 3%, preferably less than 2%, preferably less than 1%, preferably less than 0.5%, preferably less than 0.1%;
3. at least 15% of sidechains with 1 or 2 carbons, preferably 20% or more, preferably 25% or more, preferably 30% or more, preferably 35% or more, preferably 40% or more, preferably 45% or more, preferably 50% or more;
4. less than 2.5 wt % cyclic paraffins (based on the total weight of paraffins in the mixture), preferably less than 2 wt %, preferably less than 1 wt %, preferably less than 0.5 wt %, preferably less than 0.1 wt %, preferably at less than 0.1 wt %, preferably at 0.001 wt %;
5. a kinematic viscosity at 100° C. of 3 cSt or more, preferably 6 cSt or more, preferably 8 cSt or more, preferably between 3 and 25 cSt; and
6. a viscosity index (VI) of 110 or more, preferably 120 or more, preferably 130 or more, preferably 140 or more, preferably 150 or more, preferably 180 or more, preferably 200 or more, preferably 250 or more, preferably 300 or more;
7. a pour point of −10° C. or less, preferably −20° C. or less; and
8. a flash point of 200° C. or more, preferably 210° C. or more, preferably 220° C. or more.

In another embodiment, the NFP comprises a wax isomerate lubricant oil basestock, which includes hydroisomerized waxy stocks (e.g. waxy stocks such as gas oils, slack waxes, fuels hydrocracker bottoms, etc.), hydroisomerized Fischer-Tropsch hydrocarbons and waxes, Gas-to-Liquids (GTL) base stocks and base oils, and other waxy feedstock derived hydroisomerized base stocks and base oils, or mixtures thereof. Fischer-Tropsch waxes, the high boiling point residues of Fischer-Tropsch synthesis, are highly paraffinic hydrocarbons with very low sulfur content, and are often preferred feedstocks in processes to make hydrocarbon fluids of lubricating viscosity.

The hydroprocessing used for the production of such base stocks may use an amorphous hydrocracking/hydroisomerization catalyst, such as one of the specialized lube hydrocracking catalysts or a crystalline hydrocracking/hydroisomerization catalyst, preferably a zeolitic catalyst. For example, one useful catalyst is ZSM-48 as described in U.S. Pat. No. 5,075,269. Processes for making hydrocracked/hydroisomerized distillates and hydrocracked/hydroisomerized waxes are described, for example, in U.S. Pat. Nos. 2,817,693; 4,975,177; 4,921,594 and 4,897,178 as well as in British Patent Nos. 1,429,494; 1,350,257; 1,440,230 and 1,390,359. Particularly favorable processes are described in European Patent Application Nos. 464546 and 464547. Processes using Fischer-Tropsch wax feeds are described in U.S. Pat. Nos. 4,594,172 and 4,943,672.

Gas-to-Liquids (GTL) base stocks and base oils, Fischer-Tropsch hydrocarbon derived base stocks and base oils, and other waxy feedstock derived base stocks and base oils (or wax isomerates) that can be advantageously used in the present invention have kinematic viscosities at 100° C. of about 3 cSt to about 500 cSt, preferably about 6 cSt to about 200 cSt, preferably about 8 cSt to about 100 cSt, more preferably about 3 cSt to about 25 cSt. These Gas-to-Liquids (GTL) base stocks and base oils, Fischer-Tropsch hydrocarbon derived base stocks and base oils, and other waxy feedstock derived base stocks and base oils (or wax isomerates) have low pour points (preferably less than −10° C., preferably about −15° C. or lower, preferably about −25° C. or lower, preferably −30° C. to about −40° C. or lower); have a high viscosity index (preferably 110 or greater, preferably 120 or greater, preferably 130 or greater, preferably 150 or greater); and are of high purity (high saturates levels (preferably 90 wt % or more, preferably 95 wt % or more, preferably 99 wt % or more), low-to-nil sulfur content (preferably 0.03 weight % or less), low-to-nil nitrogen content (preferably 0.05 wt % or less), low-to-nil aromatics content (preferably 0.05 wt % or less), low bromine number (preferably 1 or less), low iodine number (preferably 1 or less), and high aniline point (preferably 120° C. or more). Useful compositions of Gas-to-Liquids (GTL) base stocks and base oils, Fischer-Tropsch hydrocarbon derived base stocks and base oils, and wax isomerate hydroisomerized base stocks and base oils are recited in U.S. Pat. Nos. 6,080,301; 6,090,989, and 6,165,949 for example, and are incorporated herein in their entirety by reference.

In a preferred embodiment, the NFP of the present invention comprises a GTL-derived base-stock or base-oil that has a kinematic viscosity at 100° C. of 3 to 500 cSt, preferably 6 to 200 cSt, preferably 8 to 100 cSt, more preferably 3 to 25 cSt; and/or a number average molecular weight ($M_n$) of 300 to 10,000 g/mol, preferably 400 to 5,000 g/mol, preferably 500 to 2,500 g/mol, more preferably 300 to 1,200 g/mol.

In another embodiment, the NFP comprises a Group III hydrocarbon oil (also called a lubricant basestock), which is a special class of mineral oils that is severely hydrotreated. Preferably the NFP has a saturates levels of 90% or more, preferably 92% or more, preferably 94% or more, preferably 95% or more, and sulfur contents less than 0.03%, preferably between 0.001 and 0.01%, and VI of 120 or more, preferably 130 or more. Preferably the Group III hydrocarbon oil has a kinematic viscosity at 100° C. of 3 to 100, preferably 4 to 100 cSt, preferably 6 to 50 cSt, preferably 8 to 20; and/or a number average molecular weight of 300 to 5,000 g/mol, preferably 400 to 2,000 g/mol, more preferably 500 to 1,000 g/mol. Preferably the Group III hydrocarbon oil has a pour point of −10° C. or less, and a flash point of 200° C. or more.

In some embodiments, the NFP comprises a low molecular weight of $C_4$ olefins (including n-butene, 2-butene, isobutylene, and butadiene, and mixtures thereof). Such a material is referred to as a "polybutenes" liquid when the oligomers comprise isobutylene and/or 1-butene and/or 2-butene. It is commonly used as an additive for polyolefins; e.g. to introduce tack or as a processing aid. The ratio of $C_4$ olefin isomers can vary by manufacturer and by grade, and the material may or may not be hydrogenated after synthesis. In some cases, the polybutenes liquid is a polymer of a $C_4$ raffinate stream. In other cases, it consists essentially of polyisobutylene or poly (n-butene) oligomers. Typically, the polybutenes liquid has a number-average molecular weight of less than 15,000 g/mol, and commonly less than 5,000 g/mol or even less than 1,000 g/mol. They are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999). Commercial sources of polybutenes include BP (Indopol grades) and Infineum (C-Series grades). When the $C_4$ olefin is exclusively isobutylene, the material is referred to as "polyisobutylene" or PIB. Commercial sources of PIB include Texas Petrochemical (TPC Enhanced PIB grades). When the $C_4$ olefin is exclusively 1-butene, the material is referred to as "poly-n-butene" or PNB. Properties of some liquids made from $C_4$ olefin(s) are summarized in the Table below. Note that grades with a flash point of 200° C. or more also have a pour point greater than −10° C. and/or a VI less than 120. Preferably, the NFP is not a polybutenes liquid.

Commercial Examples of Oligomers of $C_4$ olefin(s)

| Grade | KV @ 100° C., cSt | VI | Pour Point, ° C. | Specific gravity | Flash Point, ° C. |
|---|---|---|---|---|---|
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | 3 | 0.903 | 230 |
| BP Indopol H-25 | 52 | 87 | −23 | 0.869 | ~150 |
| BP Indopol H-50 | 108 | 90 | −13 | 0.884 | ~190 |
| BP Indopol H-100 | 218 | 121 | −7 | 0.893 | ~210 |
| Infineum C9945 | 11 | 74* | −34 | 0.854 | 170 |
| Infineum C9907 | 78 | 103* | −15 | 0.878 | 204 |
| Infineum C9995 | 230 | 131* | −7 | 0.888 | 212 |
| Infineum C9913 | 630 | 174* | 10 | 0.888 | 240 |

*Estimated based on the kinematic viscosity at 100° C. and 38° C.

In another embodiment, when a NFP is present, an oligomer or polymer of $C_4$ olefin(s) (including all isomers, e.g. n-butene, 2-butene, isobutylene, and butadiene, and mixtures thereof) may be present in the composition. In a preferred embodiment, the composition comprises less than 50 wt % (preferably less than 40%, preferably less than 30 wt %, preferably less than 20 wt %, more preferably less than 10 wt %, more preferably less than 5 wt %, more preferably less than 1 wt %, preferably 0 wt %) polymer or oligomer of $C_4$ olefin(s) such as PIB, polybutene, or PNB, based upon the weight of the composition.

In a preferred embodiment, the NFP contains less than 90 weight % of $C_4$ olefin(s), preferably isobutylene, based upon the weight of the NFP. Preferably the NFP contains less than 80 weight %, preferably less than 70 wt %, preferably less than 60 wt %, preferably less than 50 wt %, preferably less than 40 wt %, preferably less than 30 wt %, preferably less than 20 wt %, preferably less than 10 wt %, preferably 5 wt %, preferably less than 2%, preferably less than 1 wt %, preferably 0 wt % of $C_4$ olefin(s), preferably isobutylene, based upon the weight of the NFP.

In another embodiment, any NFP described herein has a pour point (ASTM D97) of less than −10° C. in one embodiment, less than −20° C. in another embodiment, less than −25° C. in yet another embodiment, less than −30° C. in yet another embodiment, less than −35° C. in yet another embodiment, less than −40° C. in yet another embodiment, less than −45° C. in yet another embodiment, less than −50° C. in yet another embodiment, and less than −60° C. in yet another embodiment, and greater than −120° C. in yet another embodiment, wherein a desirable range may include any upper pour point limit with any lower pour point limit described herein.

In another embodiment, any NFP described herein has a Viscosity Index (VI, ASTM D2270) of 100 or more, preferably 105 or more, more preferably 110 or more, more preferably 115 or more, more preferably 120 or more, more preferably 125 or more, more preferably 130 or more, more preferably 150 or more. In another embodiment the NFP has a VI between 100 and 300, preferably between 120 and 180.

In another embodiment, any NFP described herein has a kinematic viscosity at 100° C. ($KV_{100}$, ASTM D445) of from 3 to 3000 cSt, and from 6 to 300 cSt in another embodiment, and from 6 to 200 cSt in another embodiment, and from 8 to 100 cSt in yet another embodiment, and from 4 to 50 cSt in yet another embodiment, and less than 50 cSt in yet another embodiment, and less than 25 cSt in yet another embodiment, wherein a desirable range may comprise any upper viscosity limit with any lower viscosity limit described herein. In other embodiments, the NFP has a kinematic viscosity at 100° C. of less than 2 cSt.

In another embodiment, any NFP described herein has a flash point (ASTM D92) of 200° C. or more, preferably 210° C. or more, preferably 220° C. or more, preferably 230° C. or more, preferably 240° C. or more, preferably 245° C. or more, preferably 250° C. or more, preferably 260° C. or more, preferably 270° C. or more, preferably 280° C. or more. In another embodiment the NFP has a flash point between 200° C. and 300° C., preferably between 220° C. and 280° C. In other embodiments, the NFP has a flash point between 100° C. and 200° C.

In another embodiment, any NFP described herein has a dielectric constant measured at 20° C. of less than 3.0 in one embodiment, and less than 2.8 in another embodiment, less than 2.5 in another embodiment, and less than 2.3 in yet another embodiment, and less than 2.1 in yet another embodiment. Polyethylene itself has a dielectric constant (1 kHz, 23° C.) of at least 2.3 according to the CRC HANDBOOK OF CHEMISTRY AND PHYSICS (David R. Lide, ed. $82^d$ ed. CRC Press 2001).

In another embodiment, any NFP described herein has a specific gravity (ASTM D4052, 15.6/15.6° C.) of less than 0.86 in one embodiment, and less than 0.85 in another embodiment, and less than 0.84 in another embodiment, and less than 0.83 in another embodiment, and from 0.80 to 0.86 in another embodiment, and from 0.81 to 0.85 in another embodiment, and from 0.82 to 0.84 in another embodiment, wherein a desirable range may comprise any upper specific gravity limit with any lower specific gravity limit described herein.

In other embodiments, any NFP described herein may have an initial boiling point (ASTM D1160) of from 300° C. to 600° C. in one embodiment, and from 350° C. to 500° C. in another embodiment, and greater than 400° C. in yet another embodiment.

In other embodiments any NFP described herein may have a low degree of color, such as typically identified as "water white", "prime white", "standard white", or "bright and clear," preferably an APHA color of 100 or less, preferably 80 or less, preferably 60 or less, preferably 40 or less, preferably 20 or less, as determined by ASTM D1209.

Any NFP described herein preferably has a number-average molecular weight ($M_n$) of 21,000 g/mol or less in one embodiment, preferably 20,000 g/mol or less, preferably 19,000 g/mol or less, preferably 18,000 g/mol or less, preferably 16,000 g/mol or less, preferably 15,000 g/mol or less, preferably 13,000 g/mol or less and 10,000 g/mol or less in yet another embodiment, and 5,000 g/mol or less in yet another embodiment, and 3,000 g/mol or less in yet another embodiment, and 2,000 g/mol or less in yet another embodiment, and 1500 g/mol or less in yet another embodiment, and 1,000 g/mol or less in yet another embodiment, and 900 g/mol or less in yet another embodiment, and 800 g/mol or less in yet another embodiment, and 700 g/mol or less in yet another embodiment, and 600 g/mol or less in yet another embodiment, and 500 g/mol or less in yet another embodiment. Preferred minimum $M_n$ is at least 200 g/mol, preferably at least 300 g/mol. Further a desirable molecular weight range can be any combination of any upper molecular weight limit with any lower molecular weight limit described above. $M_n$ is determined according to the methods specified under Fluid Properties in the Test Methods section below.

Any of the NFP's may also be described by any number of, or any combination of, parameters described herein.

In a preferred embodiment, any NFP described herein has a flash point of 200° C. or more (preferably 210° C. or more) and a pour point of −20° C. or less (preferably −25° C. or less, more preferably −30° C. or less, more preferably −35° C. or less, more preferably −45° C. or less, more preferably −50° C. or less).

In another preferred embodiment, the NFP has a flash point of 220° C. or more (preferably 230° C. or more) and a pour point of −10° C. or less (preferably −25° C. or less, more preferably −30° C. or less, more preferably −35° C. or less, more preferably −45° C. or less, more preferably −50° C. or less).

In another preferred embodiment, the NFP has a kinematic viscosity at 100° C. of 35 cSt or more (preferably 40 cSt or more, preferably 50 cSt or more, preferably 60 cSt or more) and a specific gravity (15.6/15.6° C.) of 0.87 or less (preferably 0.865 or less, preferably 0.86 or less, preferably 0.855 or less) and a flash point of 200° C. or more (preferably 230° C. or more).

In another preferred embodiment, the NFP has a) a flash point of 200° C. or more, b) a specific gravity of 0.86 or less, and c1) a pour point of −10° C. or less and a viscosity index of 120 or more, or c2) a pour point of −20° C. or less, or c3) a kinematic viscosity at 100° C. of 35 cSt or more.

In another preferred embodiment, the NFP has a specific gravity (15.6/15.6° C.) of 0.85 or less (preferably between 0.80 and 0.85) and a kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or a number-average molecular weight ($M_n$) of at least 280 g/mol.

In another preferred embodiment, the NFP has a specific gravity (15.6/15.6° C.) of 0.86 or less (preferably between 0.81 and 0.855, preferably between 0.82 and 0.85) and a kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more) and/or a number-average molecular weight ($M_n$) of at least 420 g/mol.

In another preferred embodiment, the NFP has a specific gravity (15.6/15.6° C.) of 0.87 or less (preferably between 0.82 and 0.87) and a kinematic viscosity at 100° C. of 10 cSt or more (preferably 12 cSt or more, preferably 14 cSt or more, preferably 16 cSt or more, preferably 20 cSt or more, preferably 30 cSt or more, preferably 40 cSt or more) and/or a number-average molecular weight ($M_n$) of at least 700 g/mol.

In another preferred embodiment, the NFP has a specific gravity (15.6/15.6° C.) of 0.88 or less (preferably 0.87 or less, preferably between 0.82 and 0.87) and a kinematic viscosity at 100° C. of 15 cSt or more (preferably 20 cSt or more, preferably 25 cSt or more, preferably 30 cSt or more, preferably 40 cSt or more) and/or a number-average molecular weight ($M_n$) of at least 840 g/mol.

In another preferred embodiment the NFP has a kinematic viscosity at 100° C. of 3 to 3000 cSt, preferably 6 to 300 cSt, more preferably 8 to 100 cSt; and a number average molecular weight ($M_n$) of 300 to 21,000 g/mol, preferably 500 to 5,000 g/mol, more preferably 600 to 3,000 g/mol.

In another preferred embodiment the NFP has a kinematic viscosity at 100° C. of 3 to 500 cSt, preferably 6 to 200 cSt, more preferably 8 to 100 cSt, more preferably 3 to 25 cSt; and a number average molecular weight ($M_n$) of 300 to 10,000 g/mol, preferably 400 to 5,000 g/mol, more preferably 500 to 2,500 g/mol, more preferably 300 to 1,200 g/mol.

In another preferred embodiment the NFP has a kinematic viscosity at 100° C. of 3 to 100 cSt, preferably 4 to 50 cSt, more preferably 6 to 25 cSt, more preferably 3 to 15 cSt; and a number average molecular weight ($M_n$) of 300 to 3,000 g/mol, preferably 350 to 2,000 g/mol, more preferably 400 to 1,000 g/mol, more preferably 300 to 800 g/mol.

In another preferred embodiment, the NFP has a pour point of −25° C. or less, preferably between −30° C. and −90° C., and a kinematic viscosity in the range of from 20 to 5000 cSt at 40° C. In another preferred embodiment, the NFP has a pour point of −25° C. or less and a Mn of 400 g/mol or greater. Most mineral oils, which typically include functional groups, have a pour point of from 10° C. to −25° C. at the same viscosity and molecular weight ranges.

In another preferred embodiment the NFP has kinematic viscosity at 100° C. of 3 cSt or greater, preferably 6 cSt or greater, more preferably 8 cSt or greater, and one or more of the following properties:

1. a pour point of −10° C. or less, preferably −20° C. or less, preferably −30° C. or less, preferably −40° C. or less; and/or,
2. a Viscosity Index of 120 or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less as determined by ASTM D1209; and/or
4. a flash point of 200° C. or more, preferably 220° C. or more, preferably 240° C. or more; and/or
5. a specific gravity (15.6° C.) of less than 0.86.

Most mineral oils at the same viscosity range have a pour point greater than −20° C. or an APHA color of greater than 20 or a specific gravity (15.6° C.) of 0.86 or more.

In another preferred embodiment, the NFP has a Viscosity Index of 120 or more and one or more of the following properties:

1. a pour point of −10° C. or less, preferably −20° C. or less, preferably −30° C. or less, preferably −40° C. or less; and/or,
2. a kinematic viscosity at 100° C. of 3 cSt or greater, preferably 6 cSt or greater, preferably 8 cSt or greater, preferably 10 cSt or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less, as determined by ASTM D1209; and/or
4. a flash point of 200° C. or more, preferably 220° C. or more, preferably 240° C. or more; and/or
5. a specific gravity 15.6° C.) of less than 0.86.

Most Mineral Oils Have a Viscosity Index of Less than 120.

In another preferred embodiment, the NFP has a pour point of −20° C. or less, preferably −30° C. or less, and one or more of the following properties:
1. a kinematic viscosity at 100° C. of 3 cSt or greater, preferably 6 cSt or greater, preferably 8 cSt or greater, preferably 10 cSt or more; and/or,
2. a Viscosity Index of 120 or greater, preferably 130 or greater; and/or,
3. a low degree of color, such as typically identified as "water white", "prime white", "standard white", or "bright and clear," preferably APHA color of 100 or less, preferably 80 or less, preferably 60 or less, preferably 40 or less, preferably 20 or less, preferably 15 or less as determined by ASTM D1209
4. a flash point of 200° C. or more, preferably 220° C. or more, preferably 240° C. or more; and/or
5. a specific gravity (15.6° C.) of less than 0.86.

Most mineral oils have a kinematic viscosity at 100° C. of less than 6 cSt, or an APHA color of greater than 20, or a flash point less than 200° C. when their pour point is less than −20° C.

In another preferred embodiment the NFP has a glass transition temperature ($T_g$) that cannot be determined by ASTM E1356 or, if it can be determined, then the $T_g$ according to ASTM E1356 is less than 0° C., preferably less than −10° C., more preferably less than −20° C., more preferably less than −30° C., more preferably less than −40° C., and, preferably, also has one or more of the following properties:
1. an initial boiling point as determined by ASTM D1160 greater than 300° C., preferably greater than 350° C., preferably greater than 400° C.; and/or
2. a pour point of −10° C. or less, preferably −15° C. or less, preferably −25° C. or less, preferably −35° C. or less, preferably −45° C. or less; and/or
3. a specific gravity (ASTM D4052, 15.6/15.6° C.) of less than 0.88, preferably less than 0.86, preferably less than 0.84, preferably from 0.80 to 0.88, preferably from 0.82 to 0.86; and/or
4. a final boiling point as determined by ASTM D1160 of from 300° C. to 800° C., preferably from 400° C. to 700° C., preferably greater than 500° C.; and/or
5. a weight average molecular weight ($M_w$) between 30,000 and 400 g/mol preferably between 15,000 and 500 g/mol, more preferably between 5,000 and 600 g/mol; and/or
6. a number average molecular weight ($M_n$) between 10,000 and 400 g/mol, preferably between 5,000 and 500 g/mol, more preferably between 2,000 and 600 g/mol; and/or
7. a flash point as measured by ASTM D92 of 200° C. or greater, and/or
8. a dielectric constant at 20° C. of less than 3.0, preferably less than 2.8, preferably less than 2.5, preferably less than 2.3, preferably less than 2.2.

Preferred compositions of the present invention can be characterized in that the glass transition temperature ($T_g$) of any propylene polymer in the composition decreases by at least 2° C. for every 4 wt % of NFP present in the composition in one embodiment; and decreases by at least 3° C. for every 4 wt % of NFP present in the composition in another embodiment; and decreases from at least 4 to 10° C. for every 4 wt % of NFP present in the composition in yet another embodiment, while the peak melting and crystallization temperatures of the highest melting propylene polymer component remain constant (within 1 to 2° C.). For purpose of this invention and the claims thereto, when glass transition temperature is referred to, it is the peak temperature in the dynamic mechanical thermal analysis (DMTA) trace.

Preferred compositions of the present invention can be characterized in that the glass transition temperature ($T_g$) of at least one propylene polymer in the composition decreases by at least 2° C. for every 1 wt % of NFP present in the composition in one embodiment; preferably by at least 3° C., preferably by at least 4° C., preferably by at least 5° C., preferably by at least 6° C., preferably by at least 7° C., preferably by at least 8° C., preferably by at least 9° C., preferably by at least 10° C., preferably by at least 11° C.; preferably while the peak melting and or crystallization temperatures of the highest melting propylene polymer remain within 1 to 5° C. of the plasticized polyolefin, preferably within 1 to 4° C., preferably within 1 to 3° C., preferably within 1 to 2° C.

Preferred compositions of the present invention can be characterized in that the glass transition temperature ($T_g$) of at least one propylene polymer in the plasticized composition is at least 2° C. lower than that of the neat propylene polymer, preferably at least 4° C. lower, preferably at least 6° C. lower, preferably at least 8° C. lower, preferably at least 10° C. lower, preferably at least 15° C. lower, preferably at least 20° C. lower, preferably at least 25° C. lower, preferably at least 30° C. lower, preferably at least 35° C. lower, preferably at least 40° C. lower, preferably at least 45° C. lower.

High-melting Propylene Polymer

For purposes of this invention, a high-melting propylene polymer (HMPP) is defined to be a propylene polymer having a peak melting point of more than 100° C. (preferably more than 110° C., preferably more than 120° C., preferably more than 130° C., preferably more than 140° C., preferably more than 150° C.), preferably having a Melt Flow Rate of 0.1 to 2000 dg/min (preferably 100 dg/min or less). A preferred HMPP has a percent crystallinity of greater than 35%, preferably greater than 40%, preferably greater than 45%, preferably greater than 50%.

In a preferred embodiment, the blends of this invention comprise one or more HMPP's, each HMPP comprising propylene and preferably from 0 to 5 weight % alpha-olefin comonomer (based upon the weight of the polymer), preferably from 0.1 to 4 weight %, preferably from 0.25 to 3 weight %. Preferably the alpha olefin comonomer is a C2 to C10 alpha olefin, preferably selected from the group consisting of ethylene, butene, pentene, hexene, heptene, octene, nonene, and decene, preferably ethylene, butene, hexene, and octene, preferably ethylene. (For purposes of this invention when a copolymer is described as comprising propylene and one or more C2 to C10 olefins, or alpha olefins, the C2 to C10 olefins or alpha olefins do not include C3 e.g. propylene.)

Preferred HMPP's have a melting point (Tm—second melt as measured by DSC as described herein) between 105 and 170° C., preferably between 110 and 170° C., preferably between 125 and 170° C.

Preferred HMPP's have a melt flow rate of from 0.1 to 200 dg/min, preferably 0.25 to 100 dg/min, preferably from 0.5 to 50 dg/min, preferably 0.5 to 20 dg/min, preferably 1 to 20 dg/min (ASTM 1238-D, 2.16 kg, 230° C.).

Preferred HMPP's have an Elongation at Break of 700% or less, preferably 300 to 700%, as measured by ASTM D 638, 2 in/min/50 mm/min on a 0.125 in (3.18 mm) thick injection molded sample).

Preferred HMPP's have a 1° Secant Flexural Modulus of from 100,000 psi to 250,000 psi (690 to 1720 MPa), preferably from 150,000 psi to 250,000 psi (1035 to 1720 MPa) as measured by ASTM D-790A (0.05 in/min/1.3 mm/min).

"High-crystallinity polypropylenes," e.g. those having values above 250,000 psi (1720 MPa) can also be used as HMPP's in this invention.

Any propylene polymer having 0 to 5 weight % comonomer, a melting point between 100 and 170, and an MFR of 200 dg/min or less may be used in the practice of this invention as an HMPP. Suitable examples include polymers produced by Ziegler-Natta catalyst systems, metallocene systems, and the like. The polymers may be produced by any means including solution, slurry, gas phase, supercritical or high pressure. In a particularly preferred embodiment the HMPP's useful herein have a molecular weight distribution (Mw/Mn) of 5 or less preferably between 1.5 and 4 preferably between 1.5 and 3. In another preferred embodiment, preferred HMPP's useful herein include those produced by metallocene catalyst systems. In another embodiment preferred HMPP's useful herein include those having a composition distribution breadth index (CDBI) of 60% or more, preferably 70% or more, preferably 80% or more, preferably 90% or more. (CDBI is measured as described in WO 93/03093, with the modification that any fractions having a weight average molecular weight (Mw) below 25,000 g/mol are disregarded.) Preferred HMPP's that can be used in the practice of this invention include those propylene polymers sold by Exxon-Mobil Chemical Company under the tradename ACHIEVE™. Particularly useful grades include ACHIEVE™ 3854, ACHIEVE™ 1654E1, ACHIEVE™3825, ACHIEVE™1605, available from ExxonMobil Chemical Company in Houston, Tex. Additional preferred HMPP's useful in the practice of this invention include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562.

In some instances impact copolymers (ICP) can be utilized in the practice of this invention. Several are available from ExxonMobil Chemical Company (e.g. PP7032 E2). Preferred ICP's useful as the HMPP may also be those ICP's described in WO 2004/014998, particularly those described at page 37 to page 41.

In another embodiment preferred HMPP's useful herein have a melting point greater than 110° C., preferably greater than 115° C., and most preferably greater than 130° C. and/or a heat of fusion of greater than 60 J/g, preferably at least 70 J/g, preferably at least 80 J/g, as determined by DSC analysis described herein.

The molecular weight of the HMPP's is preferably between 10,000 to 5,000,000 g/mol, alternatively 50,000 to 500,000 g/mol, preferably with a polydispersity index (PDI=Mw/Mn) between 1.5 to 4, preferably 1.5 to 3.

Preferred HMPP's may be isotactic, highly isotactic, syndiotactic, or highly syndiotactic. In one embodiment, the HMPP is an isotactic polypropylene. In another embodiment, the HMPP is a highly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, a polypropylene homo- or co-polymer having at least 85% isotacticity is the HMPP. In another embodiment, the HMPP has at least 90% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In a desirable embodiment, a polypropylene homo- or co-polymer having at least 85% syndiotacticity is the HMPP. In another embodiment, a propylene homo- or co-polymer having at least 90% syndiotacticity is the HMPP.

Low-Crystallinity Propylene Polymer (Propylene-Based Plastomer)

The compositions of the present invention contain at least one propylene-based plastomer. For purposes of this invention Propylene-based plastomers are defined to comprise at least 50 mole % propylene, have a heat of fusion of less than 70 J/g and a tacticity index of 75% or more. Useful propylene-based plastomers may also have a Melt Flow Rate of 0.1 to 2000 dg/min (preferably 100 dg/min or less); and/or an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and/or an Mw/Mn of 1.5 to 4.

In particular, preferred propylene-based plastomers useful in this invention preferably have a percent crystallinity of 0.1% to less than 35% crystallinity. Preferably within this range, the propylene-based plastomer comprises less than 30% crystallinity, preferably less than 25% crystallinity, preferably less than 20% crystallinity, preferably less than 15% crystallinity, preferably less than 10% crystallinity. Also preferably, the propylene-based plastomer comprises at least 0.5% crystallinity, preferably at least 1% crystallinity, preferably at least 2% crystallinity, preferably at least 5% crystallinity.

Preferred propylene-based plastomers useful in this invention preferably have a Melt Flow Rate (MFR) of 0.1 to 200 dg/min, preferably 0.1 to 100, preferably 0.5 to 50, preferably 1 to 25, preferably 1 to 15, preferably 2 to 10 dg/min (as measured by ASTM 1238, 2.16 kg and 230° C.); alternately the MFR is from 15 to 50 dg/min.

Preferred propylene-based plastomers useful in this invention preferably have a DSC melting point of 100° C. or less, preferably 90° C. or less, preferably between 25 and 90° C., preferably between 30 and 80° C., preferably between 35 and 75° C., as measured by the DSC procedure described herein.

Preferred propylene-based plastomers useful in this invention preferably have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8° C. between stages.

The intermolecular composition distribution of the propylene-based plastomer may be determined by thermal fractionation in hexane as follows: about 30 grams of the propylene-based plastomer is cut into small cubes of about ⅛ inch (0.32 cm) on the side and is then introduced into a thick walled glass bottle closed with screw cap along with 50 mg of Irganox1076, an antioxidant commercially available from Ciba-Geigy Corporation. Then, 425 ml of hexane (a principal mixture of normal and iso-isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the propylene-based plastomer soluble at 40° C., 48° C., 55° C., and 62° C. are obtained at temperature increases of approximately 8° C. between stages. The soluble polymers are dried, weighed and analyzed for composition, as wt % ethylene content. To produce a copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

Preferred propylene-based plastomers useful in this invention preferably have a molecular weight distribution (Mw/Mn) of Mw/Mn of less than 5, preferably between 1.5 and 4, preferably between 1.5 and 3.

In one embodiment, the propylene-based plastomer comprises propylene and at least one other comonomer chosen from $C_2$ and $C_4$-$C_{20}$ olefins. Preferred comonomer(s) are $C_2$, $C_4$, $C_6$, or $C_8$ alpha olefins, most preferably the comonomer is ethylene.

In a preferred embodiment, the propylene-based plastomer may comprise a propylene-based copolymer referred to herein as a random copolymer of propylene or as a propylene-"comonomer" plastomer (e.g., propylene-ethylene plastomer). Suitable random copolymers of propylene have a heat of fusion of less than 70 J/g, and thus are semi-amorphous, and preferably comprise an average propylene content on a molar basis of from about 68 mol % to about 92 mol %, more preferably from about 75 mol % to about 91 mol %, even more preferably from about 78 mol % to about 88 mol %, most preferably from about 80 mol % to about 88 mol %. The balance of the random copolymer of propylene (i.e., the one or more comonomers) may be one or more alpha-olefins as specified above and/or one or more diene monomers. Most preferably the balanced of the random copolymer of propylene is ethylene.

The comonomer of the random copolymer of propylene may comprises about 8 to 32 mol % of ethylene ($C_2$) and/or a $C_4$-$C_{20}$ olefin, more preferably about 9 to about 25 mol %, even more preferably about 12 to about 22 mol %, with about 13 to 20 mol % being still more preferred.

More preferably, the random copolymer of propylene comprises about 8 to 32 mol % ethylene, more preferably about 9 to about 25 mol % ethylene, even more preferably about 12 to about 22 mol % ethylene, with about 13 to 20 mol % ethylene being still more preferred as the comonomer.

The random copolymer of propylene may have a weight-average molecular weight (Mw) of 5,000,000 g/mol or less, a number-average molecular weight (Mn) of 3,000,000 g/mol or less, a z-average molecular weight (Mz) of about 5,000,000 g/mol or less, and a g' index of 1.5 or less, all determined by size exclusion chromatography.

In a preferred embodiment, the random copolymer of propylene may have an Mw of about 5,000 to about 5,000,000 g/mol, more preferably about 10,000 to about 1,000,000 g/mol, more preferably about 20,000 to about 500,000 g/mol, more preferably about 50,000 to about 300,000 g/mol, as determined by size exclusion chromatography.

In a preferred embodiment, the random copolymer of propylene may have an Mn of about 5,000 to about 3,000,000 g/mol, more preferably about 10,000 to about 1,000,000 g/mol, more preferably about 30,000 to about 500,000 g/mol, more preferably about 50,000 to about 200,000 g/mol, as determined by size exclusion chromatography.

In a preferred embodiment, the random copolymer of propylene may have an Mz of about 10,000 to about 5,000,000 g/mol, more preferably about 50,000 to about 1,000,000 g/mol, more preferably about 80,000 to about 500,000 g/mol, more preferably about 100,000 to about 300,000 g/mol, as determined by size exclusion chromatography.

The molecular weight distribution (Mw/Mn) of the random copolymer of propylene is preferably 1.5 to 40.0, more preferably about 1.8 to 5 and most preferably about 1.8 to 3.

In a preferred embodiment, the random copolymer of propylene may have a g' index value of about 1 to about 1.5, more preferably a g' of about 1.25 to about 1.45, when measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the random copolymer of propylene and $\eta_l$ is the intrinsic viscosity of a linear polymer of the same viscosity-averaged molecular weight ($M_v$) of the random copolymer of propylene. $\eta_l = KM_v^\alpha$, K and α were measured values for linear polymers and should be obtained on the same instrument as the one used for the g' index measurement.

In a preferred embodiment, the random copolymer of propylene has a crystallization temperature (Tc) measured with differential scanning calorimetry (DSC) of about 200° C. or less, more preferably, 150° C. or less.

In a preferred embodiment, the random copolymer of propylene has a density of about 0.85 to about 0.95 g/ml, more preferably, about 0.87 to 0.92 g/ml, more preferably about 0.88 to about 0.91 g/ml as measured per the ASTM D-1505 test method at 25° C.

In a preferred embodiment, the random copolymer of propylene has a melt flow rate (MFR) equal to or greater than 0.2 g/10 min., preferably between 2-500 g/10 min. and more preferably between 20-200 g/10 min., as measured according to the ASTM D-1238 test method.

In a preferred embodiment, the random copolymer of propylene has a heat of fusion (Hf) determined according to the procedure described in ASTM E 794-85 which is 70 J/g or less, preferably 60 J/g or less, preferably 50 J/g or less, preferably 40 J/g or less, preferably 30 J/g or less, preferably 25 J/g or less, preferably 20 J/g or less, preferably 15 J/g or less, and preferably 0.5 J/g or more, preferably 1 J/g or more, preferably 5 J/g or more, preferably from about 1 J/g to about 15 J/g, wherein a desirable range may be any combination of upper Hf limit and lower Hf limit.

Preferred random propylene polymers are typically made using a chiral metallocene. A chiral metallocene catalyst typically causes methyl groups of the propylene residues in the random copolymer of propylene have predominantly the same tacticity. Both syndiotactic and isotactic configuration of the propylene are possible, though the isotactic polymers are preferred. The tacticity of the propylene residues leads to an amount of crystallinity in the polymers. The relatively low levels of crystallinity in the random copolymer of propylene are believed to be derived from isotactic polypropylene obtained by incorporating alpha-olefin comonomers as described above.

The random copolymer of propylene is preferably partially crystalline, which preferably arises from crystallizable stereoregular propylene sequences. For use herein, the crystallinity of the random copolymer of propylene can also be expressed in terms of percentage of crystallinity, based on the heat of fusion of the polymer divided by thermal energy for the highest order of polypropylene, which is estimated at 189 J/g (i.e., 100% crystallinity is equal to 189 J/g.) for purposes herein. That is, the heat of fusion of the polymer in question is divided by 189 J/g×100 to determine the % crystallinity. In a preferred embodiment, the random polymer has a % crystallinity of 35% or less, preferably 30% or less, preferably 25% or less, preferably 20% or less, preferably 15% or less, preferably 10% or less. In another embodiment the random polymer has a % crystallinity of 3 to 30%, preferably 5 to 25%.

The random copolymer of propylene of the present invention preferably has a polypropylene crystallinity of about 0.25% to about 15%, more preferably from about 0.5% to about 13%, and most preferably from about 0.5% to about 11%.

In addition to this level of crystallinity, the random copolymer of propylene preferably has a single broad melting transition. However, suitable random copolymer of propylene polymer may show secondary melting peaks adjacent to the principal peak, but for purposes herein, such secondary melting peaks are considered together as a single melting point, with the highest of these peaks being considered the melting point of the random copolymer of propylene. The random copolymer of propylene preferably has a melting point of from about 25° C. to about 75° C., preferably about 25° C. to about 65° C., more preferably about 30° C. to about 60° C.

The procedure for Differential Scanning Calorimetry (DSC) is described as follows: About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. Thermal output, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

The random copolymer of propylene may have a Mooney viscosity ML (1+4)@125° C., as determined according to ASTM D1646, of less than 100, more preferably less than 75, even more preferably less than 60, most preferably less than 30.

The random copolymer of propylene of the present invention preferably comprises a random crystallizable copolymer having a narrow compositional distribution. The intermolecular composition distribution of random copolymer of propylene (e.g., the narrow compositional distribution) may be determined by thermal fractionation in a solvent such as a saturated hydrocarbon e.g., hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt % ethylene content) with a difference of no greater than 20% (relative) and more preferably 10% (relative) of the average weight percent (wt %) ethylene content of random copolymer of propylene. Thus the semi-amorphous random polypropylene copolymer is said to have a narrow compositional distribution if it meets this fractionation test criteria.

The length and distribution of stereoregular propylene sequences in a preferred random copolymer of propylene is consistent with substantially random statistical copolymerization. It is well known that sequence length and distribution are related to the copolymerization reactivity ratios. By substantially random, we mean a copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the random copolymer of propylene polymer may be determined by 13C NMR in such as way so as to locate the ethylene residues in relation to the neighboring propylene residues.

As outlined herein, to produce random copolymer of propylene with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred random copolymer of propylene polymers.

A preferred random copolymer of propylene used in the present invention is described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice.

In addition to one or more comonomers making up the major portion of the random copolymer of propylene polymer (i.e., alpha-olefins) selected such as, but not limited to, ethylene, alpha-olefins having 4 to 8 carbon atoms, and styrenes, random copolymer of propylene polymers, as described above can contain long chain branches, which can optionally be generated using one or more alpha, omega-dienes.

Alternatively, random copolymer of propylene may comprise at least one diene, and more preferably at least one non-conjugated diene, which may aid in vulcanization and other chemical modification and/or cross-linking processes. The amount of diene in random copolymer of propylene may preferably be no greater than about 10 wt %, more preferably no greater than about 5 wt %.

In a preferred embodiment, the diene may be selected from the group consisting of those that are used for the vulcanization of ethylene propylene rubbers. Specific examples of preferred dienes include ethylidene norbornene, vinyl norbornene, dicyclopentadiene, and 1,4-hexadiene (available from DuPont Chemicals).

In another embodiment, the propylene-based plastomer of the polymer concentrate may comprise random copolymer of propylene in the form of a blend of discrete random copolymers of propylene. Such blends can include two or more polyethylene copolymers (as described above), two or more polypropylene copolymers (as described above), or at least one of each such polyethylene copolymer and polypropylene copolymer, so long as each of the polymers of the random copolymer of propylene blend would individually qualify as a random copolymer of propylene. Each of the random copolymers of propylene are described above and the number of random copolymer of propylene in a preferred embodiment may be three or less, more preferably two or less.

In an embodiment of the invention, the random copolymer of propylene polymer may comprise a blend of two random copolymer of propylene polymers differing in the olefin content. Preferably, one random copolymer of propylene may comprise about 7 to 13 mol % olefin, while the other random copolymer of propylene may comprise about 14 to 22 mol % olefin. In an embodiment, the preferred olefin in the random copolymer of propylene is ethylene.

The propylene ethylene copolymers from this invention have unique properties as evidenced by the relationship of their isotactic index and propylene triad tacticity to their ethylene content.

Random copolymer of propylene polymers differ from the types of polypropylene copolymers available on the market. These polypropylene copolymers include: random copolymers (RCP) and impact copolymers (ICP) also called heterophasic copolymers or block copolymers. RCPs are usually produced by copolymerizing in a single reactor process propylene with other monomers such as ethylene, butene and higher alpha-olefins, the most common one being ethylene. Typical ethylene content for these copolymers range from 3-4 mol % up to 14-17 mol %. As ethylene content increases, melting point and stiffness decreases. Typical melting temperatures are ranging from 120° C. to 150° C. and flexural modulus have values between 500 and 1500 MPa. ICPs are sequentially produced in processes involving series reactors with an isotactic polypropylene being produced in the first reactor and ethylene being fed to the second reactor to generate an ethylene propylene rubber. Typical ethylene propylene rubber content ranges from 20% to 50% and even up to 70% when Catalloy technology developed by Himont is used. Such high rubber contents are referred to in the art as high alloy copolymers. In the case of these ICPs, the melting point may still be around 160° C. as they still contain an isotactic polypropylene fraction. The flexural modulus is typically between 800 and 1300 MPa. The high alloy copolymers have flexural modulus between 90 and 500 MPa.

The random copolymer of propylene polymers of the instant invention preferably comprise a particular triad tacticity. The term "tacticity" refers to the stereogenicity in the polymer. For example, the chirality of adjacent monomers can be of either like or opposite configuration. The term "diad" is used herein to designate two contiguous monomers; thus, three adjacent monomers are referred to herein as a triad. In the instance wherein the chirality of adjacent monomers is of the same relative configuration, the diad is termed isotactic. In the instance wherein the chirality of adjacent monomers is in an opposite relative configuration, the diad is termed syndiotactic. Another way to describe the configurational relationship is to term contiguous pairs of monomers having the same chirality as meso (m) and those of opposite configuration racemic (r).

When three adjacent monomers are of the same configuration, the stereoregularity of the triad is abbreviated as "mm". If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in a polymer may be determined, and then multiplied by 100 to indicate the percentage of that type of triad found in the polymer. The reactivity ratios and sequence distribution of the polymer may be determined by C-13 NMR, which locates the ethylene residues in relation to the neighboring propylene residues.

Random copolymers of propylene have unique propylene tacticity as measured by the % meso triad. As shown in detail in U.S. Ser. No. 09/108,772, filed Jul. 1, 1998, fully incorporated herein by reference, random copolymer of propylene polymers of this invention have a lower % meso triad for any given ethylene content when compared to U.S. Pat. No. 5,504,172. The lower content of % meso triads corresponds to relatively lower crystallinity that translates into better elastomeric properties such as high tensile strength and elongation at break coupled with very good elastic recovery. Good elastomeric properties are important for some of the potential applications of the present invention.

Preferred polymers used in this invention, preferably random copolymers of propylene used in embodiments of the present invention have a tacticity index (m/r), also referred to herein as a propylene tacticity index and/or a triad tacticity index, of at least 75%. The propylene tacticity index, expressed herein as "m/r", is determined by 13C nuclear magnetic resonance (NMR). The propylene tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the random copolymers of propylene have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred random copolymers of propylene useful in this invention have a triad tacticity index of three propylene units, as measured by $^{13}$C NMR, also referred to as a "tacticity index" of 75% or greater, 80% or greater, 82% or greater, 85% or greater, or 90% or greater. The triad tacticity index of a polymer is the relative tacticity of a sequence of three adjacent propylene units, a chain consisting of head to tail bonds, expressed as a binary combination of m and r sequences. For purposes herein, it is expressed for semi-amorphous copolymers of the present invention as the ratio of the number of units of the specified tacticity to all of the propylene triads in the copolymer. The tacticity index (mm fraction) of a propylene copolymer can be determined from a $^{13}$C NMR spectrum of the propylene copolymer and the following formula:

$$\text{mm Fraction} = \frac{PPP(\text{mm})}{PPP(\text{mm}) + PPP(\text{mr}) + PPP(\text{rr})}$$

where PPP(mm), PPP(mr) and PPP(rr) denote peak areas derived from the methyl groups of the second units in the following three propylene unit chains consisting of head-to-tail bonds:

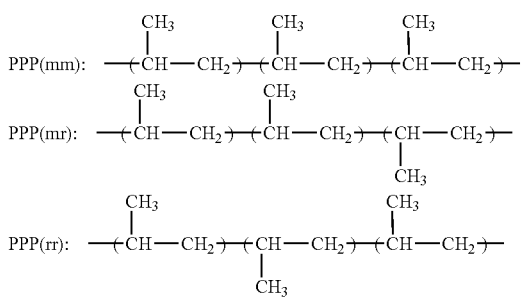

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP(mm) resonates. In the second region, the methyl group of the second unit in the three propylene unit chain represented by PPP(mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP(rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The triad tacticity can be determined from a $^{13}$C-NMR spectrum of the polymer, as described by J. A. Ewen, "Catalytic Polymerization of Olefins", (the Ewen method); and Eds. T. Keii, K. Soga; Kodanska Elsevier Pub.; Tokyo, 1986, P 271, and as described in detail in U.S. Patent Application US2004/054086 filed Mar. 18, 2004 on page 8, in numbered paragraphs [0046] to [0054], all of which are incorporated by reference herein.

In a preferred embodiment, propylene based plastomers useful in this invention have a Vicat Softening point is greater than 45° C., preferably greater than 55° C., preferably greater than 65° C. In a preferred embodiment, propylene based plastomers useful in this invention have a Shore A hardness greater than 45, preferably from 45 to 55, preferably from 45 to 60, preferably from 45-50.

Random copolymers of propylene are available commercially under the trade name Vistamaxx™ (ExxonMobil Chemical). Suitable examples include: Vistamaxx™ 6100, Vistamaxx™ 6200, and Vistamaxx™ 1100, specialty elastomers characterized as semi-crystalline polyolefin polymers highly elastic and flexible with unique technical properties and characteristics, some of which include: free flowing pellets with demonstrated ease of processing in conventional polyolefin processing equipment; chemical resistance and long-term aging; very low ash metals (i.e., less than about 0.1 wt %) and oligomers; and a superb compatibility with various polyolefins.

Preparation of Propylene-based Plastomers

Preferred propylene-based plastomers, such as random copolymers of propylene, can be prepared by polymerizing propylene with one or more of a $C_2$ or $C_4$-$C_{20}$ alpha olefin, most preferably the random copolymer of propylene comprises propylene and ethylene. The monomers are preferably polymerized in the presence of a chiral metallocene catalyst with an activator and optionally a scavenger. The comonomer or comonomers used in combination with propylene may be linear and/or branched. Preferred linear alpha-olefins include ethylene or $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene.

In a preferred embodiment, a continuous solution polymerization process is used to produce random copolymer of propylene comprising, for example, propylene and one or more of ethylene, octene or a diene. The polymerization process preferably utilizes a metallocene catalyst, namely, 1,1'-bis(4-triethylsilylphenyl)methylene(cyclopentadienyl)-(2,7-di-tertiary-butyl-9-fluorenyl)-hafnium dimethyl with dimethylaniliniumtetrakis-(pentafluorophenyl) borate as an activator. An organoaluminum compound, namely, tri-n-octylaluminum, may be added as a scavenger to the monomer feed streams prior to introduction into the polymerization process. For production of more crystalline polymers, dimethylsilyl-bis(indenyl)hafnium dimethyl may be used in combination with dimethylaniliniumtetrakis(pentafluorophenyl) borate. Preferably the solution polymerization is conducted in a single, or in two, continuous stirred tank reactors connected in series. Hexane may be used as the solvent. In addition, toluene may be added to increase the solubility of the co-catalyst. The feed is transferred to the first reactor where the exothermic polymerization reaction is conducted adiabatically at a reaction temperature between about 50° C. to about 220° C. Hydrogen gas may also be added to the reactors as a further molecular weight regulator. If desired, polymer product is then transferred to the second reactor, which is also operated adiabatically at a temperature between about 50° C. to 200° C.

Additional monomers, solvent, metallocene catalyst, and activators can be fed to the second and/or additional reactors. The polymer content leaving the second reactor is preferably from 8 to 22 weight percent. A heat exchanger then heats the polymer solution to a temperature of about 220° C. The polymer solution is then brought to a Lower Critical Solution Temperature (LCST) liquid-liquid phase separator which causes the polymer solution to separate into two liquid phases—an upper lean phase and a lower polymer-rich phase. The upper lean phase contains about 70 wt % of the solvent and the lower polymer rich phase contains about 30 wt % polymer. The polymer solution then enters a low pressure separator vessel which operates at a temperature of about 150° C. and a pressure of 4-10 bar-g (400 to 1000 Pa) and flashes the lower polymer rich phase to remove volatiles and to increase the polymer content to about 76 wt %. A gear pump at the bottom of the flash vessel drives the polymer rich solution to a List devolatilizer. An extruder is coupled to the end of the List devolatilizer whereby the polymer material is transferred to a gear pump which pushes the polymer material through a screen pack. Then the polymer may be cut into pellets and fed to a water bath. A spin dryer may be used to dry the polymer pellets, which preferably have a final solvent content of less than about 0.5 wt %.

As stated above, preferred random copolymers of propylene of the present invention may be prepared by polymerizing propylene and at least one $C_2$ or $C_4$-$C_{20}$ alpha olefin in the presence of a chiral metallocene catalyst with an activator and optional scavenger, most preferably ethylene and propylene. Preferred chiral metallocenes are those known to favor incorporation of propylene for the production of predominantly isotactic polypropylene pentads and statistically random incorporation of the alpha-olefin comonomer(s). The term "metallocene" and "metallocene catalyst precursor" are terms known in the art to mean compounds possessing a Group 4, 5, or 6 transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (also referred to as an activator) in order to yield an active metallocene catalyst or catalyst system. An active metallocene catalyst refers generally to an organometallic complex with a vacant coordination site that can coordinate, insert, and polymerize olefins.

Preferred metallocenes for use herein include bridged and unbridged biscyclopentadienyl complexes where the cyclopentadienyl group are, independently, a substituted or unsubstituted cyclopentadienyl group, a substituted or unsubstituted indenyl group, or a substituted or unsubstituted fluorenyl group. Preferred metallocenes include those represented by the formula: $TCpCpMX_2$, where T is a bridging group such as a dialkyl silica group (such as dimethylsilyl) or a hydrocarbyl group (such as methyl, ethyl, or propyl), each Cp is, independently a substituted or unsubstituted cyclopentadienyl group, a substituted or unsubstituted indenyl group (preferably a 2,4 or 2, 4, 7 substituted indenyl group), or a substituted or unsubstituted fluorenyl group, M is a group 4 metal (preferably Hf, Zr or Ti) and each X is independently a halogen or hydrocarbyl group (such as chlorine, bromine, methyl, ethyl, propyl, butyl, or phenyl).

Preferred metallocenes for use herein include cyclopentadienyl (Cp) complexes which have two Cp ring systems for ligands. The Cp ligands preferably form a "bent sandwich complex" with the metal and are preferably locked into a rigid configuration through a bridging group. Such preferred cyclopentadienyl complexes typically have the general formula:

$$(Cp^1R^1m)R^3n(Cp^2R^2p)MXq$$

wherein $Cp^1$ of ligand ($Cp^1R^1m$) and $Cp^2$ of ligand ($Cp^2R^2p$) are cyclopentadienyl groups and are preferably the same, $R^1$ and $R^2$ each are, independently, a halogen or a hydrocarbyl, halocarbyl, hydrocarbyl-substituted organometalloid or halocarbyl-substituted organometalloid group containing up to 20 carbon atoms; m is preferably 1 to 5; p is preferably 1 to 5; preferably two $R^1$ and/or $R^2$ substituents on adjacent carbon atoms of the cyclopentadienyl ring associated there can be joined together to form a ring containing from 4 to 20 carbon atoms (such as indene or fluorene); $R^3$ is a bridging group; n is the number of atoms in the direct chain between the two ligands and is preferably 1 to 8, most preferably 1 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,; 5,278,264; 5,296,434; and 5,304,614, all of which are incorporated by reference for purposes of U.S. patent practice. Illustrative, but not limiting examples of preferred biscyclopentadienyl metallocenes of the type described above for the invention include the racemic isomers of:

μ-(CH3)2Si(indenyl)2M(Cl)2
μ-(CH3)2Si(indenyl)2M(CH3)2
μ-(CH3)2Si(tetrahydroindenyl)2M(Cl)2
μ-(CH3)2Si(tetrahydroindenyl)2M(CH3)2
μ-(CH3)2Si(indenyl)2M(CH2CH3)2
μ-(C6H5)2C(indenyl)2M(CH3)2;
wherein M may include Zr, Hf, and/or Ti.

Preferably these metallocenes are used in combination with one or more alumoxanes (preferably methyl alumoxane, or modified methyl alumoxane) and or one or more ionic activators such as N,N-dimethylanilinium tetraphenylborate,
N,N-dimethylanilinium tetrakis-(pentafluorophenyl)borate,
diphenylcarbenium tetra(perfluorophenyl)borate, or
N,N-dimethylanilinium tetrakis(heptafluoronaphthyl)borate.

Additives

The compositions of the present invention may contain additives such as those commonly used to modify the properties of polymers. These include antioxidants, nucleating agents, acid scavengers, stabilizers, anticorrosion agents, blowing agents, other UV absorbers such as chain-breaking antioxidants, etc., quenchers, antistatic agents, slip agents, pigments, dyes and fillers and cure agents such as peroxide. Dyes and other colorants common in the industry may be present from 0.01 to 10 wt % in one embodiment, and from 0.1 to 6 wt % in another embodiment, based upon the weight of the composition.

In particular, antioxidants and stabilizers such as organic phosphites, hindered amines, and phenolic antioxidants may be present in the compositions of the invention from 0.001 to 2 wt %, based upon the weight of the composition, in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present from 0.001 to 50 wt % in one embodiment, and from 0.01 to 25 wt %, based upon the weight of the composition, in another embodiment, and from 0.2 to 10 wt % in yet another embodiment. Desirable fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the NFP of the invention pre-contacted, or pre-absorbed into the filler prior to addition to the polymer(s).

More particularly, in one embodiment of the present invention, the NFP, or some portion of the NFP, may be blended with a filler, desirably a porous filler. The NFP and filler may be blended by, for example, a tumbler or other wet blending apparatus. The NFP and filler in this embodiment are blended for a time suitable to form a homogenous composition of NFP and filler, desirably from 1 minute to 5 hours in one embodiment. This NFP/filler blend may then be blended with the polymer(s) useful in the invention in order to effectuate plastication. In another embodiment, a porous filler may be contacted with the NFP, or some portion thereof, prior to contacting the filler with the polymer(s). In another embodiment, the porous filler, polymer(s) and NFP are contacted simultaneously (or in the same blending apparatus). In any case, the filler may be present from 0.1 to 60 wt % of the composition, and from 0.2 to 40 wt % in another embodiment, and from 0.3 to 20 wt % in yet another embodiment.

Metal salts of fatty acids may also be present in the compositions of the present invention. Such salts may be present from 0.001 to 1 wt % of the composition in one embodiment, and from 0.01 to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals including Li, Na, Mg, Ca, Sr, Ba, Zn, Cd, Al, Sn, Pb and so forth. Preferable metal salts of fatty acids are magnesium stearate, calcium stearate, sodium stearate, zinc stearate, calcium oleate, zinc oleate, and magnesium oleate.

In a preferred embodiment, slip additives may be present in the compositions of this invention. Preferably the slip additives are present at 0.001 to 1 wt % (10 to 10,000 ppm), more preferably 0.01 to 0.5 wt % (100 to 5000 ppm), more preferably 0.1 to 0.3 wt % (1000 to 3000 ppm), based upon the weight of the composition.

Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-erucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof.

Preferred slip additives are unsaturated fatty acid amides, which are commercially available from Crompton (Kekamide™ grades), Croda Universal (Crodamide™ grades), and Akzo Nobel Amides Co. Ltd. (ARMOSLIP™ grades). Particularly preferred slip agents include unsaturated fatty acid amides having the chemical structure

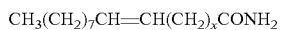

where x is 5 to 15. Preferred versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In another embodiment, stearamide is also useful in this invention. Other preferred slip additives include those described in WO 2004/005601A1.

In some embodiments the plasticized propylene polymer compositions of this invention may be blended with one or more other polymers, including but not limited to, thermoplastic polymer(s) and/or elastomer(s).

By "thermoplastic polymer(s)" is meant a polymer that can be melted by heat and then cooled with out appreciable change in solid-state properties before and after heating. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising ethylene copolymerized with one or more $C_3$ to $C_{40}$ olefins, preferably a $C_3$ to $C_{20}$ alpha olefin, more preferably $C_3$ to $C_{10}$ alpha-olefins. A particularly preferred example is polybutene. The most preferred polyolefin is polypropylene. Other preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene, butene, hexene, and/or octene.

By "elastomers" is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SEBS, SI, SIS, SB, SBS, SIBS and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the blend comprising the NFP may further be combined with one or more polymers polymerizable by a high-pressure free radical process, low density polyethylene (density 0.915 to less than 0.935 g/cm³), linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene. Preferred polymers include those available from ExxonMobil Chemical Company in Baytown, Tex. under the tradenames EXCEED™ and EXACT™.

In particularly preferred embodiment, the compositions of this invention are combined with an ethylene-based plastomer, preferably 0.5 to 50 weight % of an ethylene-based plastomer, more preferably 1 to 40 weight %, more preferably 5 to 25 weight %, based upon the weight of the composition. Preferred ethylene-based plastomers are preferably a homopolymer of ethylene or a copolymer comprising at least 50 wt % ethylene, and having up to 50 wt %, preferably 1 to 35 weight %, even more preferably 1 to 6 weight % of a C3-C20 comonomer, based upon the weight of the copolymer. The polyethylene copolymers preferably have a composition distribution breadth index (CDBI) of 90% or more, even more preferably above 95%. In another preferred embodiment the ethylene copolymer has a density of 0.86 to 0.925 g/cm$^3$ and a CDBI of 90% or more, preferably between 95% and 99%. Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this invention a homopolymer is defined to have a CDBI of 100%.

The C3 to C20 olefin comonomers for the ethylene-based plastomer described above may be any polymerizable olefin monomer and are preferably a linear, branched or cyclic olefin, even more preferably an alpha-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1. Suitable comonomers also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene. Preferred comonomers for the ethylene based plastomer are propylene, butene, hexene and/or octene.

The ethylene based plastomers described above may also contain termonomers and tetramonomers which may be one or more of the C3 to C20 olefins described above, any C4 to C20 linear, cyclic or branched dienes or trienes and any styreneic monomers such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

In a preferred embodiment, the ethylene based plastomers described above are metallocene polyethylenes (mPE's). The mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

Examples of Exact Plastomers suitable for use herein include:

| ExxonMobil EXACT-Plastomers | | | | |
|---|---|---|---|---|
| EXACT-Plastomers Grade | Composition | Density (g/cm3) | Melt-Index (dg/min) | DSC-Melting Peak (° C.), 10° C./min |
| 3024 | Ethylene/butene | 0.905 | 4.5 | 98 |
| 3035 | Ethylene/butene | 0.900 | 3.5 | 88 |
| 3128 | Ethylene/butene | 0.900 | 1.2 | 92 |
| 4006 | Ethylene/butene | 0.880 | 10 | 60 |
| 4011 | Ethylene/butene | 0.888 | 2.2 | 70 |
| 4033 | Ethylene/butene | 0.880 | 0.8 | 60 |
| 4049 | Ethylene/butene | 0.873 | 4.5 | 55 |
| 3040 | Ethylene/hexene | 0.900 | 16.5 | 96 |
| 3131 | Ethylene/hexene | 0.900 | 3.5 | 95 |
| 3132 | Ethylene/hexene | 0.900 | 1.2 | 96 |
| 3139 | Ethylene/hexene | 0.900 | 7.5 | 95 |
| 4056 | Ethylene/hexene | 0.883 | 2.2 | 72 |
| 4151 | Ethylene/hexene | 0.895 | 2.2 | 89 |
| 0201 | Ethylene/octene | 0.902 | 1.1 | 95 |
| 0203 | Ethylene/octene | 0.902 | 3.0 | 95 |
| 0210 | Ethylene/octene | 0.902 | 10 | 96 |
| 0230 | Ethylene/octene | 0.902 | 30 | 95 |
| 5061 | Ethylene/octene | 0.868 | 0.5 | 53 |
| 5062 | Ethylene/octene | 0.860 | 0.5 | 43 |
| 5101 | Ethylene/octene | 0.902 | 1.1 | 98 |
| 5171 | Ethylene/octene | 0.870 | 1.0 | 55 |
| 5181 | Ethylene/octene | 0.882 | 1.1 | 73 |
| 5361 | Ethylene/octene | 0.860 | 3.0 | 36 |
| 5371 | Ethylene/octene | 0.870 | 5.0 | 64 |
| 8201 | Ethylene/octene | 0.882 | 1.1 | 67 |
| 8203 | Ethylene/octene | 0.882 | 3.0 | 73 |
| 8210 | Ethylene/octene | 0.882 | 10 | 67 |
| 8230 | Ethylene/octene | 0.882 | 30 | 77 |

In a preferred embodiment, the HMPP is an impact copolymer and the HMPP/NFP/propylene based plastomer composition is combined with an ethylene based plastomer, particularly an mPE.

Tackifiers may be blended with the compositions of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %, based upon the weight of the tackifier.) In some embodiments the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 to 40 wt %, even more preferably 20 to 40 wt %. Preferably however, tackifier is not present, or if present, is present at less than 10 wt %, preferably less than 5 wt %, more preferably at less than 1 wt %.

In another embodiment, the compositions of this invention, and/or blends thereof, further comprise typical additives known in the art such as fillers, cavitating agents, antioxidants, surfactants, adjuvants, block, antiblock, color masterbatches, pigments, dyes, processing aids, UV stabilizers, neutralizers, lubricants, waxes, and/or nucleating agents. The additives may be present in the typically effective amounts well known in the art, such as 0.001 weight % to 10 weight %, based upon the weight of the composition. Preferred antioxidants include phenolic antioxidants, such as Irganox 1010, Irganox, 1076 both available from Ciba-Geigy. Preferred fillers, cavitating agents and/or nucleating agents include titanium dioxide, calcium carbonate, barium sulfate, silica, silicon dioxide, carbon black, sand, glass beads, mineral aggregates, talc, clay and the like.

Crosslinking

The compositions of this invention can be used crosslinked or uncrosslinked. Crosslinking can be achieved by any manner known in the art such as by crosslinking in the presence of vulcanizing chemicals, peroxide, azo, radiation such as electron beam, UV, IR, visible light etc. The crosslinking can be accelerated or enhanced by the use of additives and promoters.

The crosslinking reaction, also referred to herein as vulcanization, is one where the different polymeric chains are chemically joined by a chemical reaction. The crosslinking agents/systems that may be used in the practice of the invention include one or more of sulfur based curatives, peroxide curatives, resin cure, hydrosilation, labile or migratory cure systems, and high energy radiation. Sulfur donor compounds which may be used in the practice of the invention include thiuram polysulfides, such as tetramethylthiuram disulfide, diisopropyl tetramethylthiuram disulfide, tetrabutylthiuram disulfide, dipentylmethylene thiuram tetrasulfide, dipentylmethylenethiuram hexasulfide, dicylcohexamethylene thiuram disulfide, and phenylethyl thiuram disulfide. Also included are dialkyldithiocarbamates such as zinc dibutyldithiocarbamates, zinc dimethyldithiocarbamates, zinc diethyldithiocarbamates, bismuth dimethyldithiocarbamates, zinc diethyldithiocarbamates, bismuth dimethyldithiocarbamates, nickel dibutyldithiocarbamates, copper dimethyldithiocarbamates, selenium diethyldithiocarbamates, lead dimethyldithiocarbamates, tellerium diethyldithiocarbamates, cadmium diethyldithiocarbamates, and the like.

In addition to the curing agents above, accelerators may be used, including, but not limited to thiourea, such as ethylene thiourea, N,N'-dibutyl-thiourea, and N,N'-diethyl-thiourea; thiourea-mono-sulfides, such as tetramethyl-thiourea-mono-sulfide, tetraethyl-thiourea-mono-sulfide, and tetrabutyl-thiourea-mono-sulfide; benzothiazole-sulfonamides, such as N-oxy-diethylene-benzothiazole-2-sulfonamide, N-cyclohexobenzothiazole-2-sulfonamide, N,N'-diisopropyl-benzothiazole-2-sulfonamide, and N-tert-butyl-benzothiazole-2-sulfonamide; 2-mercaptoimidazoline; N-diphenylguanidine; N,N'-di(2-methyl-phenyl)guanidine; 2-mercaptobenzothiazole; 2-(morpholinodithio)benzothiazole-disulfide; and zinc 2-mercapto-benzothiazole. The amount of sulfur/sulfur donor compounds or mixtures thereof that may be used is within the range having an upper limit of 6 or 4 phr, to a lower limit of 0.5 or 1 phr.

Organic peroxides which may be used in the practice of the invention include, but are not limited to di-tert-butyl peroxide; dicumyl peroxide; t-butylcumyl peroxide; alpha.bis(tert-butylperoxy)diisopropyl benzene; 2,5 dimethyl 2,5-di(t-butylperoxy)hexane; 1,1-di(t-butylperoxy)-3,3,5-trimethyl cyclohexane; n-butyl-4,4-bis(tert-butylperoxy) valerate; benzoyl peroxide; lauroyl peroxide; dilauroyl peroxide; 2,5-dimethyl-2,5-di(tert-butylperoxy) hexene-3; and also diaryl peroxides, ketone peroxides, peroxydicarbonates, peroxyesters, dialkyl peroxides, hydroperoxides, peroxyketals and combinations thereof. Azo initiators, such as Luazo RTM AP, available from ATO Chemical, may also be used as a free radical initiator.

In addition to the peroxide, other cure adjuvants or coagents may be used, such as triallyl cyanurate, triallyl isoeyanurate, triallyl phosphate, sulfur, thiuram, N-phenyl bismaleamide, zinc diacrylate, zinc dimethacrylate, divinyl benzene, 1,2-polybutadiene, trimethylol propane trimethacrylate, tetramethylene glycol diacrylate, trifuncitonal acrylic ester, dipentaerythritolpentacrylate, polyfunctional acrylate, polyfunctional methacrylates, acrylate and methacrylate metal salts, and oximer. Coagents may improve crosslink density either through an addition mechanism or a transfer mechanism. U.S. Pat. No. 5,656,693, the disclosure of which is hereby incorporated herein by reference, describes peroxide curatives and their use for preparing vulcanizates. Peroxide concentration in the composition may be in the range having an upper limit of about $1 \times 10^{-4}$ moles, or about $2 \times 10^{-4}$ moles, or about $7 \times 10^{-4}$ per hundred parts of rubber to a lower limit of about $2 \times 10^{-2}$ moles, or about $2 \times 10^{-3}$ moles, or about $1.5 \times 10^{-3}$ moles per hundred parts of rubber.

Any phenolic resin that is capable of crosslinking a rubber polymer can be used in the practice of the invention, such as those described in U.S. Pat. Nos. 2,972,600, 4,311,628, and 3,287,440, the disclosures of which are hereby incorporated herein by reference. An example of a phenolic resin curative is a resole resin, which is made by the condensation of alkyl substituted phenols or unsubstituted phenols with aldehydes in an alkaline medium or by condensation of bifunctional phenoldialcohols. The alkyl substituents of the alkyl substituted phenols typically contain 1 from 1 to 10 carbon atoms. The phenolic resin curative may be a dimethylolphenol substituted in para-positions with alkyl groups containing from 1 to 10 carbon atoms. The phenolic resin curatives may be used in conjunction with a catalyst system. For example, non-halogenated phenol curing resins may be used in conjunction with halogen donors and, optionally a hydrogen halide scavenger. Where the phenol curing resin is halogenated, a halogen donor is not required, but a hydrogen halide scavenger may be used.

Hydrosilation may be used to crosslink the compositions described herein. Useful silicon-containing curatives generally include silicon hydride compounds having at least two SiH groups. These compounds react with carbon-carbon double bonds of unsaturated polymers in the presence of a hydrosilation catalyst. Examples of silicon hydride compounds include, but are not limited to methylhydrogen polysiloxanes, methylhydrogen dimethyl-siloxane copolymers, alkyl methyl polysiloxanes, bis(dimethylsilyl) alkanes, bis(dimethylsilyl) benzene, and mixtures thereof. Examples of hydrosilation catalysts include, but are not limited to catalysts including Group VIII transition metals, such as palladium, rhodium, and platinum, and complexes thereof. The use of hydrosilation for curing is described further in U.S. Pat. No. 5,936,028, the disclosure of which is hereby incorporated herein by reference. In a particular embodiment, a silicon-containing curative is employed, and the polymer composition includes 5-vinyl-2-norbornene as the diene component.

Volatile or migratory cure systems can be used to crosslink the compositions described herein. An example of a volatile curative is sulfur dichloride, which is available from the Aldrich Chemical Co. of Milwaukee, Wis. The use of sulfur dichloride as a volatile curative is exemplified in "Rubber Technology Handbook," W. Hoffman, 1988, page 42 (Hanser Publisher, Munich). Volatile cure systems are able to diffuse into the bulk of the sample during contact at room temperature or slightly elevated temperatures (<60° C.) and readily crosslink the polymer through the assistance of incorporated diene. These cure systems are most effective for the crosslinking of polymer where the article comprising the polymer has at least one dimension which is less than 2 in., or less than 1.5 in., or less than 1.0 in. Examples of articles meeting this dimension requirement include fibers and woven/non-woven materials made from fibers, films and architectures made from films, and molded objects. The relatively thin dimension allows the volatile curative to easily diffuse into the shaped article and completely and evenly crosslink the article. Longer exposure times may be required in order to achieve the same results in relatively thicker articles. Exposure times to the volatile curative may be from several seconds to several hours, depending on factors such as the desired degree of crosslinking, the reaction temperature, the thickness of the article, and the amount of diene available on the polymer for the crosslinking reaction.

The volatile curatives may be used as a solution in solvent applied to the surface of compounded polymer. The use of volatile cure systems may have one or more of the following characteristics: (1) the curative may be added after the shaping or molding stage after the composition has been processed into a shape such as a fiber or film, (2) the absence of curative during the formation or shaping may allow the use of higher temperatures which may result in faster processing for the formation of the shaped article, and (3) the use of the curative at ambient and near ambient conditions may allow the crosslinking of shapes which might distort under normal temperature conditions for curing.

A radical formation on the polymer chain by dehydration can initiate crosslinking; therefore, high energy radiation can be used to crosslink the compositions described herein. The energy of the radiation needs to be higher than the bond energy of the most labile carbon-hydrogen bond of the polymer. This crosslinking principle, which is commonly used in the plastics industry, e.g. for the crosslinking of polyethylene and polyvinylchloride, can also be used to crosslink the polymer. Radiation sources that may be used include, but are not limited to cobalt-60 sources, Van-de-Graaff generators, resonance transformers, cascaded accelerators, linear accelerators, and betatrons. During the irradiation with high energy radiation, radicals are created in the polymer chain which cause C—C crosslinking. Vulcanization aids are not required for the radiation curing of the compositions described herein. Activators which are used as co-activators for peroxide curing, such as ethylene glycol methacrylate (EDMA) and trimethylol propane trimethacrylate (TPTA), may be used in high radiation curing to lower the required amount of radiation energy or to achieve an increased cure state. During radiation crosslinking, no decomposition products are created by any vulcanization chemicals which could influence the property spectrum or the physiology of the vulcanizates.

Blending and Articles of Manufacture

The propylene polymers suitable for use in the present invention can be in any physical form when used to blend with the NFP of the invention. In one embodiment, reactor granules, defined as the granules of polymer that are isolated from the polymerization reactor prior to any processing procedures, are used to blend with the NFP of the invention. The reactor granules have an average diameter of from 50 μm to 10 mm in one embodiment, and from 10 μm to 5 mm in another embodiment. In another embodiment, the propylene polymers are in the form of pellets, such as, for example, having an average diameter of from 1 mm to 10 mm that are formed from melt extrusion of the reactor polymer or granules.

The propylene polymers, NFP, and any other ingredients can be blended by any suitable means, and are typically blended to obtain a homogeneous mixture. For example, they may be blended in a tumbler, static mixer, batch mixer, extruder, or a combination thereof. The mixing step may take place as part of a processing method used to fabricate articles, such as in the extruder of an injection molding maching or fiber line.

The mixing step may involve first dry blending using, for example, a tumble blender, where any propylene polymer and the NFP are brought into contact first, without intimate mixing, which may then be followed by melt blending in an extruder. Another method of blending the components is to melt blend the polymer pellets with the NFP directly in an extruder or batch mixer, such as a "Banbury" mixer. In a preferred method, it involves a "master batch" approach, where a target NFP concentration is achieved by adding propylene polymer(s) previously prepared at a higher NFP concentration to neat propylene polymer(s) in the appropriate ratio. The mixing step may take place as part of a processing method used to fabricate articles, such as in the extruder on an injection molding, film, or fiber line.

In one aspect of the invention, the polymer(s) and NFP are "melt blended" in an apparatus such as an extruder (single or twin screw) or batch mixer. The propylene polymer(s) may also be "dry blended" with the NFP using a tumbler, double-cone blender, ribbon blender, or other suitable blender. In yet another embodiment, the propylene polymer(s) and NFP are blended by a combination of approaches, for example a tumbler followed by an extruder. A preferred method of blending is to include the final stage of blending as part of an article fabrication step, such as in the extruder used to melt and convey the composition for a molding step like injection molding or blow molding. This could include direct injection of the NFP into the extruder, either before or after the melt zone. Extrusion technology is described in, for example, PLASTICS EXTRUSION TECHNOLOGY 26-37 (Friedhelm Hensen, ed. Hanser Publishers 1988). In another preferred method, the second propylene polymer is first blended with the NFP and the combination is then blended with the first propylene polymer.

In another aspect of the invention, the composition may be blended in solution by any suitable means using a solvent that dissolves one or both polymer components and/or the NFP to a significant extent. The blending may occur at any temperature or pressure where the NFP and/or the propylene polymer(s) remain in solution. It may also occur under conditions where the propylene polymer(s) remain in solution, but the NFP does not; the NFP is simply suspended in the solvent. Preferred conditions include blending at high temperatures, such as 10° C. or more, preferably 20° C. or more over the melting point of the polymer. Such solution blending would be particularly useful in processes where the polymer is made by solution process and the NFP is added directly to the finishing train, rather than added to the dry polymer in another blending step altogether. Such solution blending would also be particularly useful in processes where the polymer is made in a bulk or high pressure process. As with the solution process the NFP is added directly to the finishing train, rather than added to the dry polymer in another blending step altogether.

Thus, in the cases of fabrication of articles using methods that involve an extruder, such as injection molding or blow molding, any means of combining the polymer(s) and NFP to achieve the desired composition serve equally well as fully formulated pre-blended pellets, since the forming process includes a re-melting and mixing of the raw material; example combinations include simple blends of neat polymer pellets and NFP, of neat polymer granules and NFP, of neat polymer pellets and pre-blended pellets, and neat polymer granules and pre-blended pellets. Here, "pre-blended pellets" means pellets of a composition comprising the propylene polymer(s) and NFP at some concentration. In the process of compression molding, however, little mixing of the melt components occurs, and pre-blended pellets would be preferred over simple blends of the constituent pellets (or granules) and NFP. Those skilled in the art will be able to determine the appropriate procedure for blending of the polymers to balance the need for intimate mixing of the component ingredients with the desire for process economy.

In a preferred embodiment, the compositions described herein are formed into granules or pellets and those granules or pellets are dusted with a polyolefin powder, preferably a microfine polyolefin powder. Preferably the powder is used at 0.01-10 wt % (preferably 0.1 to 5 wt %, preferably 0.1 to 1 wt %) based upon the weight the composition. Preferred polyolefin powders are typically polyethylene (including low density PE, linear-low density PE, medium density PE, and high density PE), polypropylene, or ethylene vinyl acetate copolymers. A preferred polyolefin powder is made from polyethylene with a density 0.91 to 0.96 g/cc (preferably 0.915 to 0.925 g/cc) and an MI of 1 to 100 dg/min (preferably 5 to 50 dg/min). The polyolefin powders may have a mesh size of from 1 to 100 (preferably 5 to 100, preferably 10 to 70) and a median diameter of 5 to 2000 micron (preferably 10 to 500 micron, preferably 10 to 100 micron, preferably 15 to 25 micron). Useful polyolefin powders are available from Equistar Chemical (part of Lyondell Chemical) under the tradename Microthene™, including Microthene™ F grades and Microthene™ G grades such as Microthene™ FN510, Microthene™ FN532, Microthene™ FA700, and Microthene™ FP-800. A particularly preferred microfine powder is Microthene™ FA709-00, which is a high density polyethylene powder (0.952 g/cc) having a reported melt index of 10 dg/min, a reported melting point of 134° C., and an average particle size of 20 microns.

The resultant compositions of the present invention may be processed by any suitable means such as by calendering, casting, coating, compounding, extrusion, foaming, laminating, blow molding, compression molding, injection molding, thermoforming, transfer molding, cast molding, rotational molding, casting such as for films, spun or melt bonded such as for fibers, or other forms of processing such as described in, for example, PLASTICS PROCESSING (Radian Corporation, Noyes Data Corp. 1986). More particularly, with respect to the physical process of producing the blend, sufficient mixing should take place to assure that a uniform blend will be produced prior to conversion into a finished product.

In a preferred embodiment, the composition of this invention has a permanent set of less than 65%, preferably less than 50%, preferably less than 40%, preferably less than 30%, preferably less than 20%. Permanent set (also called permanent tension set) is measured according to the following procedure. Hysteresis testing is done on molded samples having the required dumbbell geometry (ASTM designation type I bars for polypropylene), using the following test procedure. The deformable zone (2.54 cm long section) of the sample is stretched to 200% of its original length at a deformation rate of 20 in/min (51 cm/min) in an Instron (The Instron Corporation, Canton, Mass.) testing machine. The sample is then allowed to relax while the machine retracts and comes back to the point where the stress is zero. The machine resets the new zero elongation point at this position. With the specimen still within the grips, the second cycle is then initiated for another 200% extension. Again, the machine is allowed to come back to the point where the stress is zero on the retraction cycle. The set for each cycle is determined with reference to their respective zero elongation points. Two specimens are tested for each sample. The average of the set values over the two cycles is taken as the permanent tension set.

Applications

The enhanced properties of the compositions described herein are useful in a wide variety of applications, including transparent articles such as cook and storage ware, and in other articles such as furniture, automotive components, toys, sportswear, medical devices, sterilizable medical devices, sterilization containers, fibers, woven fabrics, nonwoven fabrics, drapes, gowns, filters, hygiene products, diapers, and films, oriented films, sheets, tubes, pipes, wire jacketing, cable jacketing, agricultural films, geomembranes, sporting equipment, cast film, blown film, profiles, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

These devices may be made or formed by any useful forming means for forming polyolefins. This will include, at least, molding, including compression molding, injection molding, blow molding, and transfer molding; film blowing or casting; extrusion, and thermoforming; as well as by lamination, pultrusion, protrusion, draw reduction, rotational molding, spin-bonding, melt spinning, melt blowing; or combinations thereof. Use of at least thermoforming or film applications allows for the possibility of and derivation of benefits from uniaxial or biaxial orientation of the material.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene rich layer can be extrusion coated or laminated onto an oriented polypropylene rich layer or the polyethylene and polypropylene can be coextruded together into a film then oriented. Likewise, oriented polypropylene could be laminated to oriented polyethylene or oriented polyethylene could be laminated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment, the layer comprising the composition of this invention (and/or blends thereof) may be combined with one or more other layers. The other layer(s) may be any layer typically included in multilayer film structures. For example the other layer or layers may be:

1. Polyolefins

Preferred polyolefins include homopolymers or copolymers of C2 to C40 olefins, preferably C2 to C20 olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, actates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic Polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous

Other preferred layers can be paper, wood, cardboard, metal, metal foils (such as aluminum foil and tin foil), metallized surfaces, glass (including silicon oxide (SiOx) coatings applied by evaporating silicon oxide onto a film surface), fabric, spunbonded fibers, and nonwovens (particularly polypropylene spun bonded fibers or nonwovens), and substrates coated with inks, dyes, pigments, and the like.

The films may vary in thickness depending on the intended application, however films of a thickness from 1 to 250 μm are usually suitable. Films intended for packaging are usually from 10 to 60 micron thick. The thickness of the sealing layer is typically 0.2 to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads.

In another embodiment, one more layers may be modified by corona treatment, electron beam irradiation, gamma irradiation, or microwave irradiation. In a preferred embodiment one or both of the surface layers is modified by corona treatment.

The films described herein may also comprise from 5 to 60 weight %, based upon the weight of the polymers and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described above. The films comprising a hydrocarbon resin may be oriented in uniaxial or biaxial directions to the same or different degrees.

The films described above may be used as stretch and/or cling films. Stretch/cling films are used in various bundling, packaging and palletizing operations.

Molded Products

The composition described above may also be used to prepare the molded products of this invention in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank-temperatures are from 10° C.-40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 µm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

Nonwovens and Fibers

The compositions described above may also be used to prepare nonwoven fabrics and fibers in any nonwoven fabric and fiber making process, including but not limited to, melt blowing, spunbonding, film aperturing, and staple fiber carding. A continuous filament process may also be used. Preferably a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

Fiber Preparation

The formation of woven and nonwoven articles from the polyolefin/NFP blends described herein typically requires the manufacture of fibers by extrusion followed by weaving or bonding. The extrusion process is typically accompanied by mechanical or aerodynamic drawing of the fibers. Essentially all fibers are oriented both during the extrusion process as well as during the process of manufacture of the nonwoven article.

a. Conventional Fine Denier PP Fibers

The three more conventional PP fiber operations, continuous filament, bulked continuous filament, and staple, are useful as means for preparing fibers of the blends of the present invention. Typically the molten blend is extruded through the holes in a die (spinneret) between 0.3 mm to 0.8 mm (10 mil to 30 mil) in diameter. Low melt viscosity of the polymer blend is preferred and is typically achieved through the use of high melt temperature (230° C. to 280° C.) and high melt flow rates (15 g/l 10 min to 40 g/l 10 min). A relatively large extruder is typically equipped with a manifold to distribute a high output of molten blend to a bank of eight to twenty spinnerets. Each spinhead is typically equipped with a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 50 to 250. The holes are typically grouped into round, annular, or rectangular patterns to assist in good distribution of the quench air flow.

b. Continuous Filament

Continuous filament yarns typically range from 40 denier to 2,000 denier (denier=number of grams/9000 yd). Filaments typically range from 1 to 20 dpf, but can be larger. Spinning speeds are typically 800 m/min to 1500 m/min (2500 ft/min to 5000 ft/min). The filaments are drawn at draw ratios of 3:1 or more (one- or two-stage draw) and wound onto a package. Two-stage drawing allows higher draw ratios to be achieved. Winding speeds are 2,000 m/min to 3,500 m/min (6,600 ft/min to 11,500 ft/min). Spinning speeds in excess of 900 m/min (3000 ft/min) require a NMWD to get the best spinnability with the finer filaments.

c. Bulked Continuous Filament

Bulked Continuous Filament fabrication processes fall into two basic types, one-step and two step. In the older, two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/min) or less. Typically if secondary crystallization occurs in the two-step CF process, then one typically promptly uses draw texturizing. The most common process today is the one-step spin/draw/text (SDT) process. This process provides better economics, efficiency and quality than the two-step process. It is similar to the one-step CF process, except that the bulking device is in-line. Bulk or texture changes yarn appearance, separating filaments and adding enough gentle bends and folds to make the yarn appear fatter (bulkier).

d. Staple Fiber

There are two basic staple fiber fabrication processes: traditional and compact spinning. The traditional process involves two steps: 1) producing, applying finish, and winding followed by 2) drawing, a secondary finish application, crimping, and cutting into staple. Filaments can range from 1.5 dpf to >70 dpf, depending on the application. Staple length can be as short as 7 mm or as long as 200 mm (0.25 in. to 8 in.) to suit the application. For many applications the fibers are crimped. Crimping is accomplished by over-feeding the tow into a steam-heated stuffer box with a pair of nip rolls. The over-feed folds the tow in the box, forming bends or crimps in the filaments. These bends are heat-set by steam injected into the box.

e. Melt-Blown Fibers

Melt blown fibers can make very fine filaments and produce very lightweight fabrics with excellent uniformity. The result is often a soft fabric with excellent "barrier" properties. In the melt blown process molten polymer moves from the extruder to the special melt blowing die. As the molten filaments exit the die, they are contacted by high temperature, high velocity air (called process or primary air). This air rapidly draws and, in combination with the quench air, solidifies the filaments. The entire fiber forming process generally takes place within 7 mm (0.25 in.) of the die. The fabric is formed by blowing the filaments directly onto a forming wire, 200 mm to 400 mm (8 in. to 15 in.) from the spinnerets.

Melt blown microfibers useful in the present invention can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al. In some preferred embodiments, the microfibers are used in filters. Such blown microfibers typically have an effective fiber diameter of from about 3 to 30 micrometers preferably from about 7 to 15 micrometers, as calculated according to the method set forth in Davies, C. N., "The Separation of Airborne Dust and Particles," Institution of Mechanical Engineers, London, Proceedings 1B, 1952.

f. Spunbonded Fibers

Fiber formation may also be accomplished by extrusion of the molten polymer from either a large spinneret having several thousand holes or with banks of smaller spinnerets containing as few as 40 holes. After exiting the spinneret, the molten fibers are quenched by a cross-flow air quench system, then pulled away from the spinneret and attenuated (drawn) by high pressure air. There are two methods of air attenuation, both of which use the venturi effect. The first draws the filament using an aspirator slot (slot draw), which runs the width of the machine. The second method draws the filaments through a nozzle or aspirator gun. Filaments formed in this manner are collected on a screen ("wire") or porous forming belt to form the fabric. The fabric is then passed through compression rolls and then between heated calender rolls where the raised lands on one roll bond the fabric at points covering 20% to 40% of its area.

Annealing

In additional embodiments, the mechanical properties of fibers comprising the blends of this invention can be improved by annealing the fibers or the nonwoven materials made from the blends of this invention. Annealing is often combined with mechanical orientation, although annealing is preferred. Annealing partially relieves the internal stress in the stretched fiber and restores the elastic recovery properties of the blend in the fiber. Annealing has been shown to lead to significant changes in the internal organization of the crystalline structure and the relative ordering of the amorphous and semicrystalline phases. Annealing typically leads to improved elastic properties. The fiber or fabric is preferably annealed at a temperature of at least 40° F., preferably at least 20° F. above room temperature (but slightly below the crystalline melting point of the blend). Thermal annealing of the blend is conducted by maintaining the polymer blends or the articles made from a such a blend at temperature between room temperature to a maximum of 160° C. or more preferably to a maximum of 130° C. for a period between 5 minutes to less than 7 days. A typical annealing period is 3 days at 50° C. or 5 minutes at 100° C. While the annealing is done in the absence of mechanical orientation, the latter can be a part of the annealing process on the fiber (past the extrusion operation). Mechanical orientation can be done by the temporary, forced extension of the fiber for a short period of time before it is allowed to relax in the absence of the extensional forces. Oriented fibers are conducted by maintaining the fibers or the articles made at an extension of 100% to 700% for a period of 0.1 seconds to 24 hours. A typical orientation is an extension of 200% for a momentary period at room temperature.

For orientation, a fiber at an elevated temperature (but below the crystalline melting point of the polymer) is passed from a feed roll of fiber around two rollers driven at different surface speeds and finally to a take-up roller. The driven roller closest to the take-up roll is driven faster than the driven roller closest to the feed roll, such that the fiber is stretched between the driven rollers. The assembly may include a roller intermediate the second roller and take-up roller to cool the fiber. The second roller and the take-up roller may be driven at the same peripheral speeds to maintain the fiber in the stretched condition. If supplementary cooling is not used, the fiber will cool to ambient temperature on the take up roll.

For more information on fiber and nonwoven production please see Polypropylene Handbook, E. P. Moore, Jr., et al., Hanser/Gardner Publications, Inc. New York, 1996, pages 314 to 322, which is incorporated by reference herein.

Nonwoven Web

In a preferred embodiment, a nonwoven fiber web is prepared from the polyolefin/NFP blends of this invention. The fibers employed in such a web typically and preferably have denier ranging from about 0.5 to about 10 (about 0.06 to about 11 tex), although higher denier fibers may also be employed. Fibers having denier from about 0.5 to 3 (0.06 to about 3.33 tex) are particularly preferred. ("Denier" means weight in grams of 9000 meters of fiber, whereas "tex" means weight in grams per kilometer of fiber.) Fiber stock having a length ranging from about 0.5 to about 10 cm is preferably employed as a starting material, particularly fiber lengths ranging from about 3 to about 8 cm. Nonwoven webs of fibers may be made using methods well documented in the nonwoven literature (see for example Turbak, A. "Nonwovens: An Advanced Tutorial", Tappi Press, Atlanta, Ga., (1989). The uncoated (i.e., before application of any binder) web should have a thickness in the range of about 10 to 100 mils (0.254 to 2.54 mm), preferably 30 to 70 mils (0.762 to 1.778 mm), more preferably 40 to 60 mils (1.02 to 1.524 mm). These preferred thicknesses may be achieved either by the carding/crosslapping operation or via fiber entanglement (e.g., hydroentanglement, needling, and the like). The basis weight of the uncoated web preferably ranges from about 20 $g/m^2$ up to about 250 $g/m^2$. In some embodiments, one may improve the tensile and tear strength of the inventive articles, and reduce lint on the surface of the articles, by entangling (such as by needletacking, hydroentanglement, and the like) the nonwoven web, or calendering the uncoated and/or coated and cured nonwoven web. Hydroentanglement may be employed in cases where fibers are water insoluble. Calendering of the nonwoven web at temperatures from about 5 to about 40° C. below the melting point of the fiber may reduce the likelihood of lint attaching to the surface of the ultimate articles and provide a smooth surface. Embossing of a textured pattern onto the nonwoven web may be performed simultaneously with calendering, or in a subsequent step.

In addition to the polyolefins and the NFP's of this invention, it may also be desirable to add colorants (especially pigments), softeners (such as ethers and alcohols), fragrances, fillers (such as for example silica, alumina, and titanium dioxide particles), and bactericidal agents (for example iodine, quaternary ammonium salts, and the like) to the blends.

Likewise, the nonwoven webs and fibers may be coated with other materials, such as binders, adhesives, reflectants, and the like. Coating of the nonwoven web or the fiber may be accomplished by methods known in the art, including roll coating, spray coating, immersion coating, gravure coating, or transfer coating. The coating weight as a percentage of the total wiping article may be from about 1% to about 95%, preferably from about 10% to about 60%, more preferably 20 to 40%.

Staple fibers may also be present in the nonwoven web. The presence of staple fibers generally provides a more lofty, less dense web than a web of only blown microfibers. Preferably, no more than about 90 weight percent staple fibers are present, more preferably no more than about 70 weight percent. Such webs containing staple fiber are disclosed in U.S. Pat. No. 4,118,531 (Hauser) which is incorporated herein by reference.

Sorbent particulate material such as activated carbon or alumina may also be included in the web. Such particles may be present in amounts up to about 80 volume percent of the contents of the web. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.), which are incorporated herein by reference.

The fibers and nonwoven webs prepared using the blends of this invention can be formed into fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelops, tamper evident fabrics, protective packaging, and coasters.

The fibers prepared using the blends of this invention can be formed into yarns, woven fabrics, nonwoven fabrics, hook and loop fasteners, fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelops, tamper evident fabrics, protective packaging, and coasters.

Test Methods

Fluid Properties

Pour Point is measured by ASTM D97. Kinematic Viscosity (KV) is measured by ASTM D445. Viscosity index (VI) is determined by ASTM D2270. Color (APHA scale) is determined by ASTM D 1209. Specific gravity is determined by ASTM D4052. Flash point is determined by ASTM D92.

Saturates content (wt %) is determined according to ASTM D2007. Sulfur content (wt %) is determined according to ASTM D2622. The percent of carbons involved in olefinic bonds (i.e., olefinic carbons) is determined by liquid-state proton-NMR spectroscopy. Approximately 50 mg of fluid is dissolved in 1 g of deuterated chloroform, which is used as the NMR lock solvent. Relaxation times for the protons are on the order of a few seconds, allowing recycle delays of 6-10 seconds. Spectra are acquired at 30° C. using an acquisition time of one hour, although an increase in temperature and acquisition time may yield marginal improvement in signal-to-noise. The fraction of olefinic carbons is determined by taking the ratio of olefinic carbons to the total number of carbons (olefinic+aliphatic). These, in turn, can be determined from the proton integrals after correction for the proton multiplicity of each carbon type. The olefins are grouped into four structures: vinyl, 1,2-disubstituted, trisubstituted, and vinylidene (1,1-disubstituted), which have three, two, one, and two protons, respectively. The approximate chemical shift ranges (bands) for these structures are tabulated below along with the number of protons contributed to that region by each olefin type:

| Type | Band (ppm): | Number of protons |
|---|---|---|
| vinyl | 5.9-5.65 | 1 |
| 1,2-disubstituted | 5.5-5.3 | 2 |
| trisubstituted + vinyl | 5.3-4.85 | 1 trisub, 2 vinyl |
| vinylidene | 4.85-4.55 | 2 |

The actual chemical shift range for each band may be slightly different from those listed above; appropriate integration limits are apparent from visual inspection of the spectrum by one skilled in the art. The concentration of each olefin type can be determined by dividing the integral for the relevant region by the proton multiplicity of the contributing olefin. The combined trisubstituted+vinyl region is corrected for vinyl content by subtracting twice the integral over 5.9-5.65 ppm and assigning the remainder to trisubstituted olefin. The aliphatic integral (from approximately 3 ppm to 0.5 ppm) is assumed to arise entirely from $CH_2$ groups since the bulk of aliphatic carbons are in $CH_2$ groups and each aliphatic carbon in a $CH_3$ group is balanced by an aliphatic carbon in a CH group (on average). Dividing the aliphatic integral by two gives the number of aliphatic carbons. The sum of the olefin group concentrations times 100, divided by the sum of aliphatic and olefinic carbons, gives the olefin concentration as number of olefinic bonds per 100 carbons. Then multiplying this value by two gives the number of olefinic carbons per 100 carbons, or the percent of carbons involved in olefinic bonds.

The number average molecular weight ($M_n$) is determined by gas chromatography (GC, described below), unless the kinematic viscosity at 100° C. is greater than 10 cSt in which case it is determined by gel permeation chromatography (GPC, described below).

The principles of gas chromatography (GC) are described in "Modern Practice of Gas Chromatography", R. L. Grob and E. F. Barry, Wiley-Interscience, 3rd Edition (July 1995). For the hydrocarbon modifiers of this invention, the correlation of chromatographic retention time and molecular weight is obtained by using a non-polar capillary GC column and linear hydrocarbon standards. The sample is dissolved in pentane at a concentration of about 1 volume % to make the sample solution. At least 5 linear hydrocarbon standards (chemical formula $C_nH_{n+2}$, molecular weight=14*n+2 g/mol) are dissolved in pentane (each at a concentration of 2 mg/mL) to make the standards solution. The choice of standards is dictated by the molecular weight of the sample, as follows: at least one standard must elute before the sample and at least one standard must elute after the sample, while the other standards span between these two limits. The gas chromatograph is equipped with a flame-ionization detector and a 0.52-mm by 16-m fused-silica capillary column coated with 0.1-mm "G2" stationary phase (dimethylpolysiloxane gum). The carrier gas is helium flowing at a rate of about 10 mL/min. Initially, the column is maintained at a temperature of 35° C., then immediately after injection, the temperature is increased at a rate of 5° C./min to a temperature of 50° C., then increased to 170° C. at a rate of 12° C./min, then increased from 170° C. to 310° C. at a rate of 10° C./min, and maintained at 310° C. for 18 minutes. The injection port temperature is maintained at about 35° C., and the detector temperature is maintained at about 320° C. About 2 μL of the standards solution is injected into the chromatography and the chromatogram (relative weight fraction as a function of elution time) is recorded; this process is repeated for each sample solution. The peak elution times for the standards are used to create a calibration curve of molecular weight vs elution time. This calibration curves is then applied to the sample chromatogram to determine the molecular weight distribution; $M_n$ is the number-average molecular weight calculated from this distribution.

The principles of gel permeation chromatography (GPC) are described in "Modern Size Exclusion Liquid Chromatographs", W. W. Yan, J. J. Kirkland, and D. D. Bly, J. Wiley & Sons (1979). The specific protocol for the hydrocarbon modifiers of this invention follows ASTM D3593. $M_n$ is the number-average molecular weight calculated by applying the calibration curve (molecular weight vs elution time) established using polystyrene standards. The mobile phase is toluene; the column set is chosen to give a linear calibration curve over the entire elution range of interest for the sample(s); and the temperature of the GPC instrumentation is maintained at 35° C.

Melt Flow Rate

The Melt Flow Rate (MFR) is measured according to ASTM D1238 at 230° C., under a load of 2.16 kg unless otherwise noted. The units for MFR are "g/10 min" or the equivalent "dg/min."

Density

Density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm$^3$. The units for density are g/cm$^3$.

Mechanical Properties

Shore hardness was determined according to ASTM D2240, including Shore A and Shore D hardness.

Tensile properties at room temperature (23±2° C.) were determined according to ASTM D638, including tensile strength, 10, 50, 100 and 300% modulus and energy at break. Injection-molded or compression molded tensile bars were of ASTM D638 Type I or Type IV geometry, tested at a speed of 2 inch/min.

Flexure properties at room temperature were determined according to ASTM D790A, including the 1% secant modulus, using a 2 inch support span.

Notched Izod impact strength was determined according to ExxonMobil method modified from ASTM D256, at −18 or −40° C. A TMI Izod Impact Tester was used. Specimens were made by either cutting compression-molded bars in half or cutting the middle out of an injection-molded ASTM D638 Type I tensile bar.

VICAT softening temperature was determined under 200 gram load according to ASTM D648.

Elastic properties including load loss at 50% strain and permanent set were determined on samples extended to either 100% or 200% extension and then allowed to relax. The distance between crossheads corresponding to no change in load (or nominally zero load) was taken as length, L2. The original distance between the grips was the original length (L1) of the deformation zone. The tension set is given by the formula:

Tension Set=100*($L2-L1$)/L1.

The load loss is defined as the percentage decrease in stress at 50% strain of the loading and unloading cycles.

Color

Color was measured on compression molded disks using a Hunter Color Quest XE colorimeter CQX2391 (Hunter Associates Laboratories, Inc.). The test was run according to the protocol developed by the instrument manufacturer, with reference to ASTM E1164. Measurements were made using the D/65 illuminant (light source), 10° observer, and the port in the closed position. Other color scales and measurement instruments could be substituted in work of this type with comparable relative results. On the Hunter "B" scale employed here, 0.0 is considered pure white. Negative values are more blue; positive values are more yellow. The departure from pure white increases with the absolute value of the Hunter "B" scale. Generally, white polymers are more desirable than yellowish ones.

Emissions Testing

The permanence of a fluid in a resin was assessed using a TGA retention test. A Perkin-Elmer TGA 7 was used to measure the weight loss from a sample in a nitrogen atmosphere. Specimens of 10 mil in thickness and 5 mg in weight were prepared by compression molding, then placed in the sample holder (located in the test chamber, which was purged with nitrogen throughout the test). The temperature in the test chamber was then ramped from ambient to 200° C. at 200° C./min, and held at 200° C. for 120 minutes. The weight change as a function of time was recorded. The percentage of fluid remaining in the resin after 120 minutes was determined by % TGA retention=(total weight % loss)/(initial weight fraction of fluid).

Dynamic Mechanical Thermal Analysis

DMTA (Dynamic Mechanical Thermal Analysis) probes the small-strain mechanical response (relaxation behavior) of samples in the solid-state as a function of temperature over a temperature range that included the viscoelastic region prior to melting. The output is the storage modulus (E') and loss modulus (E"). The storage modulus measures the elastic response or the ability of the material to store energy, and the loss modulus measures the viscous response or the ability of the material to dissipate energy. The ratio of E"/E' (=tan[δ]) gives a measure of the damping ability of the material. Energy dissipation mechanisms (i.e., relaxation modes) show up as peaks in tan[δ], and are associated with a drop in E' as a function of temperature. The uncertainty associated with reported values of E' is expected to be on the order of ±10%, due to variability introduced by the compression-molding process.

DMTA was used to measure the glass transition temperature, Tg, of the polymeric composition, determined from the location of the loss tangent maximum. The instrument used was the Rheometrics Solid Analyzer RSA II in the tension mode (0.1% strain, 1 Hz frequency, and 2° C./min heating rate). The sample had a dimension of about 23 mm×6.42 mm×0.7 mm after loading. After molding, the samples were conditioned under ambient conditions for two weeks before the DMTA runs.

Melt Rheology

Dynamic melt viscosity at 190° C. was measured by an ARES Analyzer (1998) equipped with the 25-mm diameter parallel plates. The sample, with a thickness of about 2 mm, was molded at about 176° C. for a total time of 17 minutes (5-minute heating and 12-minute cooling at 25 tons). Most runs employed the auto-strain feature with an initial strain of 10%. The frequency was varied from 0.01 to 100 rad/s.

The dynamic shear viscosity ($\eta^*$) versus frequency ($\omega$) curves were fitted using the Cross model (see, for example, C. W. Macosco, RHEOLOGY: PRINCIPLES, MEASUREMENTS, AND APPLICATIONS, Wiley-V CH, 1994):

$$\eta^* = \frac{\eta_0}{1 + (\lambda\omega)^{1-n}}$$

The three parameters in this model are: $\eta_0$, the zero-shear viscosity; $\lambda$, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1-n on a log($\eta^*$)-log($\omega$) plot. For Newtonian fluids, n=1 and the dynamic viscosity is independent of frequency. For the polymers of interest here, n<1, so that enhanced shear-thinning behavior is indicated by a decrease in n (increase in 1-n).

Differential Scanning Calorimetry

Crystallization temperature ($T_c$) and melting temperature ($T_m$) were measured using Differential Scanning Calorimetry (DSC). This analysis was conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. The sample was then held at 25° C. for 10 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition were analyzed for onset of transition and peak temperature. The melting temperatures reported in the tables are the peak melting temperatures from the second heat unless otherwise indicated. For polymers displaying multiple peaks, the higher melting peak temperature is reported.

Areas under the (baseline-corrected) thermogram is used to determine the heat of fusion ($H_f$) which is then used to calculate the degree of crystallinity. A value of 189 J/g is used for the equilibrium heat of fusion for 100% crystalline polypropylene, so that the percent crystallinity is calculated using the formula, [% crystallinity=area under the curve (J/g)/ 189 (J/g)]*100.

Size-Exclusion Chromatography

Molecular weight distribution was characterized using Size-Exclusion Chromatography (SEC). Molecular weight (weight-average molecular weight, Mw, and number-average molecular weight, Mn) were determined using a High Temperature Size Exclusion Chromatograph (either from Waters Corporation or Polymer Laboratories), equipped with a differential refractive index detector (DRI), an online light scattering detector, and a viscometer. Experimental details not described below, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 cm³/min, and the nominal injection volume was 300 μL. The various transfer lines, columns and differential refractometer (the DRI detector) were contained in an oven maintained at 135° C.

Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. Units on parameters throughout this description of the SEC method are such that concentration is expressed in g/cm³, molecular weight is expressed in g/mol, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_0$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0006 and (dn/dc)=0.104 for propylene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{kM_v^\alpha}$$

where k=0.0002288 and α=0.705 for propylene polymers, and k=0.00018 and α=0.7 for butene polymers. $M_v$ is the viscosity-average molecular weight based on molecular weights determined by LS analysis.

$^{13}$C-NMR Spectroscopy

Polymer microstructure was determined by $^{13}$C-NMR spectroscopy, including the concentration of isotactic and syndiotactic diads ([m] and [r]), triads ([mm] and [rr]), and pentads ([mmmm] and [rrrr]). Samples were dissolved in $d_2$-1,1,2,2-tetrachloroethane. Spectra were recorded at 125° C. using a NMR spectrometer of 75 or 100 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, $^{13}$C-NMR Method", Academic Press, New York, 1977. The percent of methylene sequences of two in length, % $(CH_2)_2$, were calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments were based on H. N. Cheng and J. A. Ewen, Makromol. Chem. 1989, 190, 1931.

Method for Determining NFP Content in Blend

The NFP content (weight percent basis) in a blend is determined using the NMR method described below. This is a solution-based method that involves constructing a calibration curve (or set of calibration curves) of measured parameter(s) as a function of NFP concentration. The calibration blends are prepared using the same polymer(s) and NFP as the blend(s) under investigation but at known modifier concentrations. This set of calibrants must number at least five, and include the neat polymer as well as at least one NFP concentration above the maximum for the blend(s) under investigation but not greater than 50 weight percent NFP. The blend(s) under investigation are analyzed under the same conditions as the calibrants, and the NFP content determined by applying the model.

The method to determine the amount of NFP in a blend is high-temperature solution-phase $^{13}$C nuclear magnetic resonance (HTS-CNMR). The composition is determined using the reference spectra of neat polymer(s) and neat NFP, as well as spectra for a set of calibration blends (i.e., prepared from neat polymer(s) and NFP at known wt % NFP). The spectra are analyzed to determine a set of one or more diagnostic resonances or clusters of resonances that increase or decrease in strength monotonically with increasing modifier content. The corresponding peaks are integrated and their fractional contribution to the total integral calculated as a function of NFP content (weight %) to generate a set of calibration curves. A chemometrics model is developed using these calibration curves to provide a method to calculate the modifier content. The number of diagnostic resonances is chosen to allow the model to predict NFP content with a precision of 1 wt % or better over the calibration range. For a general description of chemometrics and how to develop a chemometrics model, see *Chemometric Techniques for Quantitative Analysis* by Richard Kramer (Marcel Dekker, 1998). The blend(s) of unknown concentration are then run following the same HTS-CNMR procedure as used for the calibrants, and the results analyzed according to the model to determine the weight % NFP.

A typical HTS-CNMR procedure is as follows. Samples are prepared in 1,1,2,2-tetrachloroethane-$d_2$, with chromium acetylacetonate [Cr(acac)$_3$] added as a relaxation agent to accelerate data acquisition. The Cr(acac)$_3$ concentration in the stock solvent is approximately 15 mg/ml. Sample concentrations are between 10 and 15 weight %. Free induction decays of 15,000 transients are accumulated at a temperature of 120° C. on a Varian UnityPlus 500 using a 10 mm broadband probe. Spectra are acquired with a 90° carbon excitation pulse, and inverse-gated WALTZ-16 proton decoupling. An acquisition time of approximately 1 second and recycle delay of 3.5 seconds are used to allow quantitative integration. Solvent choice and sample concentration may be adjusted to accommodate different solubility and to minimize spectral interference based on the specific composition of the blend. See *Carbon*-13 *NMR Spectroscopy: High-Resolution Methods and Applications in Organic Chemistry and Biochemis-*

*try*, 3rd edition, Eberhard Breitmaier and Wolfgang Voelter (VCH, 1990) for a general description of CNMR techniques.

EXAMPLES

The present invention, while not meant to be limiting by, may be better understood by reference to the following examples and tables. Polymers and NFP's used in these examples are described in Tables 1 and 2.

Sample Preparation Methods

Samples were prepared by blending the desired composition, followed by compression molding or injection molding.

Blending

The components of the present invention were blended using a Brabender. The procedure involved mixing polymer pellets with the plasticizer in a heated C. W. Brabender Instruments Plasticorder to achieve a homogeneous melt at the desired plasticizer concentration. The Brabender was equipped with a Prep-Mixer head (approximately 200 cm$^3$ volume) and roller blades. The operating temperature was above the melting point of the polymer, typically in the range of 180 to 200° C. Polymer was first melted in the Brabender at 60 RPM. Then, while mixing, the plasticizer was added slowly to prevent pooling in the melted polymer. The blend was then mixed for 5 minutes at 60 RPM under a nitrogen purge. The Brabender was opened and the melt removed from the mixing head and blades as quickly as possible, and allowed to solidify. For those blends later subjected to injection molding, the pieces of material from the Brabender were cut into smaller pieces using a guillotine, then ground into even smaller pieces using a Wiley Mill.

Compression Molding

The following is a description of a typical compression molding protocol. Material to be molded was preheated at 350° F. (177° C.) with no compressive load for 5 minutes. Then 25 tons of compressive load was applied and held for 6 minutes before controlled cooling started at 15° C./min according to ASTM D4703-03.

Injection Molding

ASTM-family tensile bars, flexure bars, and impact disks were molded using Nissei (20 ton) injection molding equipment following ASTM D4101 with the following deviations: ASTM D638 Type IV tensile bars and ASTM D790 flexure bars were molded using a mold temperature of 40° C. and inject time of 30 seconds.

Examples 1-16

Compression molded-part properties of plasticized propylene plastomer 1 and 2 are shown Tables 3, 4 and 5.

Examples 16-61

Compression molded-part properties of compositions consisting of a polypropylene (HPP, mPP or ICP), a propylene plastomer, and plasticizer are shown in Tables 6, 7, 8, 9 and 10.

The three-component composition brings great flexibility in designing a final product. As illustrated in Tables 7 to 10, by varying compositions, blends can be formulated with various values of tensile strength, stiffness, upper service temperature and tension set while maintaining the same hardness. Combination of properties can be chosen to meet specific end-use requirements.

Examples 62-65

Table 11 gives injection molded-part properties of HPP dominated HPP/Propylene Plastomer 1 blend plasticized with SpectraSyn 10. Raising plasticizer content increased the flexibility and improved low temperature impact of the blends.

Examples 66-68

Table 12 compares the properties of Propylene Plastomer 1 with 60% SpectraSyn 10, Sunpar 150 and Sunpar 2280.

TABLE 1

Propylene polymers used in Examples

| Polymer | Description |
| --- | --- |
| Propylene Plastomer 1 | Experimental propylene ethylene copolymer having about 16 weight % ethylene, an MFR of about 3 dg/min, an Hf of about 11 J/g, and an isotactic triad fraction (tacticity index) of about 90% made using a metallocene catalyst (dimethylsilylbisindenyl hafnium dimethyl with dimethylaniliniumtetrakis(pentafluorophenyl) borate) in a solution process at about 70° C. |
| Propylene Plastomer 2 | Experimental propylene ethylene copolymer having about 11 weight % ethylene, an MFR of about 10 dg/min, an Hf of about 40 J/g, and an isotactic triad fraction (tacticity index) of about 90% made using a metallocene catalyst (dimethylsilylbisindenyl hafnium dimethyl with dimethylaniliniumtetrakis(pentafluorophenyl) borate) in a solution process at about 70° C. |
| Metallocene Polypropylene (mPP) | Experimental isotactic polypropylene produced using a metallocene catalysts (dimethylsilyl bis (2-methyl-,4-phenylindenyl) zirconium dimethyl with (dimethylaniliniumtetrakis(pentafluorophenyl) borate) at 80° C. in a liquid propylene slurry having an MFR of about 7.5 dg/min, a peak melting point of about 152° C.; an Mw/Mn of less than 2.3; and 1000 ppm Irgnox 2215. |

TABLE 1-continued

Propylene polymers used in Examples

| Polymer | Description |
|---|---|
| Ziegler-Natta Polypropylene (HPP) | Homopolypropylene produced using a Ziegler-Natta Catalyst system (sold under the trade name PP3155 by ExxonMobil Chemical Co. Houston, Texas) having a reported MFR of 36 g/10 min, a reported density of 0.9 g/cc and a reported Mw/Mn of 2.8, and a melting point of about 161° C. |
| Impact Copolymer (ICP) | Polypropylene impact copolymer produced using a Ziegler-Natta catalyst system that is then modified with an ethylene polymer sold under the trade name of PP8244E1 by ExxonMobil Chemical Co. Houston Texas). The ICP has a melting point of about 161° C., an MFR of about 27 dg/min, and density of about 0.90 g/cc. |

TABLE 2

NFP's used in Examples and their properties

| Fluid | Source | KV @ 100° C. (cSt) | Flash Point (° C.) | VI | Pour Point (° C.) | Mn (g/mol) |
|---|---|---|---|---|---|---|
| SpectraSyn 10 | ExxonMobil Chemical | 10 | 266 | 137 | −54 | 720 |
| SpectraSyn 40 | ExxonMobil Chemical | 40 | 281 | 147 | −39 | 1700 |
| SpectraSyn Ultra 150 | ExxonMobil Chemical | 150 | >265 | 214 | −33 | 3700 |
| Sunpar 150 | Sunoco | 9.8 | 260 | — | −15 | 517 |
| Sunpar 2280 | Sunoco | 32 | 302 | — | −15 | 776 |

TABLE 3

Compression molded-part properties of Examples 1-8.

| | EXAMPLE | | | | | | | |
|---|---|---|---|---|---|---|---|---|
| | 1 | 2 | 3 | 4 | 5 | 6 | 7 | 8 |
| Propylene Plastomer 1 | 100 | 95 | 90 | 80 | 70 | 60 | 50 | 40 |
| SpectraSyn 10 | 0 | 5 | 10 | 20 | 30 | 40 | 50 | 60 |
| Shore A Hardness | 67.6 | 65 | 61.4 | 54 | 47.6 | 40 | 29.4 | 18.4 |
| Tensile Properties | | | | | | | | |
| Tensile strength (MPa) | 8.6 | 7.9 | 6.5 | 5 | 3.8 | 2.7 | 1.9 | 1.1 |
| 10% modulus (MPa) | 0.2 | 0.2 | 0.2 | 0.1 | 0.1 | 0.1 | 0 | 0 |
| 50% modulus (MPa) | 1.2 | 1.1 | 0.9 | 0.7 | 0.5 | 0.3 | 0.2 | 0.1 |
| 100% modulus (MPa) | 1.6 | 1.4 | 1.2 | 0.9 | 0.7 | 0.5 | 0.3 | 0.2 |
| 300% modulus (MPa) | 1.9 | 1.8 | 1.6 | 1.2 | 0.9 | 0.7 | 0.4 | 0.3 |
| Energy at break (ft-lbf) | 32.8 | 30.8 | 26.1 | 19.5 | 14.7 | 9.9 | 6.3 | 4 |
| Flex Properties | | | | | | | | |
| 1% Secant modulus (psi) | 1940 | 1749 | 1687 | 1302 | 992 | 731 | 531 | 397 |
| Tangent modulus (psi) | 2054 | 1613 | 2151 | 1287 | 702 | 925 | 687 | 363 |
| Elasticity | | | | | | | | |
| Load loss at 50% strain (%) | 38 | 38 | 38 | 38 | 41 | 42 | 48 | 49 |
| Permanent set at 50% strain (%) | 8 | 7.6 | 6.9 | 5.9 | 6.1 | 5.9 | 6.4 | 6.4 |
| Tg, ° C. | −24 | −27 | −30 | −35 | −41 | −48 | −53 | −59 |
| Complex Viscosity, kPa-s | | | | | | | | |
| @ 190° C., 1 rad/s | 64 | 48 | 38 | 23 | 14 | 5.3 | 3.1 | 1.1 |
| @ 190° C., 10 rad/s | 39 | 30 | 25 | 16 | 12 | 4.3 | 2.7 | 1.0 |
| @ 190° C., 100 rad/s | 13 | 10 | 9.1 | 6.1 | 4.8 | 2.0 | 1.4 | 0.63 |

TABLE 4

Compression molded-part properties of Examples 9-13.

| | EXAMPLE | | | | |
|---|---|---|---|---|---|
| | 9 | 10 | 11 | 12 | 13 |
| Propylene Plastomer 2 | 100 | 90 | 80 | 70 | 60 |
| SpectraSyn 10 | 0 | 10 | 20 | 30 | 40 |
| Shore A Hardness | 90 | 85 | 78 | 71 | 63 |
| Tensile Properties | | | | | |
| Tensile strength (MPa) | 22 | 19 | 16 | 14 | 11 |
| 10% modulus (MPa) | 2.6 | 1.7 | 1.1 | 0.8 | 0.5 |
| 50% modulus (MPa) | 4.3 | 3.4 | 2.5 | 2.1 | 1.4 |
| 100% modulus (MPa) | 4.1 | 3.5 | 2.8 | 2.5 | 1.7 |
| 300% modulus (MPa) | 4.4 | 3.7 | 3.1 | 3.0 | 2.1 |
| Flex Properties | | | | | |
| 1% Secant modulus (psi) | 7049 | 4334 | 3079 | 2081 | 1461 |
| Tangent modulus (psi) | 6830 | 4494 | 2680 | — | 958 |
| Elasticity | | | | | |
| Load loss at 50% strain (%) | 69 | 63 | 58 | 59 | 56 |
| Permanent set at 50% strain (%) | 14.7 | 11.4 | 10.3 | 10.7 | 9 |
| Tg, ° C. | −16 | −22 | −28 | −34 | −40 |

TABLE 5

Compression molded-part properties of Examples 14-16

| | EXAMPLE | | |
|---|---|---|---|
| | 14 | 15 | 16 |
| Propylene Plastomer 1 | 60 | 60 | 60 |
| SpectraSyn 10 | 40 | | |
| SpectraSyn 40 | | 40 | |
| SpectraSyn Ultra 150 | | | 40 |
| Shore A Hardness | 40 | 42.2 | 39.4 |
| Tensile Properties | | | |
| Tensile strength (MPa) | 2.7 | 3.5 | 3.6 |
| 10% modulus (MPa) | 0.1 | 0 | 0 |
| 50% modulus (MPa) | 0.3 | 0.3 | 0.2 |
| 100% modulus (MPa) | 0.5 | 0.6 | 0.6 |
| 300% modulus (MPa) | 0.7 | 0.8 | 0.9 |
| Energy at break (ft-lbf) | 0.9 | 12.6 | 13.7 |
| Flex Properties | | | |
| 1% Secant modulus (psi) | 731 | 883 | 1119 |
| Tangent modulus (psi) | 925 | 800 | 975 |
| Elasticity | | | |
| Load loss at 50% strain (%) | 42 | 36 | 41 |
| Permanent set at 50% strain (%) | 5.9 | 3.5 | 5.2 |
| Tg, ° C. | −48 | −41 | −32 |
| Complex Viscosity, kPa-s | | | |
| @ 190° C., 1 rad/s | 5.3 | 9.3 | 9.9 |
| @ 190° C., 10 rad/s | 4.3 | 7.2 | 7.3 |
| @ 190° C., 100 rad/s | 2.0 | 3.1 | 3.1 |

TABLE 6

Compression molded-part properties of Examples 17-21

| | EXAMPLE | | | | |
|---|---|---|---|---|---|
| | 17 | 18 | 19 | 20 | 21 |
| Propylene Plastomer 1 | 80 | 72 | 56 | 40 | 32 |
| Ziegler-Natta Polypropylene | 20 | 18 | 14 | 10 | 8 |
| SpectraSyn 10 | 0 | 10 | 30 | 50 | 60 |
| Density (g/cm³) | 0.870 | 0.866 | 0.858 | <0.853 | <0.853 |
| Hardness | | | | | |
| Shore A | 78 | 74 | 60 | 42 | 26 |
| Shore D | 29 | 24.2 | <20 | <20 | <20 |
| Tensile Properties | | | | | |
| Tensile strength (MPa) | 14.8 | 11.9 | 6.4 | 3 | 1.7 |
| 10% modulus (MPa) | 0.5 | 0.3 | 0.1 | 0 | 0 |
| 50% modulus (MPa) | 2.2 | 1.6 | 0.8 | 0.3 | 0.1 |
| 100% modulus (MPa) | 2.6 | 2 | 1.1 | 0.5 | 0.2 |
| 300% modulus (MPa) | 3.6 | 2.8 | 1.7 | 0.8 | 0.4 |
| Energy at break (ft-lbf) | 58.2 | 50.9 | 27.6 | 13.9 | 6.5 |
| Flex Properties | | | | | |
| 1% Secant modulus (psi) | 4045 | 2594 | 1149 | 367 | — |
| Tangent modulus (psi) | 3664 | 2674 | 957 | — | — |
| Elasticity | | | | | |
| Load loss at 50% strain (%) | 79 | 69 | 69 | 65 | 65 |
| Permanent set at 50% strain (%) | 19.9 | 16.4 | 14.8 | 9 | 11.1 |
| Tg, ° C. | −24 | −28 | −44 | −54 | |

TABLE 6-continued

Compression molded-part properties of Examples 17-21

|  | EXAMPLE | | | | |
|---|---|---|---|---|---|
|  | 17 | 18 | 19 | 20 | 21 |
| Complex Viscosity, kPa-s | | | | | |
| @ 190° C., 1 rad/s |  | 47 | 30 | 9.6 | 2.2 |
| @ 190° C., 10 rad/s |  | 32 | 21 | 7.6 | 1.9 |
| @ 190° C., 100 rad/s |  | 11 | 7.7 | 3.4 | 1.1 |
| Melting and Crystallization | | | | | |
| Tm, ° C. |  | 164 | 163 | 159 | 154 |
| Tc ° C. |  | 99 | 102 | 100 | 93 |

TABLE 7

Compression molded-part properties of Examples 22-31

|  | EXAMPLE | | | | | | | | | |
|---|---|---|---|---|---|---|---|---|---|---|
|  | 22 | 23 | 24 | 25 | 26 | 27 | 28 | 29 | 30 | 31 |
| Metallocene PP | 28.3 | 20.0 | 36.7 | 20.0 | 53.3 | 45.0 | 28.3 | 70.0 | 45.0 | 20.0 |
| Propylene Plastomer 1 | 28.3 | 70.0 | 36.7 | 20.0 | 28.3 | 45.0 | 53.3 | 20.0 | 20.0 | 45.0 |
| SpectraSyn 10 | 43.3 | 10.0 | 26.7 | 60.0 | 18.3 | 10.0 | 18.3 | 10.0 | 35.0 | 35.0 |
| Melt Flow Rate (dg/min) | 130.0 | 5.4 | 26.0 | 866.0 | 19.1 | 8.4 | 12.8 | 13.6 | 94.4 | 47.8 |
| Shore A Hardness | 73 | 70 | 85 | 51 | 86 | 87 | 74 | 86 | 84 | 55 |
| Tensile Properties | | | | | | | | | | |
| Tensile Strength (MPa) | 6.3 | 15.9 | 13.5 | 1.4 | 15.3 | 19.6 | 15.5 | 21.0 | 8.6 | 8.3 |
| Strain at break (%) | 809 | 1561 | 1164 | 174 | 747 | 1177 | 1415 | 205 | 303 | 1377 |
| 10% Modulus (MPa) | 1.5 | 1.1 | 4.1 | 0.4 | 10.0 | 7.8 | 2.0 | 20.3 | 5.1 | 0.5 |
| 50% Modulus (MPa) | 2.8 | 2.2 | 6.0 | 1.1 | 11.9 | 9.6 | 3.4 | 17.5 | 7.4 | 1.2 |
| 100% Modulus (MPa) | 3.3 | 2.6 | 6.6 | 1.4 | 11.6 | 9.9 | 4.2 | 16.4 | 8.0 | 1.6 |
| 300% Modulus (MPa) | 4.4 | 4.2 | 7.7 | — | 11.9 | 10.8 | 6.2 | — | 7.0 | 2.6 |
| Flex Properties | | | | | | | | | | |
| 1% Secant modulus (psi) | 4402 | 2736 | 13390 | 753 | 42007 | 31784 | 5014 | 91017 | 17116 | 1416 |
| VICAT Softening Temperature at 200 gram load (° C.) | 88.8 | 48.2 | 130 | 47.1 | 144.2 | 140.8 | 54.5 | 148.3 | 137.8 | 43.7 |
| Impact Properties | | | | | | | | | | |
| Notched Izod at −18° C. (ft-lb/in) | — | — | — | — | 3.60 | 15.30 | — | 0.72 | 2.30 | — |
| Notched Izod at −40° C. (ft-lb/in) | — | 0.62 | 12.54 | — | 1.72 | 1.99 | 15.14 | 0.46 | 1.64 | — |
| Elasticity | | | | | | | | | | |
| Load loss at 50% strain (%) | 92.4 | 69.9 | 90.8 | 92.6 | 97.8 | 95.0 | 83.4 | 100.0 | 97.2 | 79.9 |
| Permanent set (%) | 27.7 | 12.5 | 30.3 | 25.3 | 59.2 | 37.4 | 23.0 | 57.8 | 39.1 | 16.6 |

TABLE 8

Compression molded-part properties of Examples 32-41

|  | EXAMPLE | | | | | | | | | |
|---|---|---|---|---|---|---|---|---|---|---|
|  | 32 | 33 | 34 | 35 | 36 | 37 | 38 | 39 | 40 | 41 |
| Impact Copolymer | 28.3 | 20.0 | 36.7 | 20.0 | 53.3 | 45.0 | 28.3 | 70.0 | 45.0 | 20.0 |
| Propylene Plastomer 1 | 28.3 | 70.0 | 36.7 | 20.0 | 28.3 | 45.0 | 53.3 | 20.0 | 20.0 | 45.0 |
| SpectraSyn 10 | 43.3 | 10.0 | 26.7 | 60.0 | 18.3 | 10.0 | 18.3 | 10.0 | 35.0 | 35.0 |
| Melt Flow Rate (dg/min) | 126.3 | 5.3 | 27.8 | 920.2 | 18.1 | 8.1 | 11.0 | 15.8 | 84.2 | 44.4 |

TABLE 8-continued

Compression molded-part properties of Examples 32-41

| | EXAMPLE | | | | | | | | | |
|---|---|---|---|---|---|---|---|---|---|---|
| | 32 | 33 | 34 | 35 | 36 | 37 | 38 | 39 | 40 | 41 |
| Hardness | | | | | | | | | | |
| Shore A | 54.0 | 72.4 | 70.2 | 34.8 | 89.6 | 83.6 | 69.2 | >90 | 79.2 | 56.0 |
| Shore D | <20 | 22.2 | 20.2 | <20 | 35.2 | 30.8 | 20.8 | 45.8 | 24.0 | <20 |
| Tensile Properties | | | | | | | | | | |
| Tensile Strength (MPa) | 3.3 | 9.4 | 7.5 | 0.9 | 7.2 | 12.9 | 9.2 | 7.7 | 3.8 | 4.9 |
| Strain at break (%) | 1453 | — | 1806 | 893 | 791 | 1738 | — | 210 | 528 | — |
| 10% Modulus (MPa) | 0.0 | 0.2 | 0.2 | 0.0 | 0.7 | 0.5 | 0.1 | 4.1 | 0.1 | 0.0 |
| 50% Modulus (MPa) | 0.5 | 1.3 | 1.2 | 0.1 | 3.6 | 2.8 | 1.2 | 6.4 | 2.0 | 0.5 |
| 100% Modulus (MPa) | 0.8 | 1.8 | 1.6 | 0.3 | 4.1 | 3.5 | 1.6 | 5.6 | 2.6 | 0.8 |
| 300% Modulus (MPa) | 1.4 | 2.4 | 2.5 | 0.6 | 5.2 | 4.9 | 2.3 | — | 3.3 | 1.3 |
| Energy at break (ft-lbf) | 13.0 | 41.5 | 33.1 | 2.0 | 17.0 | 56.6 | 40.3 | 5.8 | 6.2 | 22.3 |
| Flex Properties | | | | | | | | | | |
| 1% Secant modulus (psi) | 960 | 2256 | 3356 | 317 | 14709 | 7790 | 2051 | 43384 | 6236 | 1037 |
| VICAT Softening Temp. at 200 gram load (° C.) | 41.3 | 46.2 | 46 | — | 106.9 | 56.5 | 45 | 151.4 | 85 | 40.7 |
| Elasticity | | | | | | | | | | |
| Load loss at 50% strain (%) | 87 | 67 | 89 | 91 | 94 | 87 | 70 | 98 | 96 | 70 |
| Permanent set (%) | 21 | 13.9 | 25.1 | 23.5 | 34.8 | 25.9 | 11.6 | 43.7 | 36.5 | 11.4 |
| Complex Viscosity, kPa-s | | | | | | | | | | |
| @ 190° C., 0.1 rad/s | 0.35 | 4.8 | 1.2 | 0.06 | 1.6 | 3.5 | 2.4 | 2.1 | 0.58 | 0.90 |
| @ 190° C., 1 rad/s | 0.34 | 3.8 | 1.1 | 0.06 | 1.4 | 3.0 | 2.2 | 1.8 | 0.55 | 0.85 |
| @ 190° C., 10 rad/s | 0.27 | 2.5 | 0.79 | 0.05 | 0.97 | 2.0 | 1.5 | 1.1 | 0.41 | 0.64 |
| @ 190° C., 100 rad/s | 0.13 | 0.92 | 0.34 | 0.03 | 0.41 | 0.74 | 0.48 | 0.38 | 0.19 | 0.25 |

TABLE 9

Compression molded-part properties of Examples 42-51

| | EXAMPLE | | | | | | | | | |
|---|---|---|---|---|---|---|---|---|---|---|
| | 42 | 43 | 44 | 45 | 46 | 47 | 48 | 49 | 50 | 51 |
| Metallocene Polypropylene | 28.3 | 20.0 | 36.7 | 20.0 | 53.3 | 45.0 | 28.3 | 70.0 | 45.0 | 20.0 |
| Propylene Plastomer 2 | 28.3 | 70.0 | 36.7 | 20.0 | 28.3 | 45.0 | 53.3 | 20.0 | 20.0 | 45.0 |
| SpectraSyn 10 | 43.3 | 10.0 | 26.7 | 60.0 | 18.3 | 10.0 | 18.3 | 10.0 | 35.0 | 35.0 |
| Melt Flow Rate (dg/min) | 239.7 | 13.1 | 45.8 | 1140.0 | 29.1 | 15.1 | 22.9 | 18.5 | 98.7 | 95.1 |
| Hardness | | | | | | | | | | |
| Shore A | 78.0 | 84.0 | 86.0 | 63.0 | >90 | 90.0 | 84.0 | 87.0 | 87.0 | 76.0 |
| Shore D | 25.8 | 36.2 | 37.8 | <20 | 49.6 | 48.4 | 35.4 | 59.6 | 39.8 | 34.2 |
| Tensile Properties | | | | | | | | | | |
| Tensile Strength (MPa) | 6.0 | 20.9 | 16.6 | 2.0 | 18.8 | 21.2 | 19.8 | 22.0 | 8.6 | 12.3 |
| Strain at break (%) | 646 | 1607 | 1411 | 146 | 1164 | 1158 | 1523 | 269 | 79 | 1554 |
| 10% Modulus (MPa) | 2.0 | 3.8 | 4.6 | 0.7 | 9.3 | 9.3 | 4.1 | 19.0 | 5.6 | 1.7 |
| 50% Modulus (MPa) | 4.1 | 6.0 | 7.8 | 1.7 | 13.6 | 12.8 | 6.7 | 19.2 | 8.6 | 3.7 |
| 100% Modulus (MPa) | 4.6 | 6.2 | 8.2 | 2.0 | 12.3 | 12.5 | 7.2 | 16.7 | — | 4.2 |
| 300% Modulus (MPa) | 5.3 | 7.4 | 8.7 | — | 12.0 | 12.4 | 8.3 | 17.2 | — | 5.2 |
| Flex Properties | | | | | | | | | | |
| 1% Secant modulus (psi) | 4965 | 10319 | 14462 | 1563 | 35816 | 35544 | 11033 | 88242 | 18267 | 4326 |
| VICAT Softening Temperature at 200 gram load (° C.) | 102.5 | 78.6 | 132.3 | 62.1 | 142.2 | 140.4 | 96.9 | 147.7 | 137.4 | 77.5 |

TABLE 9-continued

Compression molded-part properties of Examples 42-51

| | EXAMPLE | | | | | | | | | |
|---|---|---|---|---|---|---|---|---|---|---|
| | 42 | 43 | 44 | 45 | 46 | 47 | 48 | 49 | 50 | 51 |
| Impact Properties | | | | | | | | | | |
| Notched Izod at −40° C. (ft-lb/in) | — | 0.346 | 1.097 | — | 0.569 | 0.37 | 1.662 | 0.352 | 0.685 | — |
| Elasticity | | | | | | | | | | |
| Load loss at 50% strain (%) | 92.7 | 81.8 | 91.9 | 92.2 | 100.0 | 96.0 | 86.3 | 99.7 | — | 82.7 |
| Permanent set (%) | 28.0 | 22.5 | 31.1 | 25.7 | 43.9 | 37.0 | 25.3 | 62.4 | — | 18.9 |

TABLE 10

Compression molded-part properties of Examples 52-61

| | EXAMPLE | | | | | | | | | |
|---|---|---|---|---|---|---|---|---|---|---|
| | 52 | 53 | 54 | 55 | 56 | 57 | 58 | 59 | 60 | 61 |
| Impact Copolymer | 28.3 | 20.0 | 36.7 | 20.0 | 53.3 | 45.0 | 28.3 | 70.0 | 45.0 | 20.0 |
| Propylene Plastomer 2 | 28.3 | 70.0 | 36.7 | 20.0 | 28.3 | 45.0 | 53.3 | 20.0 | 20.0 | 45.0 |
| SpectraSyn 10 | 43.3 | 10.0 | 26.7 | 60.0 | 18.3 | 10.0 | 18.3 | 10.0 | 35.0 | 35.0 |
| Melt Flow Rate (dg/min) | 284.0 | 13.7 | 52.7 | 1623.0 | 31.4 | 17.1 | 25.4 | 20.5 | 168.0 | 136.0 |
| Hardness | | | | | | | | | | |
| Shore A | 70 | 85 | 86 | 45 | >90 | >90 | 84 | >90 | 81 | 72 |
| Shore D | <20 | 30.6 | 25.8 | <20 | 35.6 | 35.2 | 26.6 | 43.4 | 23.8 | <20 |
| Tensile Properties | | | | | | | | | | |
| Tensile Strength (MPa) | 5.1 | 19.8 | 10.7 | 1.9 | 10.2 | 16.5 | 17.1 | 10.4 | 4.9 | 10.9 |
| Strain at break (%) | 945 | 1751 | 1301 | 626 | 765 | 1254 | 1776 | 211 | 338 | 1733 |
| 10% Modulus (MPa) | 1.1 | 3.0 | 2.6 | 0.4 | 5.1 | 5.1 | 2.8 | 9.1 | 2.5 | 1.3 |
| 50% Modulus (MPa) | 2.1 | 4.8 | 4.3 | 0.9 | 7.0 | 6.9 | 4.5 | 9.4 | 4.0 | 2.5 |
| 100% Modulus (MPa) | 2.4 | 5.0 | 4.6 | 1.1 | 7.3 | 7.1 | 4.8 | 9.9 | 4.4 | 2.8 |
| 300% Modulus (MPa) | 3.2 | 5.7 | 5.5 | 1.5 | 8.0 | 8.2 | 5.7 | 10.8 | 4.9 | 3.7 |
| Flex Properties | | | | | | | | | | |
| 1% Secant modulus (psi) | 3209 | 7751 | 8649 | 860 | 19062 | 16343 | 8203 | 42055 | 7935 | 3328 |
| VICAT Softening Temperature at 200 g load (° C.) | 62.4 | 67.6 | 91.8 | 46.7 | 125.7 | 92.5 | 75.8 | 152.6 | 89.3 | 58.1 |
| Elasticity | | | | | | | | | | |
| Load loss at 50% strain (%) | 88 | 76 | 90 | 88 | 95 | 91 | 81 | 96 | 96 | 77 |
| Permanent set (%) | 22.5 | 18.7 | 27.5 | 21.6 | 39.3 | 33.3 | 22.0 | 40.5 | 35.9 | 15.9 |

TABLE 11

Injection molded-part properties of Examples 62-65

| | EXAMPLE | | | |
|---|---|---|---|---|
| | 62 | 63 | 64 | 65 |
| Ziegler-Natta PP | 67 | 60 | 53 | 47 |
| Propylene Plastomer 1 | 33 | 30 | 27 | 23 |
| SpectraSyn 10 | 0 | 10 | 20 | 30 |
| Shore D Hardness | 61 | 48 | 51 | 38 |
| Tensile Properties | | | | |
| Tensile strength (psi) | 2561 | 1944 | 1460 | 1073 |
| Elongation at break (%) | 630 | 920 | 1041 | 838 |
| Elongation at yield (%) | 24.6 | 39.2 | 46.8 | 60.0 |
| Flex Properties | | | | |
| 1% Secant modulus (kpsi) | 73 | 43 | 26 | 15 |
| Impact Properties | | | | |
| RTNI (ft-lb/in) | no break | no break | no break | — |
| Notched Izod at −18° C. (ft-lb/in) | 0.8 | 1.4 | 2.3 | 3.8 |
| Tg, ° C. | −27, 2.4 | −38, −6.7 | −47, −12 | −54, −27 |
| Complex Viscosity, kPa-s | | | | |
| @ 190° C., 1 rad/s | 1.6 | 1.1 | 0.60 | 0.31 |
| @ 190° C., 10 rad/s | 1.3 | 0.81 | 0.48 | 0.27 |
| @ 190° C., 100 rad/s | 0.54 | 0.36 | 0.23 | 0.14 |

TABLE 12

Compression molded-part properties of Examples 66-68

| | EXAMPLE | | |
|---|---|---|---|
| | 66 | 67 | 68 |
| Propylene Plastomer 1 | 40 | 40 | 40 |
| SpectraSyn 10 | 60 | | |
| Sunpar 150 | | 60 | |
| Sunpar 2280 | | | 60 |
| Shore A Hardness | 20.6 | <20 | 23.2 |
| Tensile Properties | | | |
| Tensile strength (MPa) | 0.9 | 0.5 | 1 |
| 10% modulus (MPa) | 0 | 0 | 0 |
| 50% modulus (MPa) | 0.1 | 0 | 0.1 |
| 100% modulus (MPa) | 0.1 | 0.1 | 0.2 |
| 300% modulus (MPa) | 0.2 | 0.1 | 0.2 |
| Energy at break (ft-lbf) | 2.7 | 1.3 | 3.3 |
| Elasticity | | | |
| Load loss at 50% strain (%) | 62 | 71 | 62 |
| Permanent set at 50% strain (%) | 8.1 | 11.9 | 7.2 |
| Tg, ° C. | −55 | −47 | −38 |
| Weight loss at 150° C./2 hr (%) | 0.3 | 0.7 | 0.2 |
| Color-Hunter "b" | 3.1 | 15.7 | 34.9 |

In alternate embodiments, this invention relates to:

1. A composition comprising 1) from 1 to 98 weight % of a first propylene polymer having a melting point of 100° C. or more, 2) from 5 to 98 weight % of a second propylene polymer having a heat of fusion of 70 J/g or less and a tacticity index of 75% or more, 3) from 0.5 to 75 weight % of a non-functionalized plasticizer ("NFP") having a viscosity index of 120 or more, preferably 130 or more, based upon the weight of the first polymer, second polymer, and the NFP.

2. The composition of paragraph 1 wherein the NFP has a flash point of 200° C. or more, preferably 210° C. or more.

3. The composition of paragraph 1 or 2 wherein the NFP has a kinematic viscosity of 10 cSt or more at 100° C., preferably 35 cSt or more at 100° C.

4. The composition of paragraph 1, 2 or 3 wherein the NFP has a pour point of −10° C. or less, preferably −20° C. or less, preferably −25° C. or less.

5. The composition of paragraph 1, 2, 3, or 4 wherein the NFP has a kinematic viscosity at 25° C. of 30,000 cSt or less.

6. The composition of paragraph 1, 2, 3, 4, or 5 wherein the NFP has a distillation range of 40° C. or less.

7. The composition of paragraph 1, 2, 3, 4, 5, or 6 wherein the NFP has a final boiling point of from 115 to 500° C.

8. The composition of paragraph 1, 2, 3, 4, 5, 6, or 7 wherein the NFP has an Mn of 100 to 20,000 g/mol.

9. The composition of paragraph 1, 2, 3, 4, 5, 6, 7, or 8 wherein the NFP has a dielectric constant at 20° C. of less than 3.0.

10. The composition of paragraph 1, 2, 3, 4, 5, 6, 7, 8, or 9 wherein the NFP has a kinematic viscosity at 25° C. of from 0.5 to 20 cSt.

11. The composition of paragraph 1, 2, 3, 4, 5, 6, 7, 8, 9, or 10 wherein the NFP has a Tg of 0° C. or less.

12. The composition of paragraph 1, 2, 3, 4, 5, 6, 7, 8, 9, 10, or 11 wherein where the non-functionalized plasticizer has a specific gravity of 0.85 or less.

13. The composition of any of paragraphs 1 to 12 wherein where the non-functionalized plasticizer comprises oligomers of $C_5$ to $C_{14}$ olefins having a Kinematic viscosity of 10 cSt or more at 100° C.

14. The composition of any of paragraphs 1 to 12 wherein the non-functionalized plasticizer comprises an oligomer of decene having a carbon number of 40-200.

15. The composition of any of paragraphs 1 to 12 wherein the non-functionalized plasticizer comprises oligomers of decene having a carbon number of 200 to 1500.

16. The composition of any of paragraphs 1 to 12 wherein the non-functionalized plasticizer comprises oligomers of 1-pentene, 1-hexene, 1-heptene, 1-octene, 1-nonene, 1-decene, 1-undecene and or 1-dodecene.

17. The composition of any of paragraphs 1 to 12 where the non-functionalized plasticizer comprises a mineral oil having a saturates levels of 90% or more and sulfur contents of 0.03% or less.

18. The composition of any of paragraphs 1 to 12 where the non-functionalized plasticizer comprises a mixture of branched and normal paraffins having from 6 to 50 carbon atoms and a ratio of branch paraffin to n-paraffin ratio ranging from 0.5:1 to 9:1, preferably, where the mixture comprises greater than 50 wt % mono-methyl species.

19. The composition of paragraph 18 where the plasticizer comprises a mixture of branched and normal paraffins having from 10 to 16 carbon atoms and a ratio of branch paraffin to n-paraffin ratio ranging from 1:1 to 4:1.

20. The composition of any of paragraphs 1 to 12, 18 or 19 where the non-functionalized plasticizer comprises a linear or branched paraffinic hydrocarbon composition having a number average molecular weight of 500 to 20,000, having less than 10% sidechains having 4 or more carbons, and having at least 1 or 2 carbon branches present at 15 weight % or more, and where the NFP comprises less than 2 weight % cyclic paraffins.

21. The composition of any of paragraphs 1 to 20 where non-functional ized plasticizer is present at 0.5 to 35 weight %, preferably 1 to 15 weight %.

22. The composition of any of paragraphs 1 to 21 where the composition comprises less than 0.1 weight % of an elastomer, based upon the weight of the composition.
23. The composition of any of paragraphs 1 to 22 wherein the first polymer comprises isotactic polypropylene.
24. The composition of any of paragraphs 1 to 22 wherein the first propylene polymer comprises syndiotactic polypropylene.
25. The composition of any of paragraphs 1 to 24 wherein the first propylene polymer has a melting point of 130° C. or more, preferably 140° C. or more, preferably 150° C. or more.
26. The composition of any of paragraphs 1 to 25 wherein the first propylene polymer has a weight average molecular weight of 100,000 g/mol or more, alternately 200,000 g/mol or more.
27. The composition of any of paragraphs 1 to 26 wherein the first propylene polymer has a melt flow rate of 0.1 to 200 dg/min or more.
28. The composition of any of paragraphs 1 to 27 wherein the first propylene polymer has a % crystallinity of 35% or more.
29. The composition of any of paragraphs 1 to 28 has a an Mw/Mn of 1.5 to 5.
30. The composition of any of paragraphs 1 to 29 wherein the second propylene polymer has a heat of fusion of between 1 and 60 J/g, preferably between 3 and 50 J/g, preferably between 3 and 30 J/g, preferably between 5 and 25 J/g.
31. The composition of any of paragraphs 1 to 30 wherein the second propylene polymer has a tacticity index of 80% or more, preferably 85% or more, preferably 90% or more.
32. The composition of any of paragraphs 1 to 31 wherein the second propylene polymer is a copolymer of propylene and from 5 to 25 weight % of ethylene.
33. The composition of any of paragraphs 1 to 32 wherein the second propylene polymer has an MFR of 25 dg/min or less and or an Mw of 30,000 to 1,000,000 g/mol.
34. The composition of any of paragraphs 1 to 33 where the second propylene polymer has a melting point (second melt) of 0 to 90° C.
35. The composition of any of paragraphs 1 to 34 where the second propylene polymer has a crystallinity of 2 to 40%.
36. The composition of any of paragraphs 1 to 35 where the second propylene polymer has a 1% secant flexural modulus of from 100 MPa to 2300 MPa
37. The composition of any of paragraphs 1 to 36 where the second propylene polymer has a melt flow rate from 0.3 to 500 dg/min.
38. The composition of any of paragraphs 1 to 37 where the second propylene polymer comprises a copolymer of propylene and from 0.5 to 30 weight % of one or more comonomers selected from the group consisting of ethylene, butene, pentene, hexene, heptene, octene, nonene, decene, dodecene, 4-methyl-pentene-1,3-methyl pentene-1,5-ethyl-1-nonene, and 3,5,5-trimethyl-hexene-1.
39. The composition of any of paragraphs 1 to 38 where the second propylene polymer comprises propylene, from 0 to 5 weight % of a diene, and from 2 wt % to 25 wt % ethylene, based on the total weight of the polymer and has a narrow compositional distribution; a melting point (Tm) of from 25° C. to 120° C.; a heat of fusion of from 50 J/g to 3 J/g; an Mw/Mn of from 1.5 to 5; and a melt index (MI) of less than 20 dg/min.
40. The composition of any of paragraphs 1 to 39 wherein the second propylene polymer has a Shore D Hardness of less than 50

41. The composition of any of paragraphs 1 to 40 where the composition has a tensile strength greater than 1 MPa.
42. The composition of any of paragraphs 1 to 41 further comprising an ethylene homopolymer or copolymer having a composition distribution breadth index of 60% or more (preferably 90% or more) and a density of 0.86 to 0.925 g/cc.
43. The composition of any of paragraphs 1 to 42 where the first propylene polymer is an impact copolymer.
44. An article comprising the composition of any of the above paragraphs 1 to 43.
45. The article of paragraph 44 where the article is a molded article, extruded article, film, fiber, staple fiber, or nonwoven.
46. The article of paragraph 44 or 45 where the non-functionalized plasticizer has: a) a flash point of 200° C. or more and b) a kinematic viscosity of 35 cSt or more at 100° C. or pour point of −25° C. or less.
47. The article of paragraph 44 or 45 wherein the non-functionalized plasticizer comprises $C_{20}$ to $C_{1500}$ paraffins having a Kinematic viscosity of 10 cSt or more at 100° C. and a viscosity index of 120 or more and where the second propylene polymer has a Shore D Hardness of less than 50 and heat of fusion of less than 50 J/gm, and the composition has a tensile strength greater than 1 MPa.
48. The article of paragraph 44 or 45 wherein where the non-functionalized plasticizer comprises oligomers of $C_5$ to $C_{14}$ olefins having a Kinematic viscosity of 10 cSt or more at 100° C. and a viscosity index of 120.
49. The article of paragraph 44 or 45 wherein the non-functionalized plasticizer comprises an oligomer of decene having a number-average molecular weight of 560-2,800 g/mol.
50. The article of paragraph 44 or 45 wherein the non-functionalized plasticizer comprises oligomers of decene having a number-average molecular weight of 2,800 to 21,000 g/mol.
51. The article of paragraph 44 or 45 wherein the non-functionalized plasticizer comprises oligomers of 1-pentene, 1-hexene, 1-heptene, 1-octene, 1-nonene, 1-decene, 1-undodecene and or 1-dodecene.
52. The article of paragraph 44 to 51 wherein the non-functionalized plasticizer has a kinematic viscosity of 10 cSt or more at 100° C. and or a VI of 130 or more.
53. The article of any of paragraphs 44 to 52 where the article decreases less than 1% in weight when stored at 70° C. for 312 hours in a dry oven.
54. The article of any of paragraphs 44 to 53 where the non-functionalized plasticizer has a distillation range having a difference between the upper temperature and the lower temperature of 20° C. or less; and or the non-functionalized plasticizer has an initial boiling point greater than 110° C.; and or the non-functionalized plasticizer has a pour point of −30° C. or less; and or where the non-functionalized plasticizer has a dielectric constant at 20° C. of less than 3.0.
55. The article of any of paragraphs 44 to 54 wherein the second propylene polymer comprises 97 to 75 weight % propylene, 3 to 25 wt % ethylene and has a heat of fusion of 50 J/g or less and a triad tacticity of 80% or more and wherein the plasticizer has a flash point of 200° C. or more and a kinematic viscosity at 100° C. of 40 cSt or more, or a pour point of −30° C. or less.
56. The article of any of paragraphs 44 to 55 wherein the second propylene polymer has a weight average molecular weight of 5,000 to 5,000,000, a number average molecular weight of 5,000 to 3,000,000, a z-average molecular weight of 10,000 to 5,000,000.

57. The article of any of paragraphs 44 to 56 wherein the second propylene polymer has a polypropylene crystallinity of about 0.25% to about 15%.

58. The article of any of paragraphs 44 to 57 wherein the second propylene polymer has an intermolecular compositional distribution as determined by thermal fractionation in hexane such that 85% by weight or more of the semi-amorphous polymer is isolated as one or two adjacent, soluble fractions with the balance of the semi-amorphous polymer in immediately preceding or succeeding fractions; wherein each of these fractions has a wt % comonomer content with a difference of no greater than 20 wt % relative to the average wt % comonomer content of the copolymer, wherein the fractions are obtained at temperature increases of approximately 8° C. between stages.

59. The article of any of paragraphs 44 to 58 wherein the second propylene polymer has a 0.1% to less than 35% crystallinity; and or the second propylene polymer has a melting point of 90° C. or less.

60. The article of any of paragraphs 44 to 59 wherein the second propylene polymer comprises propylene, from 0 to 5 weight % of a diene, and from 2 wt % to 25 wt % ethylene, based on the total weight of the polymer and has a narrow compositional distribution; a melting point (Tm) of from 25° C. to 120° C.; a heat of fusion of from 50 J/g to 3 J/g; an Mw/Mn of from 1.5 to 5; and a melt index (MI) of less than 20 dg/min.

61. The article of any of paragraphs 44 to 60 where non-functionalized plasticizer is present at 0.5 to 35 weight %, based upon the weight of the polymers and the non-functionalized plasticizer, preferably 1 to 15 weight 62. The article of any of paragraphs 44 to 61 wherein phthalates, adipates, trimellitate ester, and polyesters are substantially absent.

63. The article of any of paragraphs 44 to 62 wherein the vicat softening point of the second propylene polymer is greater than 45° C. and or the Shore A hardness of the second propylene polymer is greater than 45.

64. The article of any of paragraphs 44 to 63 wherein the permanent set of the article is less than 65%.

65. The article of any of paragraphs 44 to 64 wherein the article is selected from the group consisting of: cookware, storage ware, furniture, automotive components, boat components, toys, sportswear, medical devices, medical devices, sterilization containers, tubes, pipes, sporting equipment, wire jacketing, cable jacketing, bumpers, grills, trim parts, dashboards, instrument panels, exterior door components, hood components, spoiler, wind screen, hub caps, mirror housing, body panel, protective side molding, crates, containers, packaging, labware, office floor mats, instrumentation sample holders, sample windows; liquid storage containers, bags, pouches, bottles for storage and IV infusion of blood or solutions; packaging material for any medical device or drugs including unit-dose, blister pack, bubble pack, adhesives, shoe soles, gaskets, bellows, elastic fibers, and sealants.

66. A method to make an article of manufacture comprising subjecting the composition of any of paragraphs 1 to 43 one or more of: injection molding, compression molding, transfer molding, casting, extruding, thermoforming, blow molding, rotational molding or combinations thereof.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A composition comprising 1) from 1 to 98 weight % of a first propylene polymer having a melting point of 100° C. or more, 2) from 5 to 98 weight % of a second propylene polymer having a heat of fusion of 70 J/g or less and a tacticity index of 75% or more, 3) from 0.5 to 75 weight % of a non-functionalized plasticizer ("NFP") having a viscosity index of 120 or more and a pour point of −10° C. or less, based upon the weight of the first polymer, second polymer, and the NFP.

2. The composition of claim 1 wherein the NFP has a flash point of 200° C. or more.

3. The composition of claim 2 wherein the NFP has a kinematic viscosity of 35 cSt or more at 100° C.

4. The composition of claim 2 wherein the NFP has a pour point of −20° C. or less.

5. The composition of claim 1 wherein where the NFP has a kinematic viscosity at 25° C. of 30,000 cSt or less.

6. The composition of claim 1 wherein where the non-functionalized plasticizer comprises oligomers of $C_5$ to $C_{14}$ olefins having a Kinematic viscosity of 10 cSt or more at 100° C.

7. The composition of claim 1 wherein the non-functionalized plasticizer has a kinematic viscosity of 10 cSt or more at 100° C.

8. The composition of claim 1 where the non-functionalized plasticizer comprises a mineral oil having a saturates levels of 90% or more and sulfur contents of 0.03% or less.

9. The composition of claim 1 where the non-functionalized plasticizer comprises a mixture of branched and normal paraffins having from 6 to 50 carbon atoms and a ratio of branch paraffin to n-paraffin ratio ranging from 0.5:1 to 9:1.

10. The composition of claim 1 where the non-functionalized plasticizer comprises a mixture of branched and normal paraffins having from 6 to 50 carbon atoms and a ratio of branch paraffin to n-paraffin ratio ranging from 0.5:1 to 9:1, where the mixture comprises greater than 50 wt % monomethyl species.

11. The composition of claim 1 where the plasticizer comprises a mixture of branched and normal paraffins having from 10 to 16 carbon atoms and a ratio of branch paraffin to n-paraffin ratio ranging from 1:1 to 4:1.

12. The composition of claim 1 where the non-functionalized plasticizer comprises a linear or branched paraffinic hydrocarbon composition having a number average molecular weight of 500 to 20,000, having less than 10% sidechains having 4 or more carbons, and having at least 1 or 2 carbon branches present at 15 weight % or more, and where the NFP comprises less than 2 weight % cyclic paraffins.

13. The composition of claim 1 wherein the non-functionalized plasticizer comprises $C_{20}$ to $C_{1500}$ paraffins having a Kinematic viscosity of 10 cSt or more at 100° C. and where the second propylene polymer has a Shore D Hardness of less than 50 and heat of fusion of less than 50 J/gm, and the composition has a tensile strength greater than 1 MPa.

14. The composition of claim 1 where the composition comprises less than 0.1 weight % of an elastomer, based upon the weight of the composition.

15. The composition of claim 1 wherein the first polymer comprises isotactic polypropylene.

16. The composition of claim 1 where the second propylene polymer comprises a copolymer of propylene and from 0.5 to 30 weight % of one or more comonomers selected from the group consisting of ethylene, butene, pentene, hexene, heptene, octene, nonene, decene, dodecene, 4-methyl-pentene-1, 3-methyl pentene-1, 5-ethyl-1-nonene, and 3,5,5-tri-methyl-hexene-1.

17. The composition of claim 1 further comprising an ethylene homopolymer Or copolymer having a composition distribution breadth index of 90% or more and a density of 0.86 to 0.925 g/cc.

18. The composition of claim 1 where the first propylene polymer is an impact copolymer and the composition further comprises an ethylene homopolymer or copolymer having a composition distribution breadth index of 90% or more and a density of 0.86 to 0.925 g/cc.

19. An article comprising the composition of claim 1.

20. The article of claim 19 where the article is a molded article.

21. The article of claim 19 where the article is an extruded article.

22. The article of claim 19 where the article is a film.

23. The article of claim 19 where the article is a fiber.

24. The article of claim 19 where the article is a nonwoven.

25. The article of claim 19 wherein the article is selected from the group consisting of: tubes, pipes, wire jacketing, cable jacketing, bumpers, grills, trim parts, dashboards, instrument panels, spoilers, windscreens, hub caps, mirror housing, body panels, protective side molding, crates, containers, office floor mats, instrumentation sample holders, sample windows; liquid storage containers, bags, pouches, bottles for storage and IV infusion of blood or solutions; shoe soles, gaskets, bellows, elastic fibers, and sealants.

26. A method to make an article of manufacture comprising subjecting the composition of claim 1 one or more of: injection molding, compression molding, transfer molding, casting, extruding, thermoforming, blow molding, rotational molding or combinations thereof.

27. The film of claim 22 wherein the second propylene polymer comprises 97 to 75 weight % propylene, 3 to 25 wt % ethylene and has a heat of fusion of 50 J/g or less and a triad tacticity of 80% or more and wherein the plasticizer has a flash point of 200° C. or more and a kinematic viscosity at 100° C. of 40 cSt or more, or a pour point of −30° C. or less.

28. The fiber of claim 23 wherein the second propylene polymer comprises 97 to 75 weight % propylene, 3 to 25 wt % ethylene and has a heat of fusion of 50 J/g or less and a triad tacticity of 80% or more and wherein the plasticizer has a flash point of 200° C. or more and a kinematic viscosity at 100° C. of 40 cSt or more, or a pour point of −30° C. or less.

29. A nonwoven comprising the fiber of claim 28.

30. The composition of claim 1 formed into a pellet, where the pellet is dusted with a polyolefin powder having a mesh size of from 1 to 100.

* * * * *

UNITED STATES PATENT AND TRADEMARK OFFICE
CERTIFICATE OF CORRECTION

PATENT NO. : 7,629,416 B2  Page 1 of 1
APPLICATION NO. : 11/119072
DATED : December 8, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Second Day of November, 2010

David J. Kappos
*Director of the United States Patent and Trademark Office*